(12) United States Patent
Nakao et al.

(10) Patent No.: US 12,073,853 B2
(45) Date of Patent: Aug. 27, 2024

(54) MAGNETIC TAPE CARTRIDGE, MAGNETIC TAPE DRIVE, MAGNETIC TAPE SYSTEM, AND METHOD OF OPERATING MAGNETIC TAPE DRIVE

(71) Applicant: FUJIFILM Corporation, Tokyo (JP)

(72) Inventors: Toru Nakao, Kanagawa (JP); Norihito Kasada, Kanagawa (JP); Tetsuya Kaneko, Kanagawa (JP); Atsushi Musha, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/163,606

(22) Filed: Feb. 2, 2023

(65) Prior Publication Data
US 2023/0186944 A1  Jun. 15, 2023

Related U.S. Application Data

(63) Continuation of application No. PCT/JP2021/028499, filed on Jul. 30, 2021.

(30) Foreign Application Priority Data

Aug. 28, 2020 (JP) .................................. 2020-144963
Jun. 25, 2021 (JP) .................................. 2021-106102

(51) Int. Cl.
*G11B 5/008* (2006.01)
*G11B 5/78* (2006.01)

(52) U.S. Cl.
CPC ............ *G11B 5/00813* (2013.01); *G11B 5/78* (2013.01)

(58) Field of Classification Search
None
See application file for complete search history.

(56) References Cited

U.S. PATENT DOCUMENTS

| 5,946,156 A * | 8/1999 | Schwarz ............. G11B 21/103 |
| 6,580,581 B1 * | 6/2003 | Bui ........................ G11B 5/584 |
| 10,902,873 B1 * | 1/2021 | Seagle ............... G11B 5/00826 |

(Continued)

FOREIGN PATENT DOCUMENTS

| JP | 2003-257152 A | 9/2003 |
| JP | 2003-323266 A | 11/2003 |

(Continued)

OTHER PUBLICATIONS

English text of Sasaki et al., JP 6747570 B1, published Aug. 26, 2020.*

(Continued)

*Primary Examiner* — Peter Vincent Agustin
(74) *Attorney, Agent, or Firm* — Sughrue Mion, PLLC

(57) ABSTRACT

Provided is a magnetic tape cartridge including: a case in which a magnetic tape on which a plurality of servo bands are formed is accommodated; and a storage medium provided in the case, in which the plurality of servo bands are formed at positions spaced apart from each other in a width direction of the magnetic tape along an entire length direction of the magnetic tape, and the storage medium stores pitch information capable of specifying a pitch in the width direction between the plurality of servo bands and distance information capable of specifying a distance between a plurality of servo reading elements that have read the plurality of servo bands.

20 Claims, 33 Drawing Sheets

(56) References Cited

U.S. PATENT DOCUMENTS

| | | |
|---|---|---|
| 2004/0114266 A1 | 6/2004 | Urano et al. |
| 2005/0254161 A1* | 11/2005 | Nakao ............... G11B 15/026 |
| 2007/0091499 A1* | 4/2007 | Saliba ................. G11B 5/584 |
| 2019/0074031 A1* | 3/2019 | Akano ................. G11B 5/584 |
| 2020/0227088 A1* | 7/2020 | Biskeborn ............ G11B 17/34 |
| 2020/0273489 A1* | 8/2020 | Kaneko ............. G11B 5/59638 |
| 2021/0233567 A1 | 7/2021 | Tochikubo et al. |
| 2021/0241793 A1 | 8/2021 | Anno et al. |
| 2021/0249044 A1 | 8/2021 | Nakashio et al. |
| 2022/0254370 A1 | 8/2022 | Yamaga et al. |
| 2023/0186944 A1* | 6/2023 | Nakao ................. G11B 5/584 360/55 |

FOREIGN PATENT DOCUMENTS

| | | |
|---|---|---|
| JP | 6669302 B1 | 3/2020 |
| JP | 6669326 B1 | 3/2020 |
| JP | 6747570 B1 | 8/2020 |
| WO | 2019/216015 A1 | 11/2019 |
| WO | 2020/027331 A1 | 2/2020 |

OTHER PUBLICATIONS

International Search Report issued Nov. 2, 2021 in Application No. PCT/JP2021/028499.

Written Opinion issued Nov. 2, 2021 in Application No. PCT/JP2021/028499.

International Preliminary Report on Patentability including translation of the Writen Opinion issued Feb. 28, 2023 in Application No. PCT/JP2021/028499.

Japanese Office Action issued Jun. 27, 2023 in Application No. 2021-106102.

* cited by examiner

FIG. 20
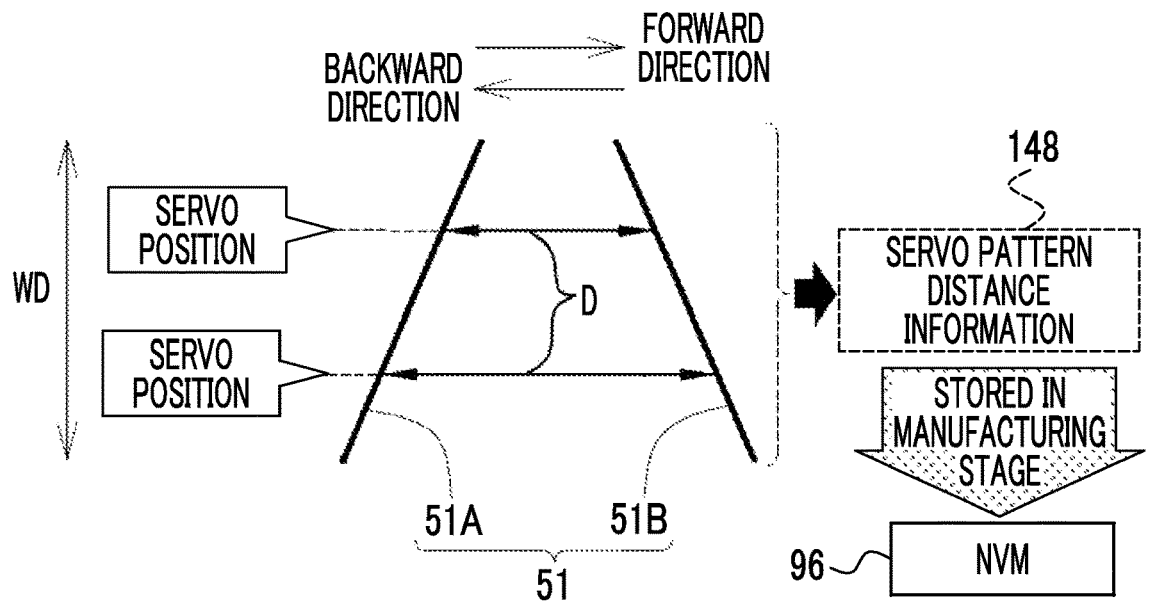
FIG. 21
IDEAL SERVO PATTERN
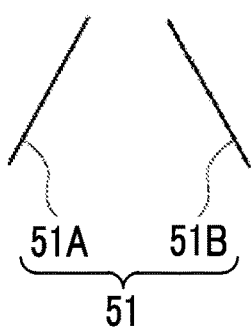
ACTUAL SERVO PATTERN
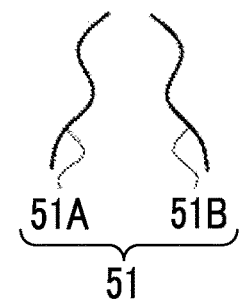
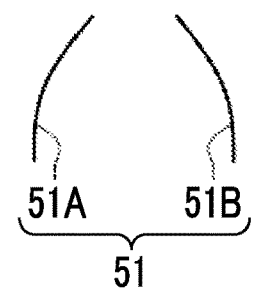

| SERVO BAND | SERVO POSITION | DISTANCE D [μm] | SERVO DISTANCE [μm] |
|---|---|---|---|
| 0 | 1 | 21.389 | 39.074 |
|   | 2 | 22.613 | 35.195 |
|   | 3 | 23.837 | 31.316 |
|   | 4 | 25.062 | 27.434 |
|   | 5 | 26.286 | 23.555 |
|   | ... | ... | ... |
|   | 19 | 31.874 | −39.074 |
| 1 | ... | ... | ... |
| ... | ... | ... | ... |

| SERVO BAND | SERVO POSITION | PITCH [μm] |
|---|---|---|
| 0 | 1 | 2858.92 |
| | 2 | 2858.95 |
| | 3 | 2858.87 |
| | 4 | 2858.88 |
| | 5 | 2858.95 |
| | ... | ... |
| | 12 | 2858.98 |
| 1 | ... | ... |
| ... | ... | ... |

142

MAGNETIC TAPE CARTRIDGE, MAGNETIC TAPE DRIVE, MAGNETIC TAPE SYSTEM, AND METHOD OF OPERATING MAGNETIC TAPE DRIVE

CROSS-REFERENCE TO RELATED APPLICATIONS

This application is a continuation application of International Application No. PCT/JP2021/028499, filed Jul. 30, 2021, the disclosure of which is incorporated herein by reference in its entirety. Further, this application claims priority from Japanese Patent Application No. 2020-144963, filed Aug. 28, 2020, and Japanese Patent Application No. 2021-106102, filed Jun. 25, 2021, the disclosures of which are incorporated herein by reference in its entirety.

BACKGROUND

1. Technical Field

The technology of the present disclosure relates to a magnetic tape cartridge, a magnetic tape drive, a magnetic tape system, and a method of operating a magnetic tape drive.

2. Related Art

A cartridge memory that stores information is mounted in a magnetic tape cartridge in which a magnetic tape is accommodated. JP6669326B discloses that information at a time of data recording in a magnetic tape drive is stored in a cartridge memory and the information is read out from the cartridge memory at a time of data reading for reference. The information includes information on tension applied to a running magnetic tape at the time of data recording.

JP6669302B discloses a cartridge including a cartridge case that accommodates a magnetic tape, and a memory that is provided in the cartridge case and that stores information before data recording on the magnetic tape, which is information for adjusting a width of the magnetic tape during data recording or data reproduction with respect to the magnetic tape.

SUMMARY

A magnetic tape cartridge is used by being loaded into a magnetic tape drive. The magnetic tape drive is provided with a head. The head reads and writes data with respect to the magnetic tape pulled out from the magnetic tape cartridge in the magnetic tape drive. In order to accurately read and write data with respect to a designated track in the magnetic tape, it is necessary to accurately match a position of a magnetic element in the head with a position of the track through a tracking control in a width direction of the magnetic tape.

The tracking control is realized by using a plurality of servo patterns and a plurality of servo reading elements. The plurality of servo patterns are formed on the magnetic tape, and the plurality of servo reading elements are mounted on the head. In the magnetic tape, the plurality of servo patterns are formed at positions spaced apart from each other in the width direction of the magnetic tape along an entire length direction of the magnetic tape, and the plurality of servo reading elements are disposed so as to correspond to the plurality of servo patterns, in the head. In order to enhance the tracking control, as a premise, it is necessary to accurately match positions of the plurality of servo reading elements and positions of the plurality of servo patterns with each other.

However, a size of the magnetic tape in the width direction varies depending on, for example, a stress applied to the magnetic tape in a state of being wound on a reel in the magnetic tape cartridge, an environment of storage of the magnetic tape, and/or a time of storage in a state in which the magnetic tape is not used. In addition, in the head, variations occur between a plurality of heads because of, for example, a manufacturing error and/or a change with time, and variations in distance between the plurality of servo reading elements also occur.

An embodiment according to the technology of the present disclosure provides a magnetic tape cartridge, a magnetic tape drive, a magnetic tape system, and a method of operating a magnetic tape drive capable of contributing to a correction of a positional relationship between a plurality of servo bands and a plurality of servo reading elements even in a case where a variation in distance between the plurality of servo reading elements has occurred.

According to a first aspect of the technology of the present disclosure, there is provided a magnetic tape cartridge comprising: a case in which a magnetic tape on which a plurality of servo bands are formed is accommodated; and a storage medium provided in the case, in which the plurality of servo bands are formed at positions spaced apart from each other in a width direction of the magnetic tape along an entire length direction of the magnetic tape, and the storage medium stores pitch information capable of specifying a pitch in the width direction between the plurality of servo bands and distance information capable of specifying a distance between a plurality of servo reading elements that have read the plurality of servo bands.

According to a second aspect of the technology of the present disclosure, in the magnetic tape cartridge according to the first aspect, a magnetic head including at least one data reading element group that reads data from the magnetic tape and at least one data recording element group that records data on the magnetic tape has a set of the plurality of servo reading elements provided for each of the data reading element group and the data recording element group, and the storage medium stores the distance information for each of the data reading element group and the data recording element group.

According to a third aspect of the technology of the present disclosure, in the magnetic tape cartridge according to the second aspect, the storage medium stores the pitch information for each of the data reading element group and the data recording element group.

According to a fourth aspect of the technology of the present disclosure, in the magnetic tape cartridge according to the second aspect, the storage medium stores the distance information and the pitch information for any one of the data reading element group or the data recording element group.

According to a fifth aspect of the technology of the present disclosure, in the magnetic tape cartridge according to any one of the first to fourth aspects, the storage medium stores the pitch information regarding the pitches at a plurality of locations spaced apart from each other over the entire length of the magnetic tape.

According to a sixth aspect of the technology of the present disclosure, in the magnetic tape cartridge according to any one of the first to fifth aspects, the distance information includes information indicating the distance.

According to a seventh aspect of the technology of the present disclosure, in the magnetic tape cartridge according to any one of the first to sixth aspects, head specification information capable of specifying a head on which the plurality of servo reading elements are mounted is associated with information indicating the distance for the plurality of servo reading elements mounted on the head.

According to an eighth aspect of the technology of the present disclosure, in the magnetic tape cartridge according to any one of the first to seventh aspects, the storage medium includes an internal memory of a noncontact communication medium where reading and writing of data are performed in a noncontact manner by a noncontact reading and writing device.

According to a ninth aspect of the technology of the present disclosure, in the magnetic tape cartridge according to any one of the first to eighth aspects, the pitch is measured on the basis of a result of reading the plurality of servo bands through the plurality of servo reading elements, in a stage before data recording is performed by a magnetic tape drive with respect to the magnetic tape.

According to a tenth aspect of the technology of the present disclosure, there is provided a magnetic tape cartridge comprising: a case in which a magnetic tape on which a plurality of servo bands are formed is accommodated; and a storage medium provided in the case, in which the plurality of servo bands are formed at positions spaced apart from each other in a width direction of the magnetic tape along an entire length direction of the magnetic tape, the storage medium stores pitch information capable of specifying a pitch in the width direction between the plurality of servo bands, and the pitch information is a value calculated on the basis of distance information that is not stored in the storage medium and that is capable of specifying a distance between a plurality of servo reading elements that have read the plurality of servo bands.

According to an eleventh aspect of the technology of the present disclosure, in the magnetic tape cartridge according to the tenth aspect, the pitch is calculated on the basis of a result of reading the plurality of servo bands through the plurality of servo reading elements and the distance between the plurality of servo reading elements, in a stage before data recording is performed by a magnetic tape drive with respect to the magnetic tape.

According to a twelfth aspect of the technology of the present disclosure, in the magnetic tape cartridge according to the ninth or eleventh aspect, the pitch is obtained for each of a plurality of positions in the width direction in the plurality of servo bands.

According to a thirteenth aspect of the technology of the present disclosure, in the magnetic tape cartridge according to the twelfth aspect, the pitch in each position of the plurality of servo reading elements, which is specified by using servo pattern distance information in which the plurality of positions in the width direction in the plurality of servo bands and distances in the entire length direction of the magnetic tape at the plurality of positions between a pair of magnetization regions constituting a servo pattern formed in each of the plurality of servo bands are associated with each other, is obtained.

According to a fourteenth aspect of the technology of the present disclosure, in the magnetic tape cartridge according to any one of the first to thirteenth aspects, the storage medium includes a partial region of the magnetic tape.

According to a fifteenth aspect of the technology of the present disclosure, there is provided a magnetic tape drive in which the magnetic tape cartridge according to any one of the first to fourteenth aspects is loaded, the magnetic tape drive comprising: a tension applying mechanism that applies tension to the magnetic tape; and a control device that controls the tension applying mechanism to adjust the tension according to the pitch information and the distance information which are stored in the storage medium.

According to a sixteenth aspect of the technology of the present disclosure, there is provided a magnetic tape system comprising: the magnetic tape cartridge according to any one of the first to fourteenth aspects; a tension applying mechanism that applies tension to the magnetic tape; and a control device that controls the tension applying mechanism to adjust the tension according to the pitch information and the distance information which are stored in the storage medium.

According to a seventeenth aspect of the technology of the present disclosure, there is provided a method of operating a magnetic tape drive, comprising: acquiring the pitch information and the distance information from the storage medium provided in the magnetic tape cartridge according to any one of the first to fourteenth aspects; and controlling a tension applying mechanism, which applies tension to the magnetic tape, to adjust the tension, which is applied to the magnetic tape in a case where at least one of a recording operation or a reading operation with respect to the magnetic tape is performed, according to the pitch information and the distance information.

BRIEF DESCRIPTION OF THE DRAWINGS

Exemplary embodiments of the technology of the disclosure will be described in detail based on the following figures, wherein:

FIG. 20 is a conceptual diagram showing an example of a servo pattern;

FIG. 21 is a conceptual diagram showing an example of an ideal servo pattern and an actual servo pattern;

DETAILED DESCRIPTION

Hereinafter, an example of an embodiment of a magnetic tape cartridge, a magnetic tape drive, a magnetic tape system, and a method of operating a magnetic tape drive according to the technology of the present disclosure will be described with reference to the accompanying drawings.

First, terms that are used in the following description will be described.

CPU is an abbreviation for "Central Processing Unit". RAM is an abbreviation for "Random Access Memory". DRAM is an abbreviation for "Dynamic Random Access Memory". SRAM is an abbreviation for "Static Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". HDD is an abbreviation for "Hard Disk Drive". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". RFID is an abbreviation for "Radio Frequency IDentifier". LTO is an abbreviation for "Linear Tape-Open". IBM is an abbreviation for "International Business Machines Corporation". ID is an abbreviation for "Identification Data". BOT is an abbreviation for "Beginning Of Tape". EOT is an abbreviation for "End Of Tape". LAN is an abbreviation for "Local Area Network". WAN is an abbreviation for "Wide Area Network". SAN is an abbreviation for "Storage Area Network". I/F is an abbreviation for "Interface". MFM is an abbreviation for "Magnetic Force Microscope". SEM is an abbreviation for "Scanning Electron Microscope". QR is an abbreviation for "Quick Response".

Figure 1:
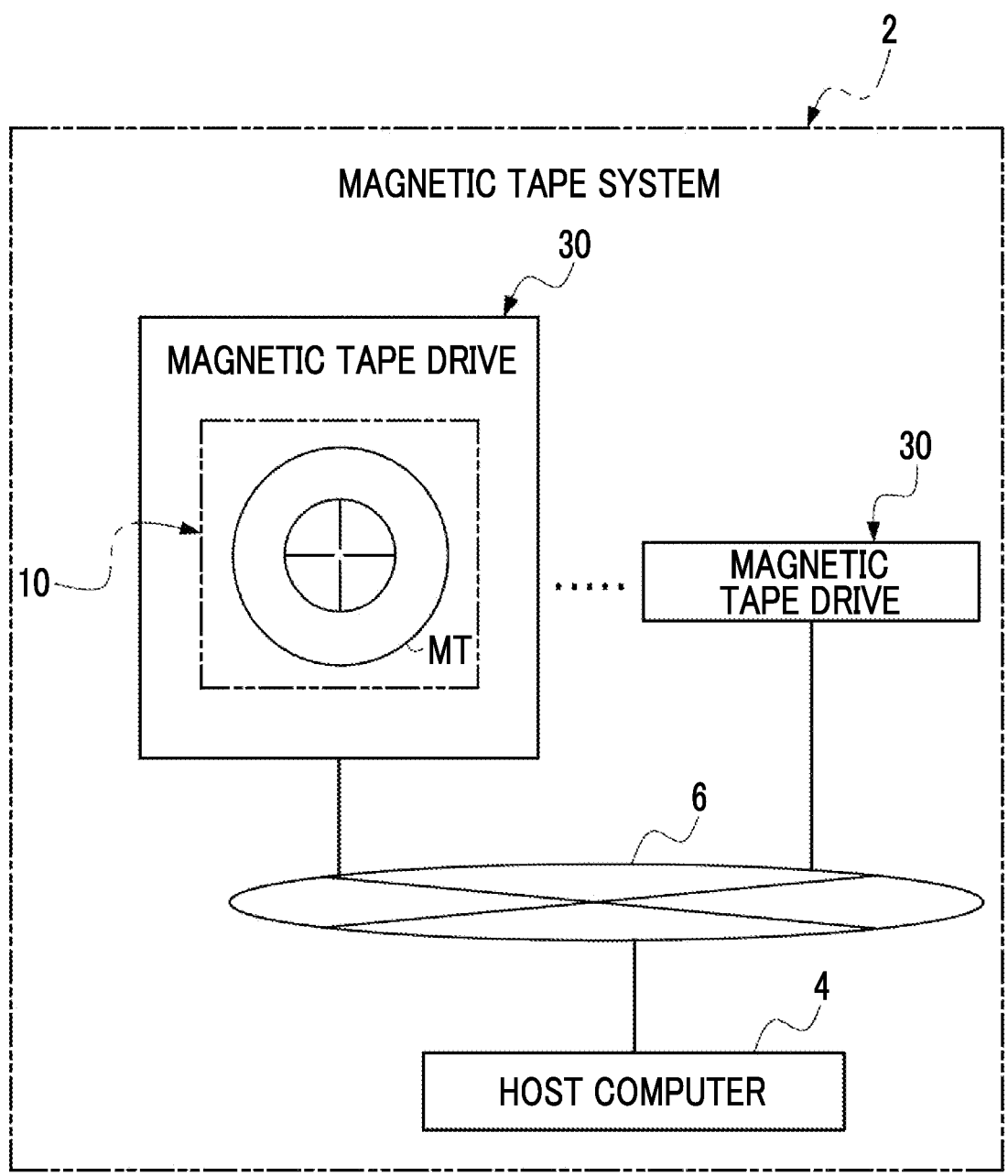
FIG. 1 is a block diagram showing an example of a configuration of a magnetic tape system.

As shown in FIG. 1 as an example, a magnetic tape system 2 comprises a host computer 4, a magnetic tape cartridge 10, and a plurality of magnetic tape drives 30. The magnetic tape cartridge 10 is loaded into the magnetic tape drive 30. The magnetic tape cartridge 10 accommodates a magnetic tape MT. The magnetic tape drive 30 pulls out the magnetic tape MT from the loaded magnetic tape cartridge 10, and records data on the magnetic tape MT or reads data from the magnetic tape MT while causing the pulled-out magnetic tape MT to run.

The host computer 4 is connected to the plurality of magnetic tape drives 30 via a communication network 6 (for example, LAN, WAN, and/or SAN), and transmits and receives various types of information to and from each magnetic tape drive 30. In the example shown in FIG. 1, although an aspect is shown in which the plurality of magnetic tape drives 30 are connected to the communication network 6, the technology of the present disclosure is not limited thereto, and one magnetic tape drive 30 may be connected to the communication network 6, and various types of information may be transmitted and received between the host computer 4 and the one magnetic tape drive 30 via the communication network 6. In addition, a communication method performed between the host computer 4 and the magnetic tape drive 30 may be a wired communication method or a wireless communication method.

Next, an example of a configuration of the magnetic tape cartridge 10 will be described with reference to FIGS. 2 to 4. In the following description, for convenience of description, in FIGS. 2 to 4, a loading direction of the magnetic tape cartridge 10 in a magnetic tape drive 30 (see FIG. 5) is indicated by an arrow A, a direction of the arrow A is referred to a front direction of the magnetic tape cartridge 10, and a side in the front direction of the magnetic tape cartridge 10 is referred to as a front side of the magnetic tape cartridge 10. In the following description of the structure, "front" indicates the front side of the magnetic tape cartridge 10.

In addition, in the following description, for convenience of description, in FIGS. 2 to 4, a direction of an arrow B perpendicular to the direction of the arrow A is referred to as a right direction, and a side in the right direction of the magnetic tape cartridge 10 is referred to as a right side of the magnetic tape cartridge 10. In the following description of the structure, "right" indicates the right side of the magnetic tape cartridge 10.

Further, in the following description, for convenience of description, in FIGS. 2 to 4, a direction opposite to the direction of the arrow B is referred to as a left direction, and a side in the left direction of the magnetic tape cartridge 10 is referred to as a left side of the magnetic tape cartridge 10. In the following description of the structure, "left" indicates the left side of the magnetic tape cartridge 10.

Further, in the following description, for convenience of description, in FIGS. 2 to 4, a direction perpendicular to the direction of the arrow A and the direction of the arrow B is indicated by an arrow C, a direction of the arrow C is referred to as an upper direction of the magnetic tape cartridge 10, and a side in the upper direction of the magnetic tape cartridge 10 is referred to as an upper side of the magnetic tape cartridge 10. In the following description of the structure, "upper" indicates the upper side of the magnetic tape cartridge 10.

Further, in the following description, for convenience of description, in FIGS. 2 to 4, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description of the structure, "rear" indicates the rear side of the magnetic tape cartridge 10.

Further, in the following description, for convenience of description, in FIGS. 2 to 4, a direction opposite to the upper direction of the magnetic tape cartridge 10 is referred to as a lower direction of the magnetic tape cartridge 10, and a side in the lower direction of the magnetic tape cartridge 10 is referred to as a lower side of the magnetic tape cartridge 10. In the following description of the structure, "lower" indicates the lower side of the magnetic tape cartridge 10.

Further, in the following description, although LTO will be described as an example of the specification of the magnetic tape cartridge 10, this is merely an example, and the specification of the magnetic tape cartridge 10 may conform to the specification of a magnetic tape cartridge of IBM3592.

Figure 2:
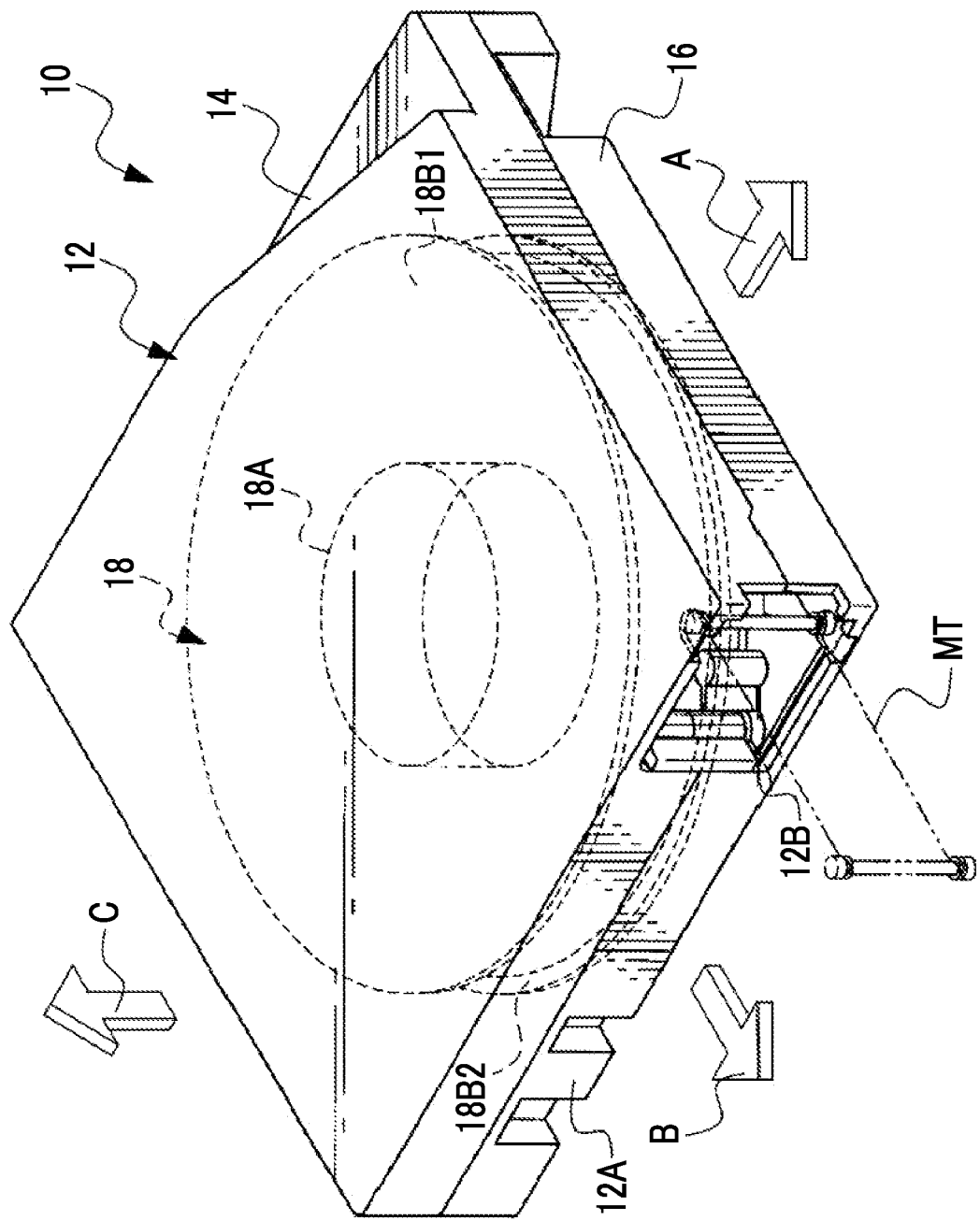
FIG. 2 is a schematic perspective view showing an example of an external appearance of a magnetic tape cartridge.

As shown in FIG. 2 as an example, the magnetic tape cartridge 10 has a substantially rectangular shape in plan view, and comprises a box-shaped case 12. The case 12 is an example of a "case" according to the technology of the present disclosure. The magnetic tape MT is accommodated in the case 12. The case 12 is made of a resin, such as polycarbonate, and comprises an upper case 14 and a lower case 16. The upper case 14 and the lower case 16 are bonded to each other by welding (for example, ultrasonic welding) and screwing in a state in which a lower peripheral edge surface of the upper case 14 and an upper peripheral edge surface of the lower case 16 are brought into contact with each other. The bonding method is not limited to the welding and the screwing, and other bonding methods may be used.

A cartridge reel 18 is rotatably accommodated inside the case 12. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a central portion of the case 12. Each of the upper flange 18B1 and the lower flange 18B2 is formed in an annular shape. A central portion in plan view of the upper flange 18B1 is fixed to an upper end part of the reel hub 18A, and a central portion in plan view of the lower flange 18B2 is fixed to a lower end part of the reel hub 18A. The reel hub 18A and the lower flange 18B2 may be integrally molded.

A magnetic tape MT is wound around an outer peripheral surface of the reel hub 18A, and widthwise end parts of the magnetic tape MT are held by the upper flange 18B1 and the lower flange 18B2.

An opening 12B is formed on a front side of a right wall 12A of the case 12. The magnetic tape MT is pulled out from the opening 12B.

Figure 3:
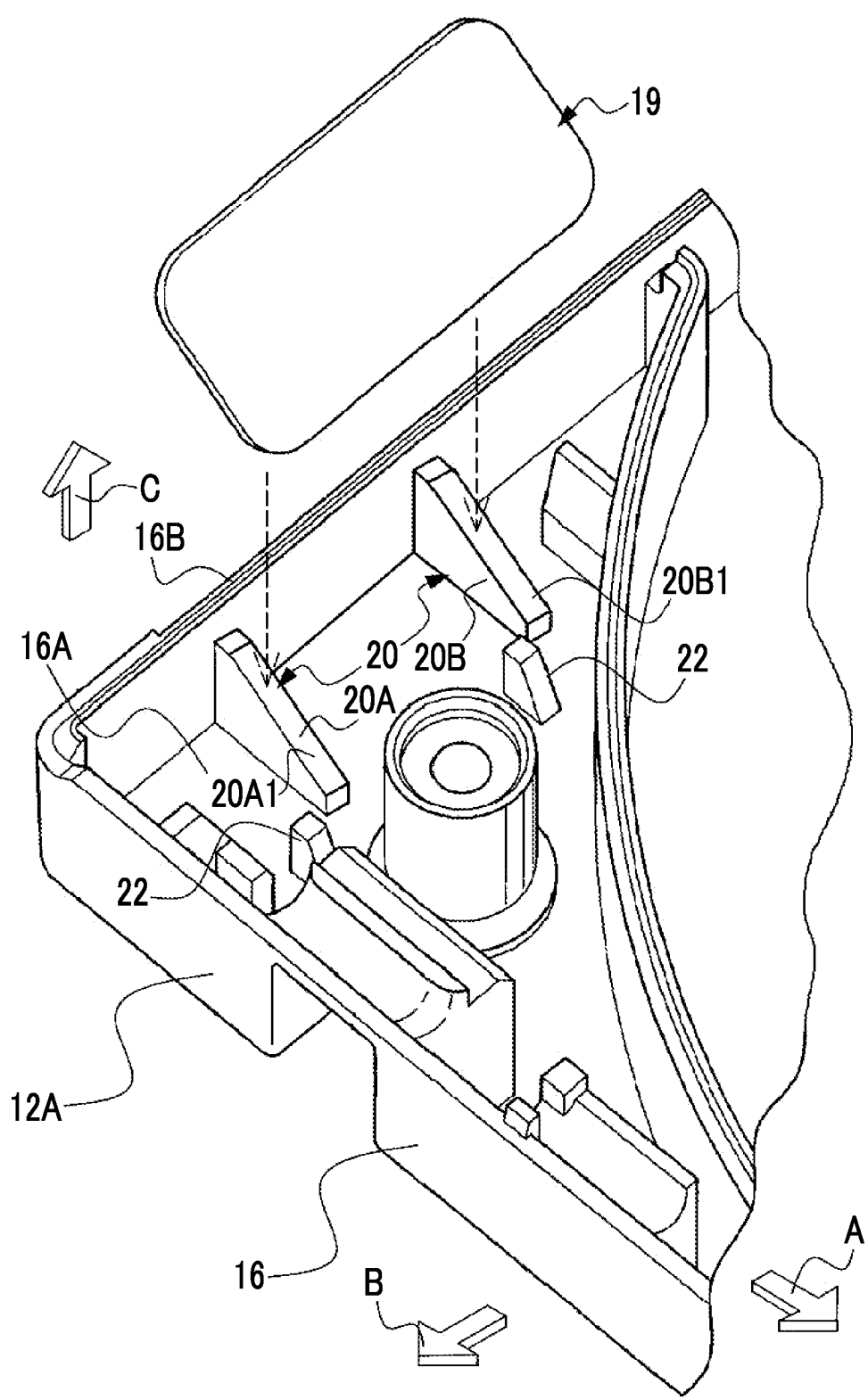
FIG. 3 is a schematic perspective view showing an example of a structure of a rear right end part inside a lower case of the magnetic tape cartridge.

As shown in FIG. 3 as an example, a cartridge memory 19 is provided in the lower case 16. Specifically, the cartridge memory 19 is accommodated in a rear right end part of the lower case 16. The cartridge memory 19 is an example of a "noncontact communication medium" according to the technology of the present disclosure. In the present embodiment, a so-called passive type RFID tag is employed as the cartridge memory 19.

Information regarding the magnetic tape MT is stored in the cartridge memory 19. The information regarding the magnetic tape MT indicates, for example, management information for managing the magnetic tape cartridge 10. Examples of the management information include information regarding the cartridge memory 19, information capable of specifying the magnetic tape cartridge 10, and information indicating a recording capacity of the magnetic tape MT, the outline of data recorded on the magnetic tape MT, items of data, a recording format of data, and the like.

The cartridge memory 19 performs noncontact communication with a noncontact reading and writing device. Examples of the noncontact reading and writing device include a noncontact reading and writing device (for example, a noncontact reading and writing device 50B shown in FIG. 25) that is used in a manufacturing process of the magnetic tape cartridge 10 and a noncontact reading and writing device (for example, a noncontact reading and writing device 50A shown in FIGS. 5 to 7, 23, and 29) that is used in the magnetic tape drive (for example, the magnetic tape drive 30 shown in FIG. 5).

The noncontact reading and writing device performs reading and writing of various types of information with respect to the cartridge memory 19 in a noncontact manner. Although details will be described later, the cartridge memory 19 generates electric power with electromagnetic action on a magnetic field MF (see FIG. 6 and the like)

applied from the noncontact reading and writing device. Then, the cartridge memory 19 operates using the generated electric power, and transmits and receives various types of information to and from the noncontact reading and writing device by performing communication with the noncontact reading and writing device via the magnetic field MF. The communication method may be, for example, a method conforming to a known standard, such as ISO14443 or ISO18092, or a method conforming to the LTO specification of ECMA319.

As shown in FIG. 3 as an example, a support member 20 is provided on an inner surface of a bottom plate 16A of the rear right end part of the lower case 16. The support member 20 is a pair of inclined mounts that support the cartridge memory 19 from below in an inclined state. The pair of inclined mounts are a first inclined mount 20A and a second inclined mount 20B. The first inclined mount 20A and the second inclined mount 20B are disposed at an interval in a right-left direction of the case 12 and are integrated with an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. Further, the second inclined mount 20B has an inclined surface 20B1, and the inclined surface 20B1 is also inclined downward from the inner surface of the rear wall 16B toward the inner surface of the bottom plate 16A.

In front of the support member 20, a pair of position restricting ribs 22 are disposed at an interval in the right-left direction. The pair of position restricting ribs 22 are provided upright on the inner surface of the bottom plate 16A and restrict a position of a lower end part of the cartridge memory 19 in a state in which the cartridge memory 19 is disposed on the support member 20.

Figure 4:
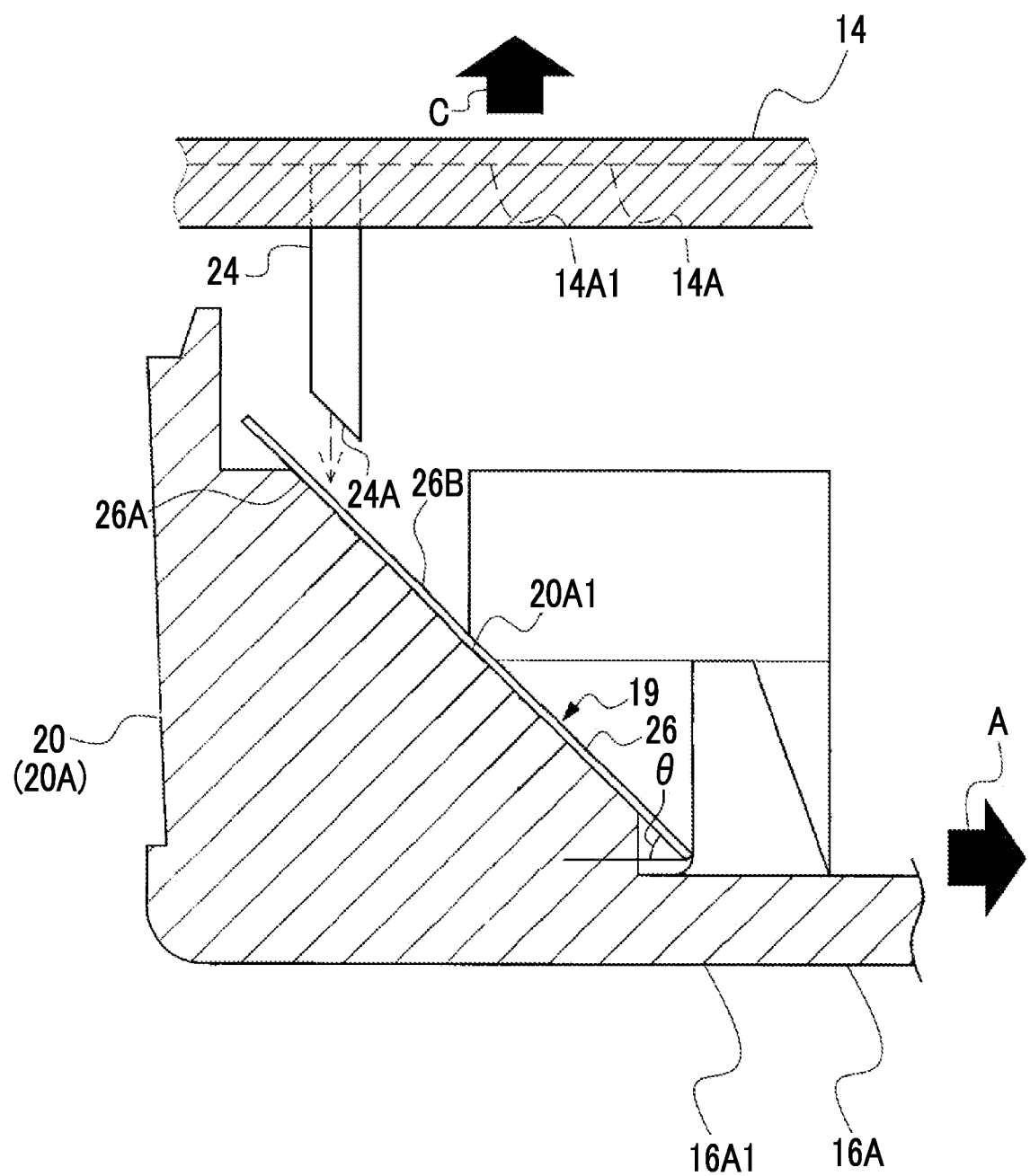
FIG. 4 is a side cross-sectional view showing an example of a support member provided on an inner surface of the lower case of the magnetic tape cartridge.

As shown in FIG. 4 as an example, a reference surface 16A1 is formed on an outer surface of the bottom plate 16A. The reference surface 16A1 is a plane. Here, the plane indicates a surface parallel to a horizontal plane in a case where the lower case 16 is placed on the horizontal plane with the bottom plate 16A facing the lower side. Here, "parallel" indicates parallel in a meaning including an error that is generally allowed in the technical field to which the technology of the present disclosure belongs, and an error to such an extent not contrary to the gist of the technology of the present disclosure, in addition to completely parallel. An inclined angle θ of the support member 20, that is, an inclined angle of each of the inclined surface 20A1 and the inclined surface 20B1 (see FIG. 3) is 45 degrees with respect to the reference surface 16A1. The inclined angle of 45 degrees is merely an example, and may be in a range of "0 degrees <inclined angle θ<45 degrees" or may be 45 degrees or more.

The cartridge memory 19 comprises a substrate 26. The substrate 26 is placed on the support member 20 with a back surface 26A of the substrate 26 facing the lower side, and the support member 20 supports the back surface 26A of the substrate 26 from below. A part of the back surface 26A of the substrate 26 is in contact with the inclined surface of the support member 20, that is, the inclined surfaces 20A1 and 20B1 (see FIG. 3), and a front surface 26B of the substrate 26 is exposed to an inner surface 14A1 side of a top plate 14A of the upper case 14.

The upper case 14 comprises a plurality of ribs 24. The plurality of ribs 24 are disposed at intervals in the right-left direction of the case 12. The plurality of ribs 24 are provided to protrude to the lower side from the inner surface 14A1 of the top plate 14A of the upper case 14, and a distal end surface 24A of each rib 24 has an inclined surface corresponding to the inclined surfaces 20A1 and 20B1 (see FIG. 3). That is, the distal end surface 24A of each rib 24 is inclined at 45 degrees with respect to the reference surface 16A1.

In a case where the upper case 14 is bonded to the lower case 16 as described above in a state in which the cartridge memory 19 is disposed on the support member 20, the distal end surface 24A of each rib 24 comes into contact with the substrate 26 from the front surface 26B side, and the substrate 26 is pinched by the distal end surface 24A of each rib 24 and the inclined surfaces 20A1 and 20B1 (see FIG. 3) of the support member 20. With this, a position in an up-down direction of the cartridge memory 19 is restricted by the ribs 24.

Figure 5:
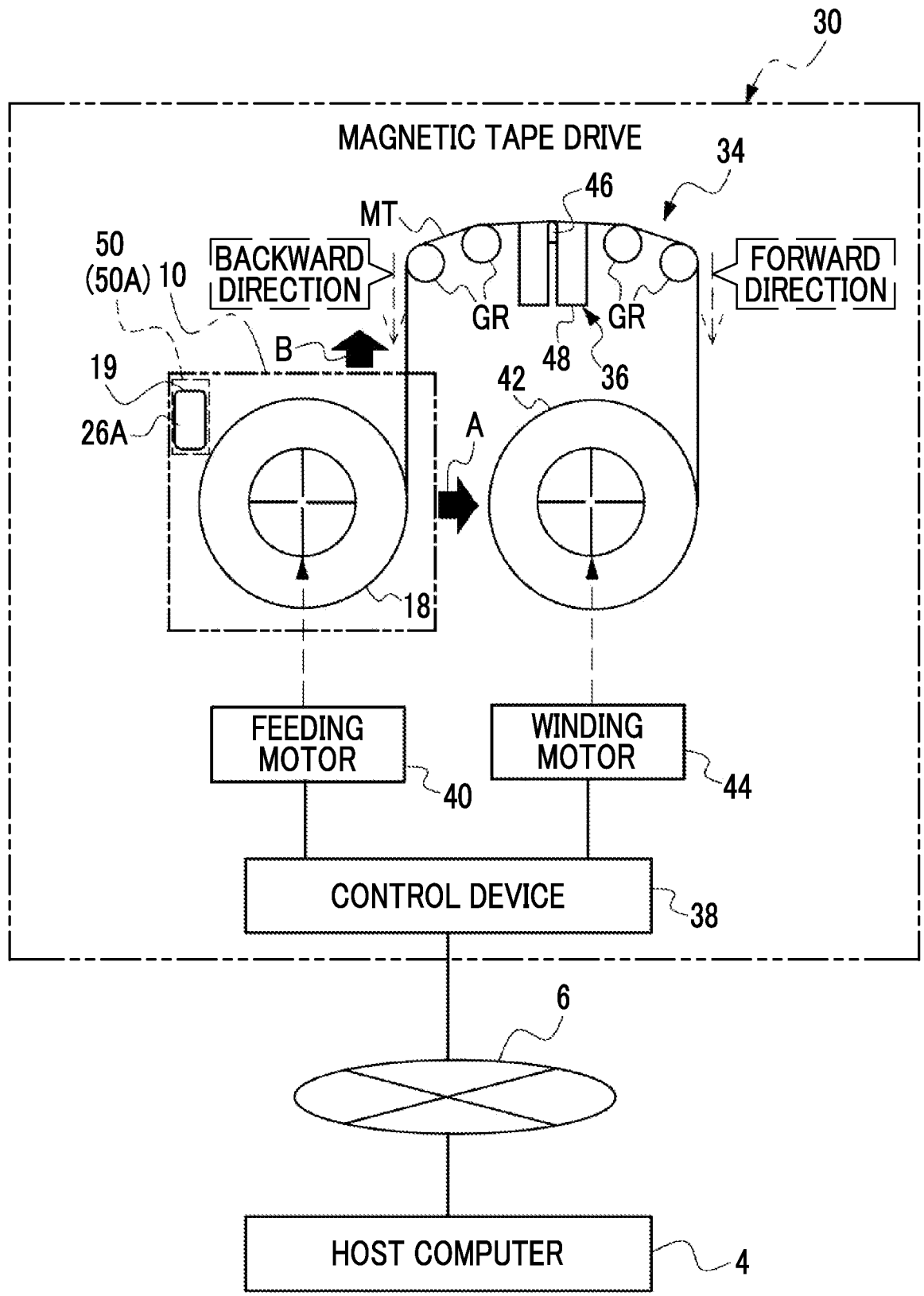
FIG. 5 is a schematic configuration diagram showing an example of a hardware configuration of a magnetic tape drive.

As shown in FIG. 5 as an example, the magnetic tape drive 30 comprises a transport device 34, a magnetic head 36, and a control device 38. The magnetic tape cartridge 10 is loaded into the magnetic tape drive 30. The magnetic tape drive 30 is a device that pulls out the magnetic tape MT from the magnetic tape cartridge 10, records data on the pulled-out magnetic tape MT using the magnetic head 36, and reads data from the pulled-out magnetic tape MT using the magnetic head 36 in a linear serpentine method. In the present embodiment, in other words, reading of data indicates reproduction of data.

The control device 38 is connected to the host computer 4 via the communication network 6 and transmits and receives various types of information to and from the host computer 4. Further, the control device 38 controls the operation of the entire magnetic tape drive 30. In the present embodiment, although the control device 38 is realized by an ASIC 120 (see FIG. 12), the technology of the present disclosure is not limited thereto. For example, the control device 38 may be realized by an FPGA. Alternatively, the control device 38 may be realized by a computer including a CPU, a ROM, and a RAM. Alternatively, the control device 38 may be realized by a combination of two or more of the ASIC 120, the FPGA, and the computer. That is, the control device 38 may be realized by a combination of a hardware configuration and a software configuration.

The transport device 34 is a device that selectively transports the magnetic tape MT in a forward direction and a backward direction, and comprises a feeding motor 40, a winding reel 42, a winding motor 44, a plurality of guide rollers GR, and the control device 38. Here, the forward direction indicates a feeding direction of the magnetic tape MT, and the backward direction indicates a rewinding direction of the magnetic tape MT.

The feeding motor 40 rotates the cartridge reel 18 provided in the magnetic tape cartridge 10 under the control of the control device 38. The control device 38 controls the feeding motor 40 to control a rotation direction, a rotation speed, rotation torque, and the like of the cartridge reel 18.

In a case where the magnetic tape MT is wound on (loaded into) the winding reel 42, the control device 38 rotates the feeding motor 40 such that the magnetic tape MT runs in the forward direction. A rotation speed, rotation torque, and the like of the feeding motor 40 are adjusted according to a speed of the magnetic tape MT to be wound on the winding reel 42.

The winding motor 44 rotates the winding reel 42 under the control of the control device 38. The control device 38 controls the winding motor 44 to control a rotation direction, a rotation speed, rotation torque, and the like of the winding reel 42.

In a case where the magnetic tape MT is wound on the winding reel 42, the control device 38 rotates the winding motor 44 such that the magnetic tape MT runs in the forward direction. A rotation speed, rotation torque, and the like of the winding motor 44 are adjusted according to the speed of the magnetic tape MT to be wound on the winding reel 42. The rotation speed, the rotation torque, and the like of each of the feeding motor 40 and the winding motor 44 are adjusted in this manner by the control device 38, whereby tension is applied to the magnetic tape MT. The feeding motor 40 and the winding motor 44 are an example of a "tension applying mechanism" according to the technology of the present disclosure.

In a case of rewinding (unloading) the magnetic tape MT onto the cartridge reel 18, the control device 38 rotates the feeding motor 40 and the winding motor 44 such that the magnetic tape MT runs in the backward direction.

In the present embodiment, the tension applied to the magnetic tape MT is controlled by controlling the rotation speed, the rotation torque, and the like of the feeding motor 40 and the winding motor 44, but the technology of the present disclosure is not limited thereto. For example, the tension applied to the magnetic tape MT may be controlled by using a dancer roller or may be controlled by drawing the magnetic tape MT into a vacuum chamber.

Each of the plurality of guide rollers GR is a roller that guides the magnetic tape MT. A running path of the magnetic tape MT is determined by separately disposing the plurality of guide rollers GR at positions straddling the magnetic head 36 between the magnetic tape cartridge 10 and the winding reel 42.

The magnetic head 36 comprises a magnetic element unit 46 and a holder 48. The magnetic element unit 46 is held by the holder 48 so as to come into contact with the running magnetic tape MT. The magnetic element unit 46 has servo reading elements SR1 and SR2, which will be described later, and data magnetic elements DRW1, DRW2, DRW3, DRW4, DRW5, DRW6, DRW7, and DRW8, which will be described later. The magnetic element unit 46 records data on the magnetic tape MT transported by the transport device 34, reads data from the magnetic tape MT transported by the transport device 34, or reads a servo pattern 51 (see FIG. 14) from the magnetic tape MT transported by the transport device 34.

The magnetic tape drive 30 comprises a noncontact reading and writing device 50. The noncontact reading and writing device 50 is disposed below the magnetic tape cartridge 10 so as to directly face the back surface 26A of the cartridge memory 19 in a state in which the magnetic tape cartridge 10 is loaded. The state in which the magnetic tape cartridge 10 is loaded in the magnetic tape drive 30 indicates, for example, a state in which the magnetic tape cartridge 10 has reached a position determined in advance as a position where data reading of the magnetic head 36 with respect to the magnetic tape MT starts.

In the example shown in FIG. 5, although an aspect example in which the noncontact reading and writing device 50 is mounted on the magnetic tape drive 30 is shown, the technology of the present disclosure is not limited thereto. The noncontact reading and writing device 50 is also used in a stage in which the magnetic tape cartridge 10 is manufactured, a stage in which the magnetic tape cartridge 10 is inspected, or a stage in which the magnetic tape cartridge 10 is shipped. In this case, for example, a stationary or portable noncontact reading and writing device 50 is used. In the following description, only in a case where a distinction is needed, the noncontact reading and writing device 50 mounted on the magnetic tape drive 30 is denoted by the noncontact reading and writing device 50A, and the stationary or portable noncontact reading and writing device 50 that is used in a stage in which the magnetic tape cartridge 10 is manufactured, a stage in which the magnetic tape cartridge 10 is inspected, or a stage in which the magnetic tape cartridge 10 is shipped is denoted by the noncontact reading and writing device 50B.

Figure 6:
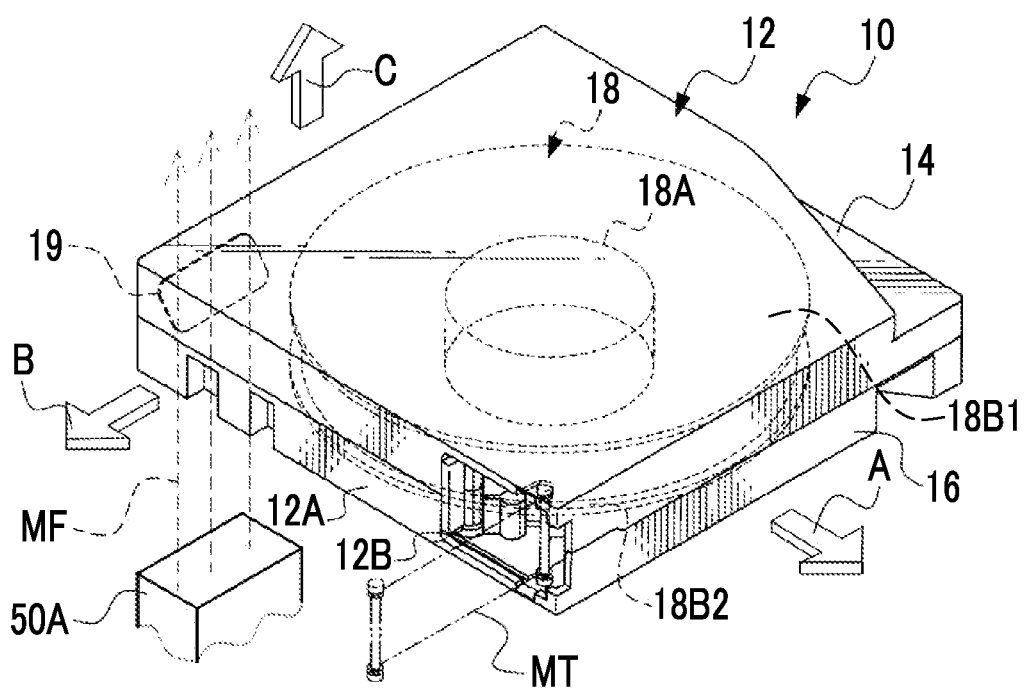
FIG. 6 is a schematic perspective view showing an example of an aspect in which a magnetic field is emitted from below the magnetic tape cartridge by a noncontact reading and writing device.

As shown in FIG. 6 as an example, the noncontact reading and writing device 50A emits the magnetic field MF from below the magnetic tape cartridge 10 toward the cartridge memory 19. The magnetic field MF passes through the cartridge memory 19.

Figure 7:
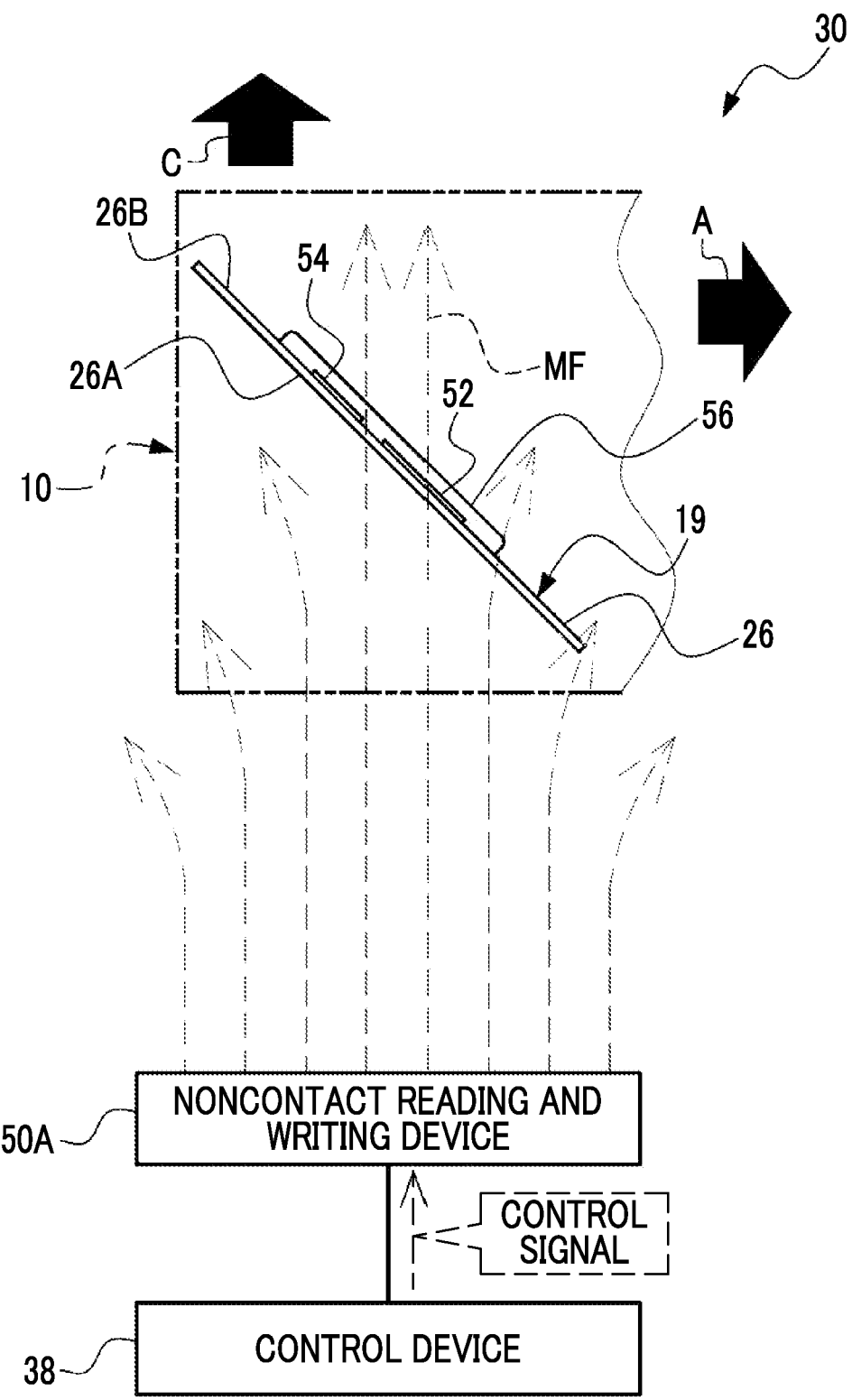
FIG. 7 is a conceptual diagram showing an example of an aspect in which a magnetic field is applied from the noncontact reading and writing device to a cartridge memory provided in the magnetic tape cartridge.

As shown in FIG. 7 as an example, the noncontact reading and writing device 50A is connected to the control device 38. The control device 38 outputs a control signal to the noncontact reading and writing device 50A. The control signal is a signal for controlling the cartridge memory 19. The noncontact reading and writing device 50A emits the magnetic field MF toward the cartridge memory 19 in accordance with the control signal input from the control device 38. The magnetic field MF passes through the cartridge memory 19 from the back surface 26A side to the front surface 26B side.

The noncontact reading and writing device 50A gives a command signal corresponding to the control signal to the cartridge memory 19 by performing noncontact communication with the cartridge memory 19. In more detail, the noncontact reading and writing device 50A spatially transmits the command signal to the cartridge memory 19 under the control of the control device 38. Although details will be described later, the command signal is a signal indicating a command with respect to the cartridge memory 19.

Here, an aspect example in which the noncontact reading and writing device 50A spatially transmits the command signal to the cartridge memory 19 under the control of the control device 38 has been described, but the technology of the present disclosure is not limited thereto. The noncontact reading and writing device 50B spatially transmits the command signal to the cartridge memory 19 under the control of a control device different from the control device 38, for example, in a stage in which the magnetic tape cartridge 10 is manufactured, a stage in which the magnetic tape cartridge 10 is inspected, or a stage in which the magnetic tape cartridge 10 is shipped.

In a case where the command signal is spatially transmitted from the noncontact reading and writing device 50A to the cartridge memory 19, the command signal corresponding to an instruction from the control device 38 is included in the magnetic field MF by the noncontact reading and writing device 50A. In other words, the command signal is superimposed on the magnetic field MF by the noncontact reading and writing device 50A. That is, the noncontact reading and writing device 50A transmits the command signal to the cartridge memory 19 via the magnetic field MF under the control of the control device 38.

An IC chip 52 and a capacitor 54 are mounted on the front surface 26B of the cartridge memory 19. The IC chip 52 and the capacitor 54 adhere to the front surface 26B. Further, the IC chip 52 and the capacitor 54 are sealed by a sealing material 56 on the front surface 26B of the cartridge memory 19. Here, as the sealing material 56, an ultraviolet curable resin that is cured by reacting with ultraviolet rays is employed. The ultraviolet curable resin is merely an example, and a photocurable resin that is cured by reacting with light in a wavelength range other than ultraviolet rays may be used as the sealing material 56, a thermosetting resin may be used as the sealing material 56, or other adhesives may be used as the sealing material 56.

Figure 8:
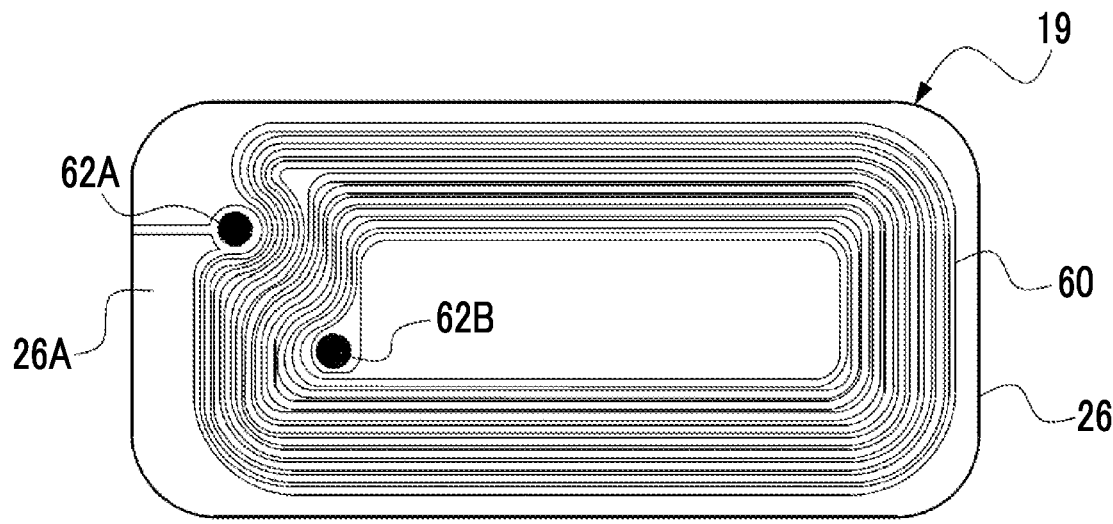
FIG. 8 is a schematic bottom view showing an example of a structure of a back surface of a substrate of the cartridge memory provided in the magnetic tape cartridge.

As shown in FIG. 8 as an example, a coil 60 is formed in a loop shape on the back surface 26A of the cartridge memory 19. Here, copper foil is employed as a material of the coil 60. The copper foil is merely an example, and, for example, other types of conductive materials, such as aluminum foil, may be used. The coil 60 induces an induced current with application of the magnetic field MF (see FIGS. 6 and 7) from the noncontact reading and writing device 50.

A first conduction portion 62A and a second conduction portion 62B are provided on the back surface 26A of the cartridge memory 19. The first conduction portion 62A and the second conduction portion 62B have solder and electrically connect both end parts of the coil 60 to the IC chip 52 (see FIGS. 7 and 9) and the capacitor 54 (see FIGS. 7 and 9) of the front surface 26B.

Figure 9:
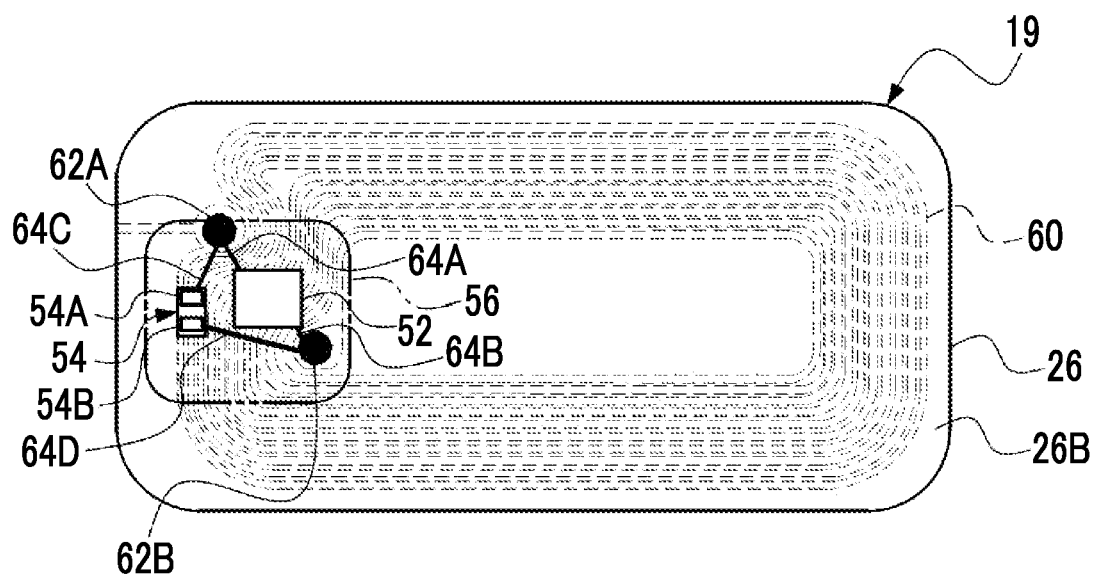
FIG. 9 is a schematic plan view showing an example of a structure of a front surface of the substrate of the cartridge memory provided in the magnetic tape cartridge.

As shown in FIG. 9 as an example, on the front surface 26B of the cartridge memory 19, the IC chip 52 and the capacitor 54 are electrically connected to each other using a wire connection method. Specifically, one terminal of a positive electrode terminal and a negative electrode terminal of the IC chip 52 is connected to the first conduction portion 62A via a wiring line 64A, and the other terminal is connected to the second conduction portion 62B via a wiring line 64B. Further, the capacitor 54 has a pair of electrodes. In the example shown in FIG. 9, the pair of electrodes are electrodes 54A and 54B. The electrode 54A is connected to the first conduction portion 62A via a wiring line 64C, and the electrode 54B is connected to the second conduction portion 62B via a wiring line 64D. With this, the IC chip 52 and the capacitor 54 are connected in parallel with the coil 60.

Figure 10:
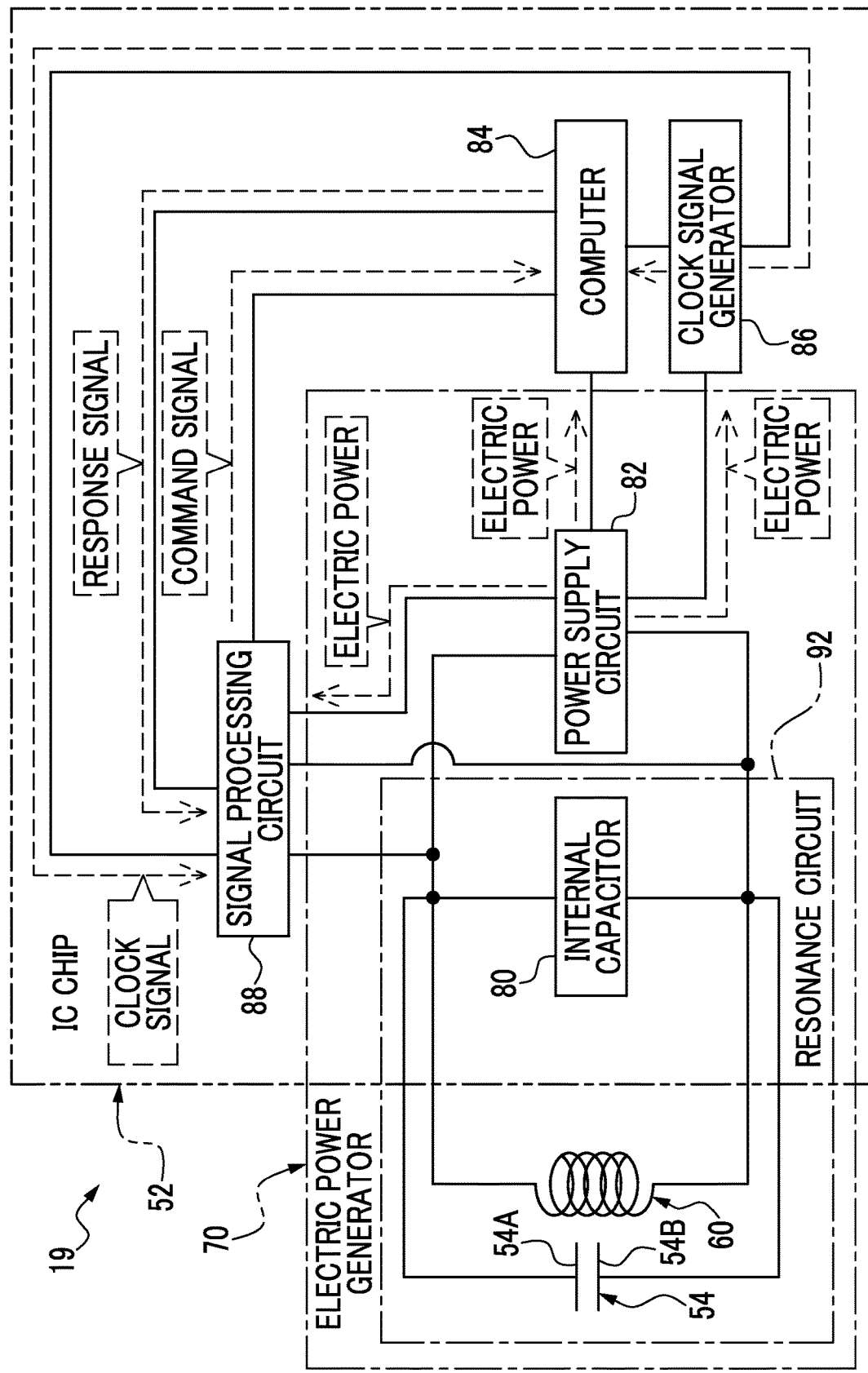
FIG. 10 is a schematic circuit diagram showing an example of a circuit configuration of the cartridge memory provided in the magnetic tape cartridge.

As shown in FIG. 10 as an example, the IC chip 52 comprises an internal capacitor 80, a power supply circuit 82, a computer 84, a clock signal generator 86, and a signal processing circuit 88. The IC chip 52 is a general-purpose IC chip that is usable for applications other than the magnetic tape cartridge 10.

The cartridge memory 19 comprises an electric power generator 70. The electric power generator 70 generates electric power with the application of the magnetic field MF from the noncontact reading and writing device 50 to the coil 60. Specifically, the electric power generator 70 generates alternating-current power using a resonance circuit 92, and converts the generated alternating-current power into direct-current power to output the direct-current power.

The electric power generator 70 has the resonance circuit 92 and the power supply circuit 82. The resonance circuit 92 comprises the capacitor 54, the coil 60, and the internal capacitor 80. The internal capacitor 80 is a capacitor incorporated in the IC chip 52, and the power supply circuit 82 is also a circuit incorporated in the IC chip 52. The internal capacitor 80 is connected in parallel with the coil 60.

The capacitor 54 is a capacitor externally attached to the IC chip 52. The IC chip 52 is a general-purpose IC chip that is intrinsically usable for applications different from the magnetic tape cartridge 10. For this reason, the capacitance of the internal capacitor 80 may not be enough to realize a resonance frequency required for the cartridge memory 19 used in the magnetic tape cartridge 10. In that respect, in the cartridge memory 19, the capacitor 54 is post-attached to the IC chip 52, as a capacitor having a capacitance value necessary in causing the resonance circuit 92 to resonate at a predetermined resonance frequency with the application of the magnetic field MF. The predetermined resonance frequency is a frequency (for example, 13.56 MHz) corresponding to a frequency of the magnetic field MF, and need only be appropriately decided on the basis of the specification or the like of the cartridge memory 19 and/or the noncontact reading and writing device 50. Further, the capacitance of the capacitor 54 is determined on the basis of a measured value of the capacitance of the internal capacitor 80. Further, here, although an aspect example in which the capacitor 54 is externally attached has been described, the technology of the present disclosure is not limited thereto, and the capacitor 54 may be incorporated in advance into the IC chip 52.

The resonance circuit 92 generates alternating-current power by generating a resonance phenomenon at the predetermined resonance frequency using the induced current induced by the coil 60 with the magnetic field MF passing through the coil 60 and outputs the generated alternating-current power to the power supply circuit 82.

The power supply circuit 82 has a rectifier circuit, a smoothing circuit, and the like. The rectifier circuit is a full-wave rectifier circuit having a plurality of diodes. The full-wave rectifier circuit is merely an example, and a half-wave rectifier circuit may be used. The smoothing circuit includes a capacitor and a resistor. The power supply circuit 82 converts the alternating-current power input from the resonance circuit 92 into direct-current power and supplies various drive elements provided in the IC chip 52 with the direct-current power (hereinafter, also simply referred to as "electric power") obtained by the conversion. Examples of the various drive elements include the computer 84, the clock signal generator 86, and the signal processing circuit 88. In this way, electric power is supplied to various drive elements provided in the IC chip 52 by the electric power generator 70, whereby the IC chip 52 operates using the electric power generated by the electric power generator 70.

The computer 84 controls the operation of the entire cartridge memory 19. The clock signal generator 86 generates a clock signal and outputs the clock signal to the signal processing circuit 88 and the like. The signal processing circuit 88 and the like operate in accordance with the clock signal input from the clock signal generator 86. The clock signal generator 86 changes a frequency of the clock signal in accordance with an instruction of the computer 84.

The signal processing circuit 88 is connected to the resonance circuit 92. The signal processing circuit 88 has a decoding circuit (not shown) and an encoding circuit (not shown). The decoding circuit of the signal processing circuit 88 extracts and decodes the command signal from the magnetic field MF received by the coil 60 and outputs the command signal to the computer 84. The computer 84 outputs a response signal to the command signal to the signal processing circuit 88. That is, the computer 84 executes processing corresponding to the command signal input from the signal processing circuit 88 and outputs a processing result as the response signal to the signal processing circuit 88. In a case where the response signal is input from the computer 84, the encoding circuit of the signal processing circuit 88 encodes the response signal to modulate the response signal and outputs the response signal to the resonance circuit 92. The resonance circuit 92 transmits the response signal input from the encoding circuit of the signal processing circuit 88 to the noncontact reading and writing device 50 via the magnetic field MF.

Figure 11:
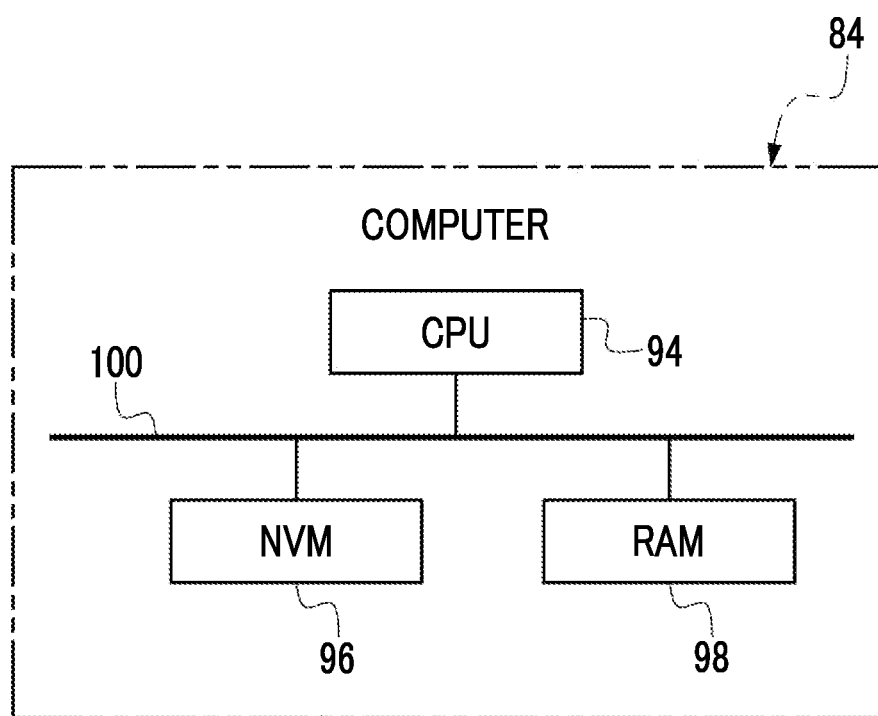
FIG. 11 is a block diagram showing an example of a hardware configuration of an electrical system of a computer of an IC chip mounted on the cartridge memory provided in the magnetic tape cartridge.

As shown in FIG. 11 as an example, the computer 84 comprises a CPU 94, an NVM 96, and a RAM 98. The CPU 94, the NVM 96, and the RAM 98 are connected to a bus 100.

The CPU 94 controls the operation of the computer 84. The NVM 96 is an example of a "storage medium" and an "internal memory" according to the technology of the present disclosure. An example of the NVM 96 includes an EEPROM. The EEPROM is merely an example, and, for example, a ferroelectric memory may be used instead of the EEPROM or any memory may be used as long as the memory is a non-volatile memory that can be mounted on the IC chip 52. The management information and the like are stored in the NVM 96. The RAM 98 temporarily stores various types of information and is used as a work memory. An example of the RAM 98 includes a DRAM or an SRAM.

The CPU 94 selectively performs polling processing, read-out processing, write-in processing, and the like in response to the command signal input from the signal processing circuit 88. The polling processing is processing of establishing communication with the noncontact reading and writing device 50, and is performed, for example, as preparation processing in a pre-stage of the read-out processing and the write-in processing. The read-out processing is processing of reading out the management information and the like from the NVM 96. The write-in processing is processing of writing the management information and the like into the NVM 96.

Figure 12:
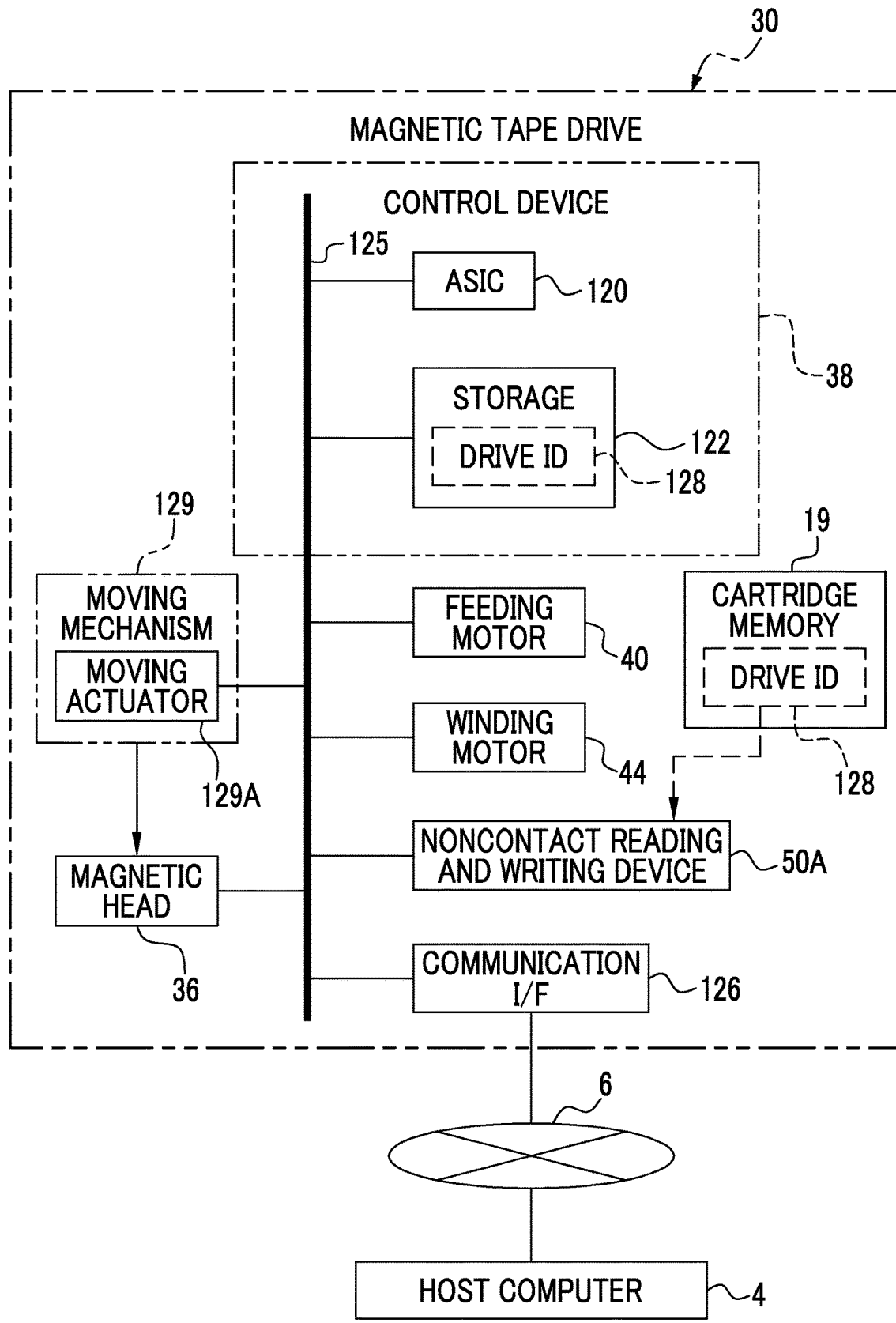
FIG. 12 is a block diagram showing an example of a hardware configuration of an electrical system of the magnetic tape drive.

As shown in FIG. 12 as an example, the control device 38 comprises the ASIC 120 and a storage 122. The ASIC 120 and the storage 122 are connected to a bus 125. This connection method is merely an example, and various devices, such as the storage 122, may be individually and directly connected to the ASIC 120. In addition, the feeding motor 40, the winding motor 44, and the noncontact reading and writing device 50A are also connected to the bus 125. The ASIC 120 controls the feeding motor 40 and the winding motor 44. The feeding motor 40 and the winding motor 44 selectively transport the magnetic tape MT in the forward direction and the backward direction under the control of the ASIC 120. Further, the feeding motor 40 and the winding motor 44 apply tension within an allowable range to the magnetic tape MT and adjust the tension applied to the magnetic tape MT within the allowable range, under the control of the ASIC 120.

Here, the allowable range indicates a range obtained in advance by, for example, a computer simulation and/or a test with a real machine, as a range of tension at which recording and/or reading of data through the magnetic head 36 can be performed without problems. The allowable range is defined in, for example, a table format, and may be updated each time a new product of the magnetic tape cartridge 10 is released, may be changed according to, for example, an instruction given from the outside and/or a predetermined conditions, or may be fixed.

The ASIC 120 controls the noncontact reading and writing device 50A. The noncontact reading and writing device 50A transmits the command signal to the cartridge memory 19 under the control of the ASIC 120. Further, the noncontact reading and writing device 50A receives the response signal which is transmitted from the cartridge memory 19 in response to the command signal transmitted to the cartridge memory 19.

The magnetic tape drive 30 comprises a communication I/F 126. The communication I/F 126 is also connected to the bus 125. The communication I/F 126 is connected to the communication network 6 and is in charge of communication between the ASIC 120 and the host computer 4.

A drive ID 128 capable of specifying a magnetic tape drive 30 other than the magnetic tape drive 30 shown in FIG. 12 is stored in the cartridge memory 19, and the drive ID 128 in the cartridge memory 19 is read out by the noncontact reading and writing device 50A. Then, the ASIC 120 temporarily stores the drive ID 128 read out from the cartridge memory 19 by the noncontact reading and writing device 50A in the storage 122. The ASIC 120 reads out the drive ID 128 from the storage 122 and transmits the read-out drive ID 128 to the host computer 4 via the communication I/F 126. Although details will be described later, the host computer 4 stores information regarding the characteristics of each of the plurality of magnetic tape drives 30 (hereinafter, also referred to as "drive characteristic information"). The host computer 4 holds the drive characteristic information and the drive ID 128 in a one-to-one correspondence state. The host computer 4 receives the drive ID 128 transmitted from the magnetic tape drive 30, and transmits the drive characteristic information regarding the received drive ID 128 to the magnetic tape drive 30 which is a transmission source of the drive ID 128. The magnetic tape drive 30 receives the drive characteristic information transmitted from the host computer 4 through the communication I/F 126. The ASIC 120 executes various types of processing in accordance with the drive characteristic information received through the communication I/F 126.

The magnetic head 36 is also connected to the bus 125, and the ASIC 120 controls the magnetic head 36. The magnetic head 36 performs a data recording operation of recording data on the magnetic tape MT, a data reading operation of reading data from the magnetic tape MT, a servo reading operation of reading the servo pattern 51 (see FIG. 14) from the magnetic tape MT, and the like, under the control of the ASIC 120.

The magnetic tape drive 30 comprises a moving mechanism 129. The moving mechanism 129 has a moving actuator 129A. Examples of the moving actuator 129A include a voice coil motor and/or a piezoelectric actuator. The moving actuator 129A is connected to the bus 125, and the ASIC 120 controls the moving actuator 129A. The moving actuator 129A generates power under the control of the ASIC 120. The moving mechanism 129 operates by receiving the power generated by the moving actuator 129A. The ASIC 120 performs a servo control using the moving mechanism 129. Here, the servo control indicates a control to move the magnetic head 36 in the width direction of the magnetic tape MT by operating the moving mechanism 129 in accordance with the servo pattern 51 read from the magnetic tape MT through the servo reading operation.

Figure 13:
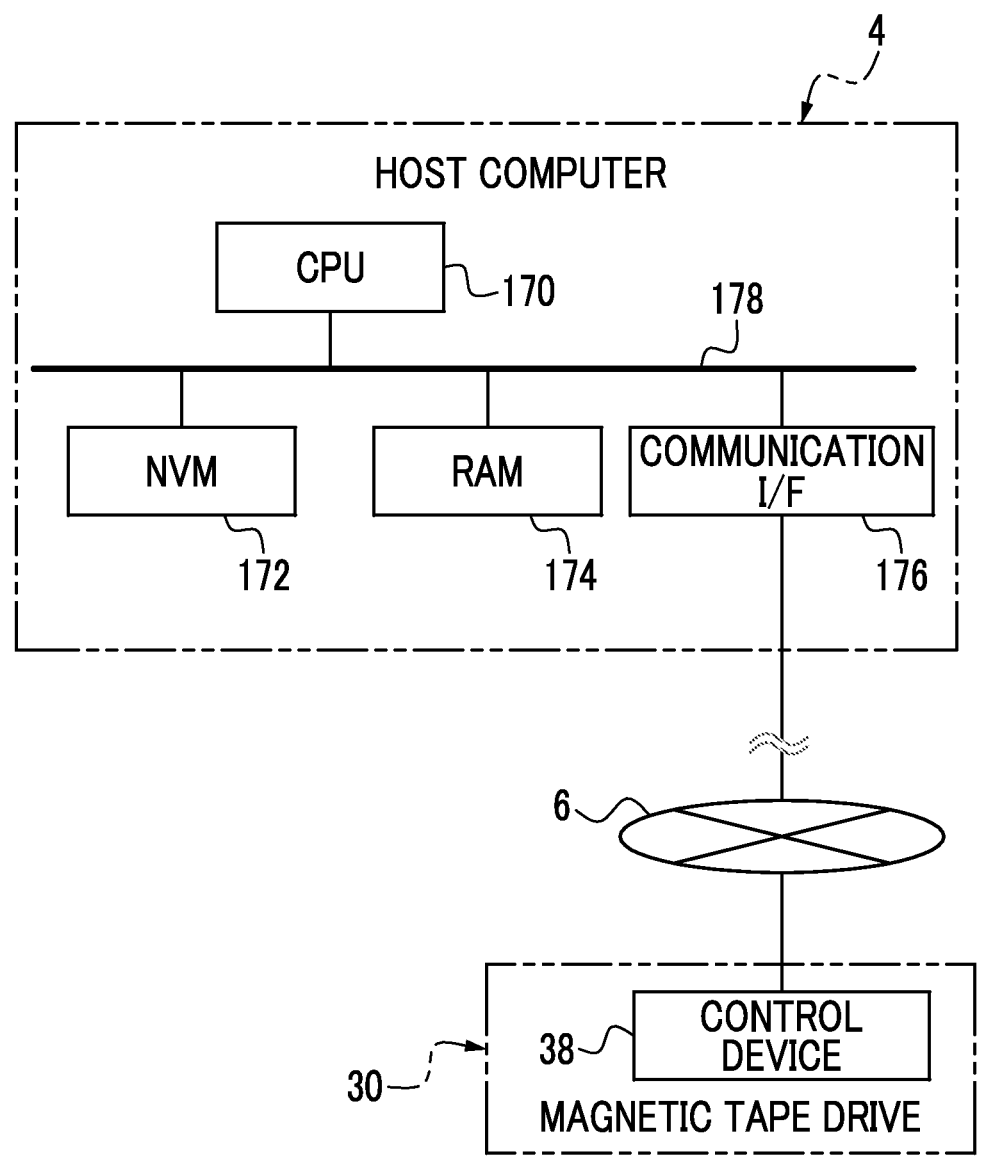
FIG. 13 is a block diagram showing an example of a hardware configuration of an electrical system of a host computer.

As shown in FIG. 13 as an example, the host computer 4 comprises a CPU 170, an NVM 172, a RAM 174, and a communication I/F 176. The CPU 170, the NVM 172, the RAM 174, and the communication I/F 176 are connected to a bus 178.

The CPU 170 controls the operation of the host computer 4. An example of the NVM 172 includes an SSD. The SSD is merely an example, and, for example, an EEPROM and/or an HDD may be used, or any memory may be used as long as the memory is a non-volatile memory. The RAM 174 temporarily stores various types of information and is used as a work memory. An example of the RAM 174 includes a DRAM or an SRAM. The communication I/F 176 is connected to the communication network 6 and is in charge of communication between the CPU 170 and the control device 38 of the magnetic tape drive 30.

Figure 14:
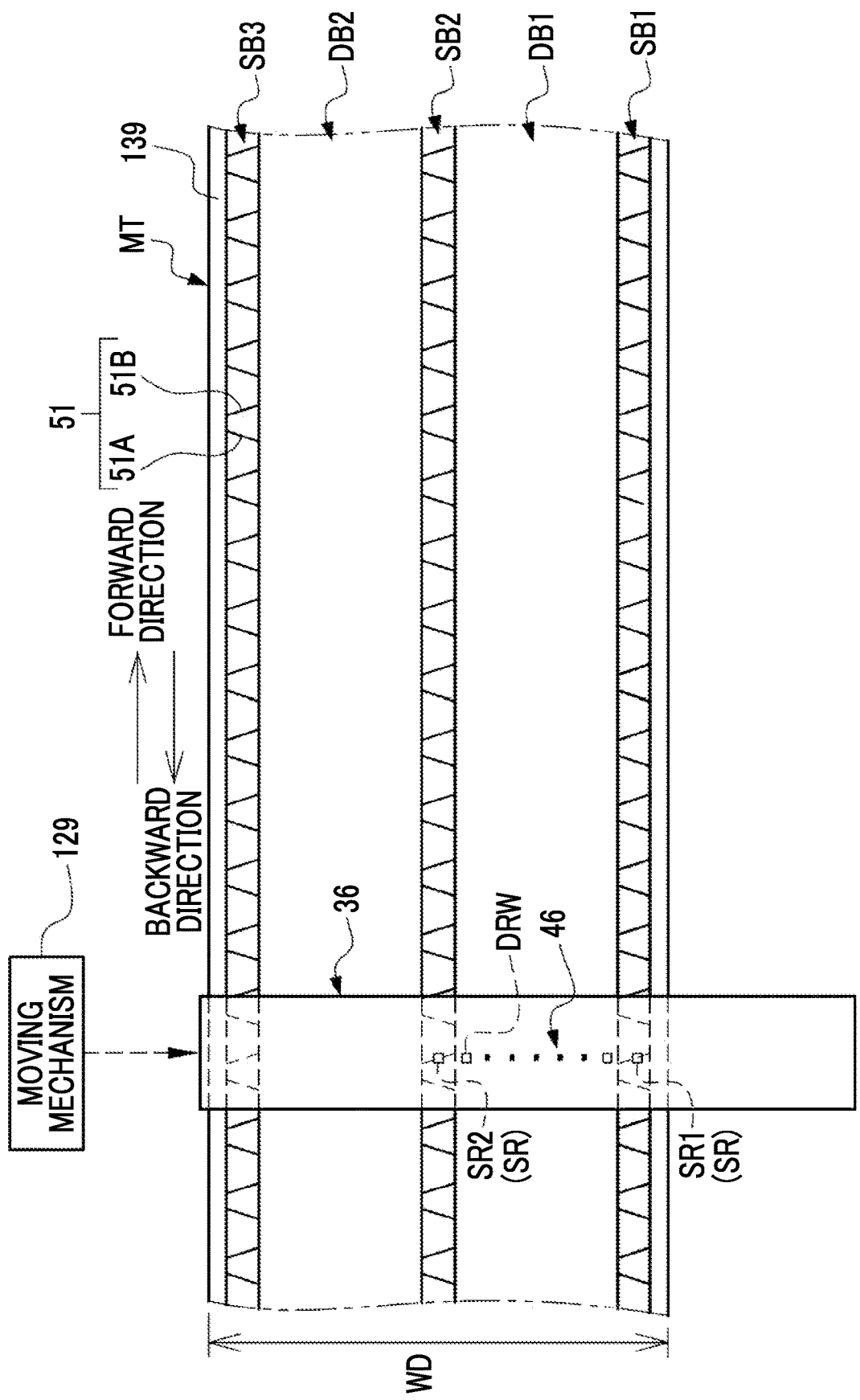
FIG. 14 is an enlarged conceptual diagram showing an example of an aspect of a part of a front surface of a magnetic tape.

As shown in FIG. 14 as an example, servo bands SB1, SB2, and SB3 and data bands DB1 and DB2 are formed on a front surface 139 of the magnetic tape MT. Hereinafter, in a case where a particular distinction is not necessary, for convenience of description, the servo bands SB1 to SB3 are referred to as a servo band SB, and the data bands DB1 and DB2 are referred to as a data band DB.

The servo bands SB1 to SB3 and the data bands DB1 and DB2 are formed along the entire length direction of the magnetic tape MT. Here, the entire length direction of the magnetic tape MT indicates, in other words, a longitudinal direction (the forward direction and the backward direction) of the magnetic tape MT.

The servo bands SB1 to SB3 are arranged at positions spaced apart from each other in a width direction WD of the magnetic tape MT. For example, the servo bands SB1 to SB3 are arranged at equal intervals along the width direction WD. In the present embodiment, "equal interval" indicates an equal interval in a meaning including an error that is generally allowed in the technical field to which the technology of the present disclosure belongs, and an error to such an extent not contrary to the gist of the technology of the present disclosure, in addition to the perfect equal interval.

The data band DB1 is disposed between the servo band SB1 and the servo band SB2, and the data band DB2 is disposed between the servo band SB2 and the servo band SB3. That is, the servo band SB and the data band DB are alternately arranged along the width direction WD of the magnetic tape MT.

In the servo band SB, the servo patterns 51 are formed at preset intervals along the entire length direction of the magnetic tape MT. The servo pattern 51 has magnetization regions 51A and 51B. The magnetization regions 51A and 51B are a pair of linear magnetization regions tilted line-symmetrically with respect to a virtual straight line along the width direction WD. The magnetization regions 51A and 51B are formed so as to be non-parallel to each other and be tilted by a preset angle in directions opposite to each other on the entire length direction side of the magnetic tape MT.

In the example shown in FIG. 14, although three servo bands SB and two data bands DB are shown, this is merely an example, and two servo bands SB and one data band DB may be used, or the technology of the present disclosure is established even with four or more servo bands SB and three or more data bands DB.

The magnetic element unit 46 in the magnetic head 36 has a plurality of magnetic elements. In the example shown in FIG. 14, a plurality of servo reading elements SR and a plurality of data magnetic elements DRW are shown as the plurality of magnetic elements. The magnetic head 36 is formed so as to be wider than the magnetic tape MT along a lengthwise direction. For example, a length in the lengthwise direction of the magnetic head 36 is a length enough to cover at least the magnetic tape MT along the width direction WD in a case where reading and writing of data are performed with respect to any data band DB of the magnetic tape MT by the magnetic element unit 46. The plurality of servo reading elements SR and the plurality of data magnetic elements DRW are provided at a central portion in plan view of the magnetic head 36, and are linearly disposed at intervals along the width direction WD.

In the example shown in FIG. 14, the servo reading elements SR1 and SR2 are illustrated as the plurality of servo reading elements SR. Hereinafter, in a case where a particular distinction is not necessary for description, for convenience of description, the servo reading elements SR1 and SR2 are denoted by a servo reading element SR.

The servo reading element SR is provided at a position corresponding to the servo band SB. In the example shown in FIG. 14, the servo reading element SR1 is provided at a position corresponding to the servo band SB1, and the servo reading element SR2 is provided at a position corresponding to the servo band SB2. The moving mechanism 129 moves the magnetic head 36 in the width direction WD in accordance with the servo pattern 51 read by the servo reading element SR, under the control of the ASIC 120 (see FIG. 12).

Further, in a case where the data band DB in which reading and writing of data are to be performed by the magnetic element unit 46 is changed (in the example shown in FIG. 14, in a case where the data band DB in which reading and writing of data are to be performed by the magnetic element unit 46 is changed from one to the other of the data bands DB1 and DB2), the moving mechanism 129 changes a position of the servo reading element SR by moving the magnetic head 36 in the width direction WD under the control of the ASIC 120 (see FIG. 12). That is, the moving mechanism 129 moves the magnetic head 36 in the width direction WD to move the servo reading element SR1 from one to the other of a position corresponding to the servo band SB1 and a position corresponding to the servo band SB2 and to move the servo reading element SR2 from one to the other of a position corresponding to the servo band SB2 and a position corresponding to the servo band SB3. Then, a tracking control is performed, whereby reading and writing are performed with respect to a designated location in the data band DB by at least one data magnetic element DRW.

The plurality of data magnetic elements DRW are provided between the servo reading element SR1 and the servo reading element SR2. That is, the plurality of data magnetic elements DRW are provided between adjacent servo reading elements SR. The plurality of data magnetic elements DRW are disposed at intervals along the width direction WD (for example, at equal intervals along the width direction WD). Data recording and data reading are performed with respect to the data band DB between the adjacent servo bands SB by the plurality of data magnetic elements DRW.

For example, as shown in FIG. 14, in a case where the position of the servo reading element SR1 corresponds to the position of the servo band SB1 and the position of the servo reading element SR2 corresponds to the position of the servo band SB2, the plurality of data magnetic elements DRW record data on the data band DB1 and read data from the data band DB1.

In the example shown in FIG. 14, three servo bands SB are formed on the magnetic tape MT, but this is merely an example. For example, two servo bands SB may be formed on the magnetic tape MT, or four or more servo bands SB may be formed on the magnetic tape MT. Further, the servo reading element SR may be provided in the magnetic head 36 at a position corresponding to the servo band SB by the number of the servo band SB.

Figure 15:
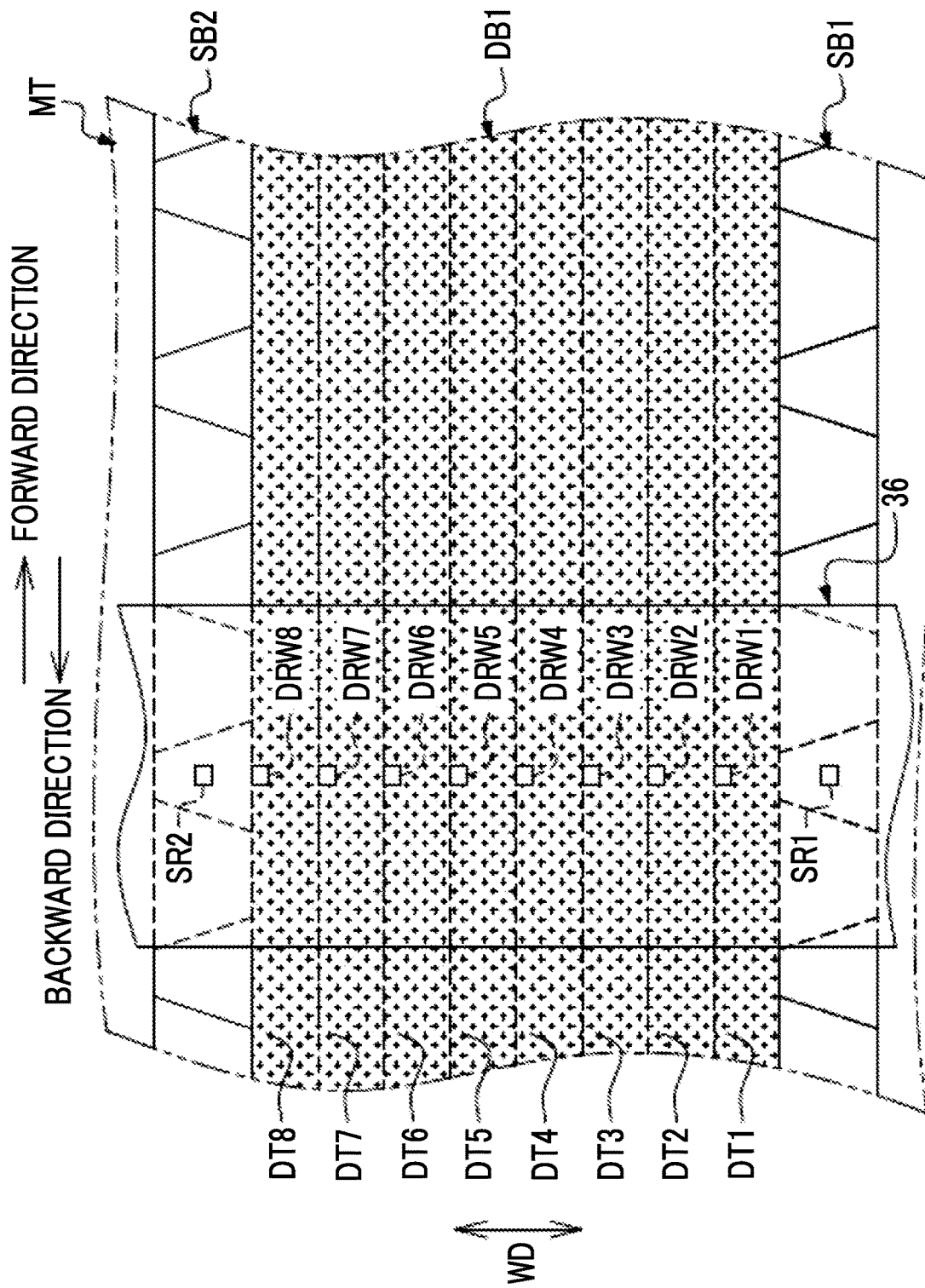
FIG. 15 is a conceptual diagram showing an example of a configuration of a data band formed on the front surface of the magnetic tape.

As shown in FIG. 15 as an example, data tracks DT1, DT2, DT3, DT4, DT5, DT6, DT7, and DT8 are formed in the data band DB1. The magnetic head 36 has, as the plurality of data magnetic elements DRW, data magnetic elements DRW1, DRW2, DRW3, DRW4, DRW5, DRW6, DRW7, and DRW8 provided between the servo reading element SR1 and the servo reading element SR2 along the width direction WD. The data magnetic elements DRW1 to DRW8 correspond to the data tracks DT1 to DT8 on a one-to-one basis, and data recording and data reading can be performed with respect to the data tracks DT1 to DT8.

Further, although not shown, a plurality of data tracks DT corresponding to the data tracks DT1, DT2, DT3, DT4, DT5, DT6, DT7, and DT8 are also formed in the data band DB2.

Hereinafter, in a case where a particular distinction is not necessary, the data tracks DT1, DT2, DT3, DT4, DT5, DT6, DT7, and DT8 are denoted by a "data track DT". In addition, hereinafter, in a case where a particular distinction is not necessary, the data magnetic elements DRW1, DRW2, DRW3, DRW4, DRW5, DRW6, DRW7, and DRW8 are denoted by a data magnetic element DRW. Further, hereinafter, in a case where a particular distinction is not necessary, the data tracks DT1 to DT8 are collectively denoted by a data track DT.

Figure 16:
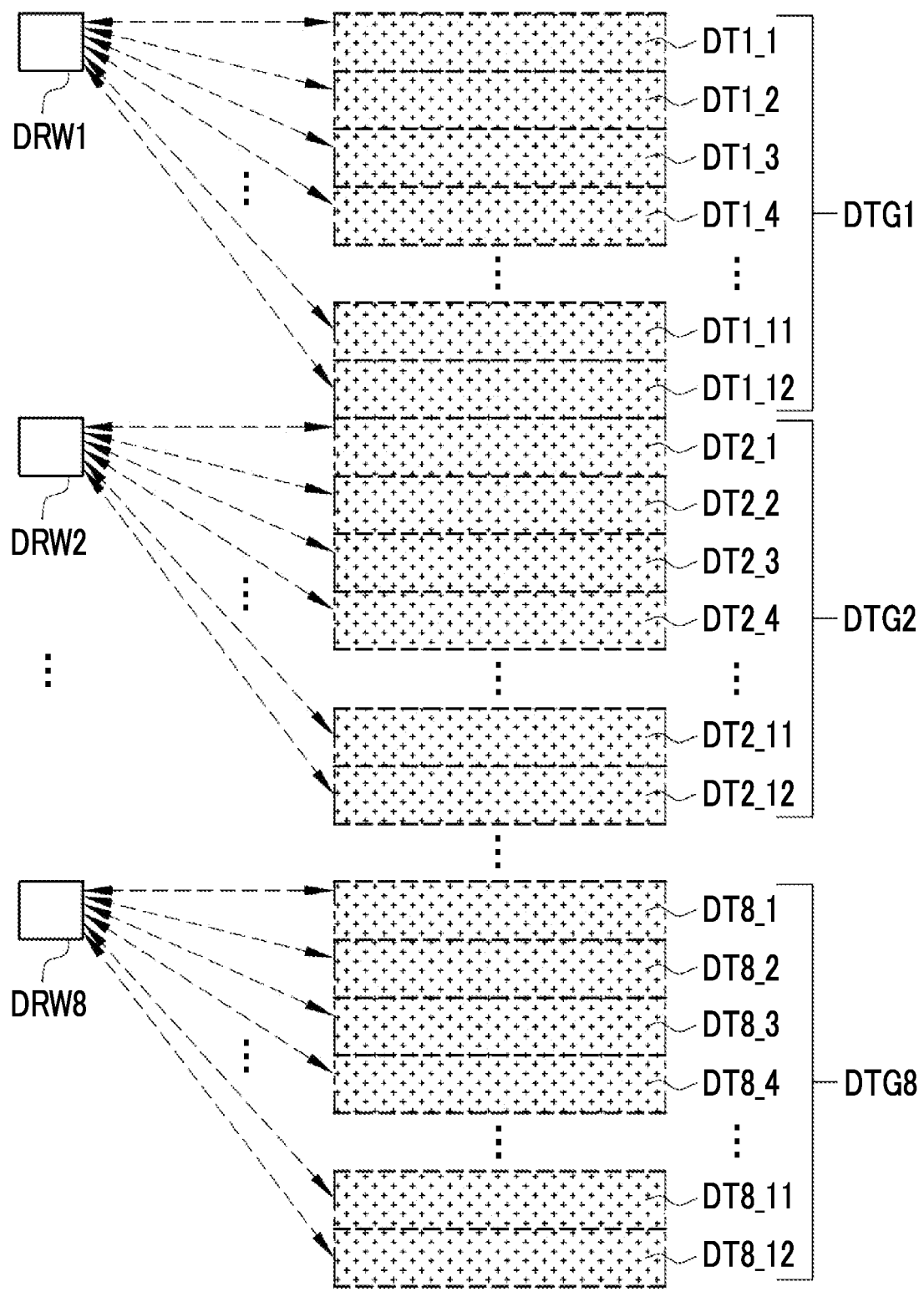
FIG. 16 is a conceptual diagram showing an example of a correspondence relationship between a data magnetic element and a data track.

As shown in FIG. 16 as an example, the data track DT has a data track group DTG. The data tracks DT1 to DT8 correspond to data track groups DTG1 to DTG8. Hereinafter, in a case where a particular distinction is not necessary for description, the data track groups DTG1 to DTG8 are denoted by a "data track group DTG".

The data track group DTG1 includes data tracks DT1_1, DT1_2, DT1_3, DT1_4, . . . , DT1_11, and DT1_12. The data magnetic element DRW1 is in charge of recording data on the data track group DTG1, that is, recording data on the data tracks DT1_1, DT1_2, DT1_3, DT1_4, . . . , DT1_11, and DT1_12. In addition, the data magnetic element DRW1 is in charge of reading data from the data track group DTG1, that is, reading data from the data tracks DT1_1, DT1_2, DT1_3, DT1_4, . . . , DT1_11, and DT1_12.

Each of the data magnetic elements DRW2 to DRW8 is in charge of recording data on the data track group DTG of the data track DT corresponding to each data magnetic element DRW and of reading data from the data track group DTG of the data track DT corresponding to each data magnetic element DRW, as in the data magnetic element DRW1.

The data magnetic element DRW is moved to a position corresponding to one designated data track DT among the plurality of data tracks DT with the movement of the magnetic head 36 in the width direction WD through the moving mechanism 129 (see FIG. 14). The data magnetic element DRW stays at the position corresponding to the one designated data track DT through the servo control using the servo pattern 51.

Specifically, in a case of performing data recording or data reading with respect to the data track DT1_1, the moving mechanism 129 moves the magnetic head 36 in the width direction WD to move the data magnetic element DRW1 onto the position of the data track DT1_1 (for example, a position directly facing the data track DT1_1 of the magnetic tape MT).

Figure 17:
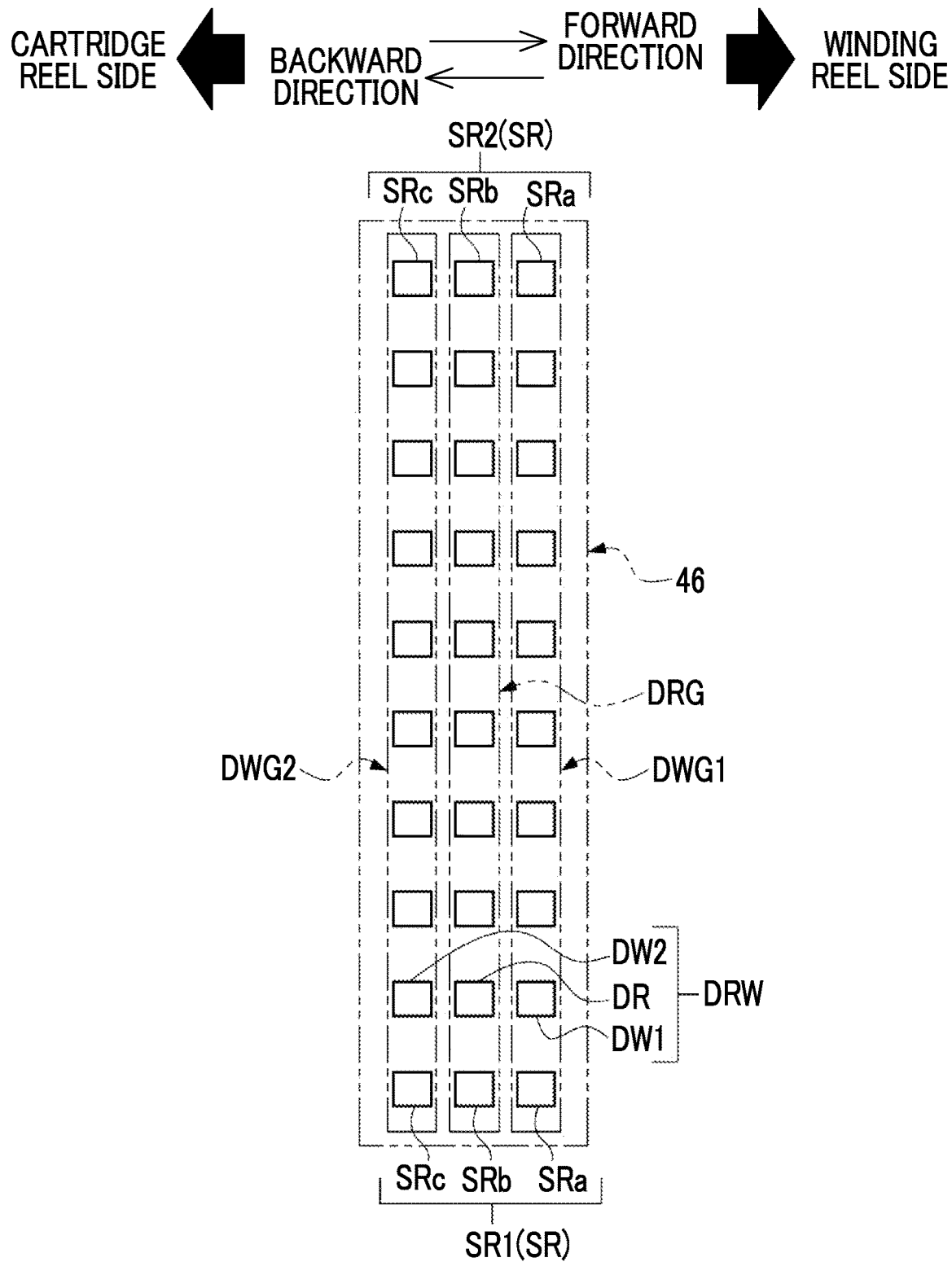
FIG. 17 is a conceptual diagram showing a specific configuration example of a data magnetic element and a specific configuration example of a servo reading element.

As shown in FIG. 17 as an example, the magnetic element unit 46 consists of a first data recording element group DWG1, a second data recording element group DWG2, and a data reading element group DRG. The servo reading element SR1 is located at one end of the magnetic element unit 46, and the servo reading element SR2 is located at the other end of the magnetic element unit 46.

The data magnetic element DRW has a first data recording element DW1, a second data recording element DW2, and a data reading element DR. The first data recording element group DWG1 includes a plurality of the first data recording elements DW1. The second data recording element group DWG2 includes a plurality of the second data recording elements DW2. The data reading element group DRG includes a plurality of the data reading elements DR.

Each of the first data recording element DW1 and the second data recording element DW2 records data on the data track DT. The data reading element DR reads data from the data track DT. Hereinafter, in a case where a particular distinction is not necessary for description, the first data recording element DW1 and the second data recording element DW2 are referred to as a data recording element DW.

The first data recording element group DWG1, the second data recording element group DWG2, and the data reading element group DRG are arranged at constant intervals in the order of the first data recording element group DWG1, the data reading element group DRG, and the second data recording element group DWG2, from the winding reel 42 side to the cartridge reel 18 side along the entire length direction of the magnetic tape MT. Here, the constant interval indicates, for example, an interval predetermined by a test with a real machine and/or a computer simulation as an interval at which crosstalk does not occur between the data reading element DR and the data recording element DW. In addition, the term "constant" here means completely constant, and also means substantially constant including an error that is allowed in the technical field to which the technology of the present disclosure belongs and an error within a range that does not depart from the gist of the technology of the present disclosure.

The servo reading element SR has a first servo reading element SRa, a second servo reading element SRb, and a third servo reading element SRc. The first servo reading element SRa, the second servo reading element SRb, and the third servo reading element SRc are provided in the order of the first servo reading element SRa, the second servo reading element SRb, and the third servo reading element SRc, from the winding reel 42 side to the cartridge reel 18 side in the entire length direction of the magnetic tape MT.

Here, although the first servo reading element SRa, the second servo reading element SRb, and the third servo reading element SRc are illustrated, the technology of the present disclosure is not limited thereto, and one or two among the first servo reading element SRa, the second servo reading element SRb, and the third servo reading element SRc may be used.

The first data recording element group DWG1 has the first servo reading element SRa of the servo reading element SR1, the first servo reading element SRa of the servo reading element SR2, and the plurality of first data recording elements DW1. The plurality of first data recording elements DW1 are linearly arranged from the first servo reading element SRa side of the servo reading element SR1 to the first servo reading element SRa side of the servo reading element SR2. In the example shown in FIG. 17, eight first data recording elements DW1 are illustrated as the plurality of first data recording elements DW1, and these first data recording elements DW1 correspond to the data magnetic elements DRW1, DRW2, DRW3, DRW4, DRW5, DRW6, DRW7, and DRW8 (see FIG. 15).

The second data recording element group DWG2 has the third servo reading element SRc of the servo reading element SR1, the third servo reading element SRc of the servo reading element SR2, and the plurality of second data recording elements DW2. The plurality of second data recording elements DW2 are linearly arranged from the third servo reading element SRc side of the servo reading element SR1 to the third servo reading element SRc side of the servo reading element SR2. In the example shown in FIG. 17, eight second data recording elements DW2 are illustrated as the plurality of second data recording elements DW2, and these second data recording elements DW2 correspond to the data magnetic elements DRW1, DRW2, DRW3, DRW4, DRW5, DRW6, DRW7, and DRW8 (see FIG. 15).

The data reading element group DRG has the second servo reading element SRb of the servo reading element SR1, the second servo reading element SRb of the servo reading element SR2, and the plurality of data reading elements DR. The plurality of data reading elements DR are linearly arranged from the second servo reading element SRb side of the servo reading element SR1 to the second servo reading element SRb side of the servo reading element SR2. In the example shown in FIG. 17, eight data reading elements DR are illustrated as the plurality of data reading elements DR, and these data reading elements DR correspond to the data magnetic elements DRW1, DRW2, DRW3, DRW4, DRW5, DRW6, DRW7, and DRW8 (see FIG. 15).

The data reading element DR has a structure in which the data reading element DR is interposed between the first data recording element DW1 and the second data recording element DW2 along the entire length direction of the magnetic tape MT in the magnetic element unit 46 in order not only to cause the data reading element DR to read data from the data track DT but also to realize the verification. For example, in a case where the magnetic tape MT is pulled out from the magnetic tape cartridge 10 (in a case where the running direction of the magnetic tape MT is the forward direction), the second data recording element DW2 records data on the data track DT, and then, the data reading element DR reads, for error checking, the data recorded on the data track DT by the second data recording element DW2. Further, in a case where the magnetic tape MT is rewound onto the magnetic tape cartridge 10 (in a case where the running direction of the magnetic tape MT is the backward direction), the first data recording element DW1 records data on the data track DT, and then, the data reading element DR reads, for error checking, the data recorded on the data track DT by the first data recording element DW1.

Figure 18:
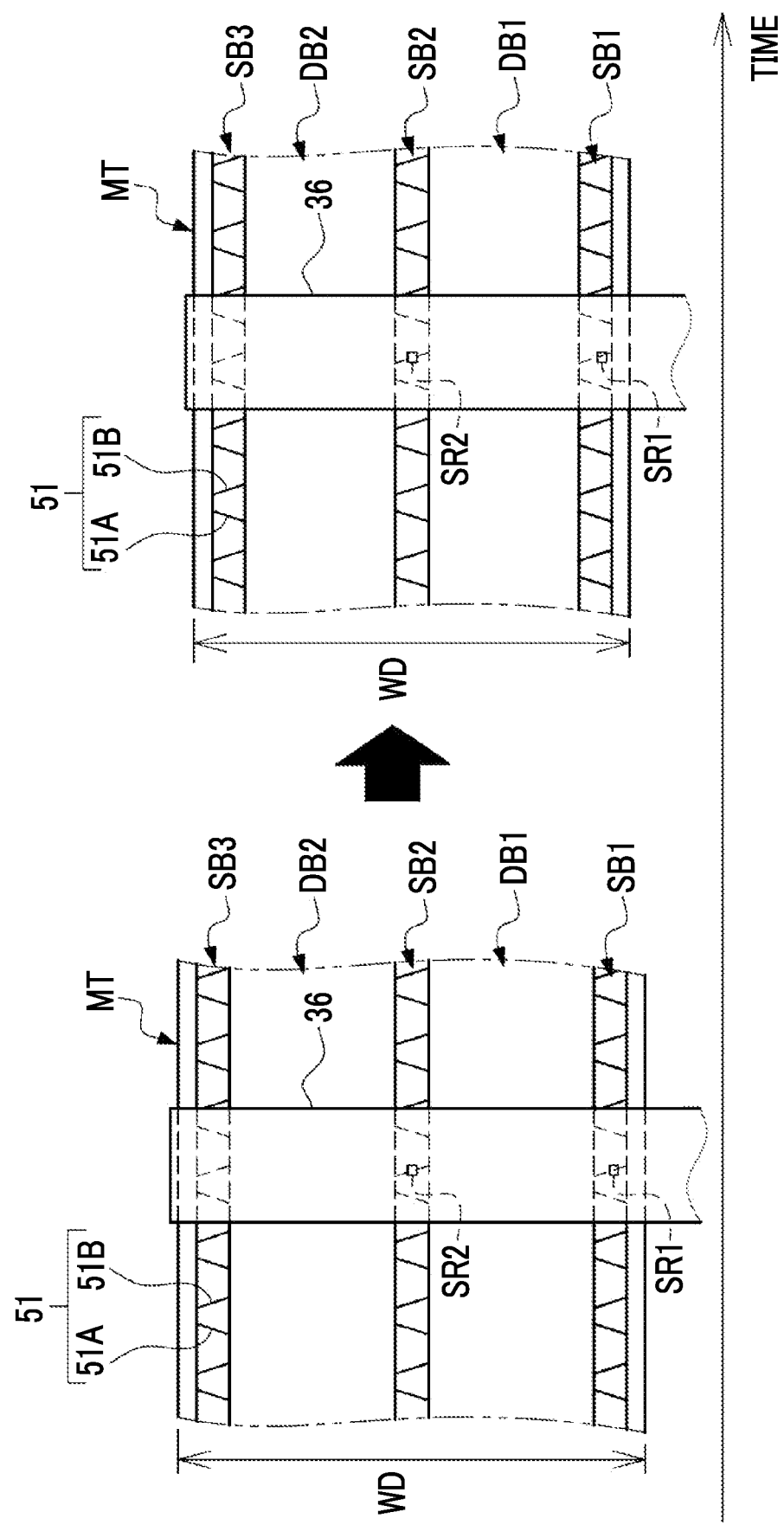
FIG. 18 is a conceptual diagram showing an example of an aspect in which a width of the magnetic tape contracts with passage of time.

Meanwhile, as shown in FIG. 18 as an example, the width of the magnetic tape MT on which the plurality of servo bands SB are formed contracts with the passage of time. In the example shown in FIG. 18, an aspect in which the width of the magnetic tape MT in the width direction WD contracts is shown, but conversely, the width of the magnetic tape MT in the width direction WD may expand. As factors that cause the width of the magnetic tape MT to contract or expand, a storage environment of the magnetic tape MT, a stress applied to the magnetic tape MT loaded in the magnetic tape cartridge 10, and the like are considered.

For example, in a case where the width of the magnetic tape MT in the width direction WD contracts with the passage of time, the position of the servo reading element SR with respect to the servo pattern 51 may deviate from a preset position (for example, a central position of the magnetization region 51A and the magnetization region 51B) determined by design. In a case where the position of the servo reading element SR with respect to the servo pattern 51 deviates from the preset position determined by design, the accuracy of the servo control may be lowered, and the positions of the data magnetic element DRW and of the data track DT may deviate from each other.

Figure 19:
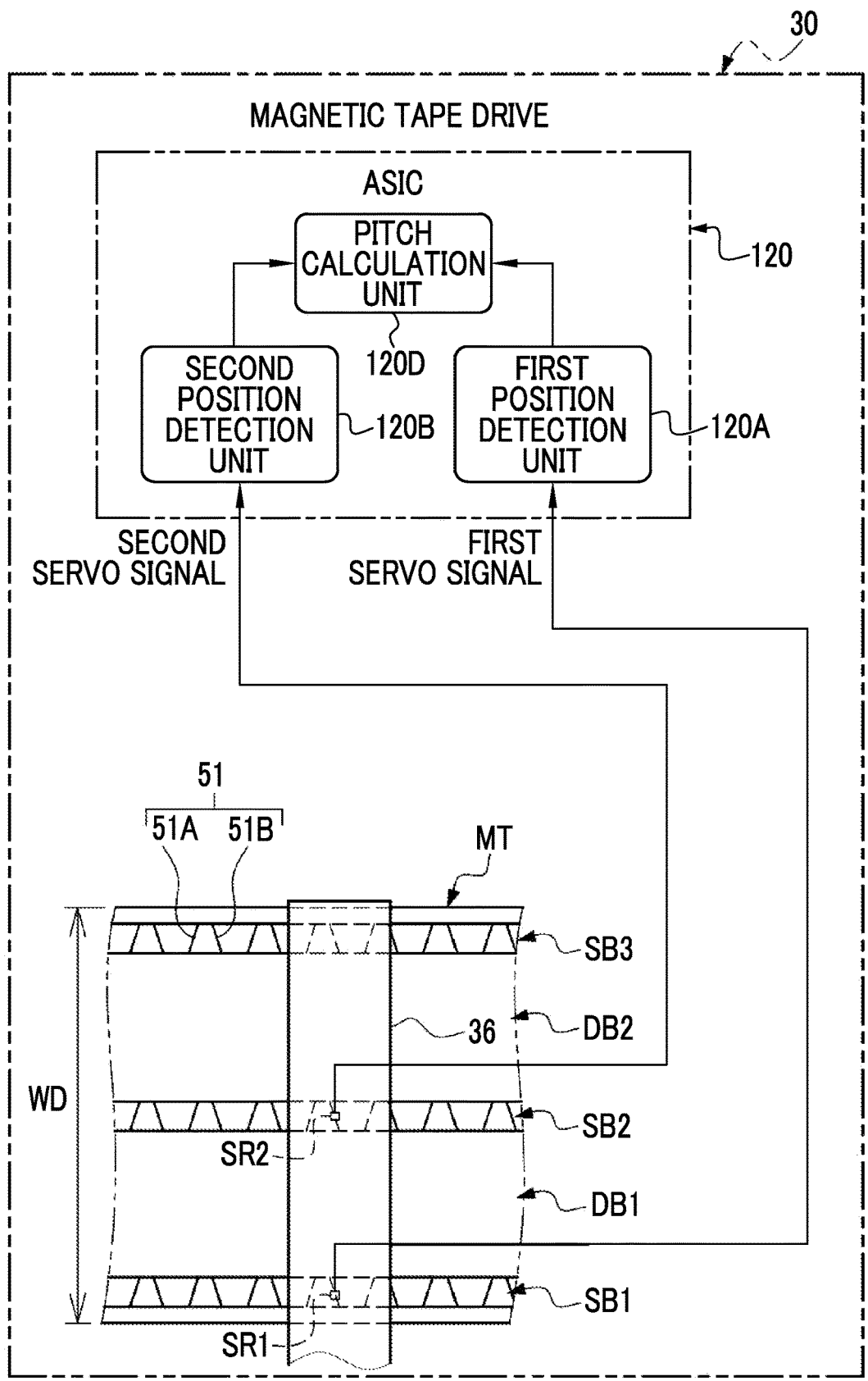
FIG. 19 is a conceptual diagram showing an example of a relationship between three servo reading elements and a function of an ASIC of the magnetic tape drive.

In view of such circumstances, in the magnetic tape system 2, processing shown in FIG. 19 and subsequent drawings is performed. As shown in FIG. 19 as an example, the ASIC 120 of the magnetic tape drive 30 has a first position detection unit 120A, a second position detection unit 120B, and a pitch calculation unit 120D.

A first servo signal (for example, each or any of a plurality of servo signals based on the servo patterns 51 read by the first servo reading element SRa, the second servo reading element SRb, and the third servo reading element SRc provided in the servo reading element SR1) based on the servo patterns 51 of the servo band SB1 read by the servo reading element SR1 is input to the first position detection unit 120A in a stage before data is recorded on the data band DB. The first servo signal is intermittent pulses corresponding to the magnetization regions 51A and 51B of the servo band SB1. The first position detection unit 120A detects, on the basis of the pulse intervals of the first servo signal input from the servo reading element SR1, the position of the servo reading element SR1 in the width direction WD in the servo band SB1 at a plurality of locations (for example, a plurality of locations spaced apart from each other at constant intervals of several meters to several tens of meters) spaced apart from each other over the entire length of the magnetic tape MT, and outputs a detection result to the pitch calculation unit 120D. As the detection result (detected position information), each detection result may be output to the pitch calculation unit 120D in response to the input servo signal, or an average value of the detection results may be output to the pitch calculation unit 120D.

A second servo signal (for example, each or any of a plurality of servo signals based on the servo patterns 51 read by the first servo reading element SRa, the second servo reading element SRb, and the third servo reading element SRc provided in the servo reading element SR2) based on the servo patterns 51 of the servo band SB2 read by the servo reading element SR2 is input to the second position detection unit 120B in a stage before data is recorded on the data band DB. The second servo signal is intermittent pulses corresponding to the magnetization regions 51A and 51B of the servo band SB2. The second position detection unit 120B detects, on the basis of the pulse intervals of the second servo signal input from the servo reading element SR2, the position of the servo reading element SR2 in the width direction WD in the servo band SB2 at a plurality of locations spaced apart from each other over the entire length of the magnetic tape MT, and outputs a detection result to the pitch calculation unit 120D. As the detection result (detected position information), each detection result may be output to the pitch calculation unit 120D in response to the input servo signal, or an average value of the detection results may be output to the pitch calculation unit 120D.

Here, a specific method for detecting the position of the servo reading element SR in the width direction WD in the servo band SB will be described.

FIG. 20 as an example shows one of the servo patterns 51 shown in FIG. 14. The magnetization regions 51A and 51B of the servo pattern 51 are a pair of linear magnetization regions tilted line-symmetrically with respect to a virtual straight line along the width direction WD. Upon reading the magnetization regions 51A and 51B, the servo reading element SR generates respective pulses corresponding to the magnetization regions 51A and 51B. Therefore, in a case where the servo reading element SR reads the servo pattern 51 in a state in which the magnetic tape MT runs in the forward direction or the backward direction, a time difference occurs between the pulse intervals generated by the magnetization regions 51A and 51B because of the position along the width direction WD of the servo reading element SR. The servo pattern 51 does not necessarily have to be a pair of linear shapes tilted line-symmetrically with respect to a virtual straight line along the width direction WD. The servo pattern 51 need only be a pair of non-parallel linear magnetization regions, and, for example, the magnetization region 51A may be parallel with the virtual straight line along the width direction WD, and the magnetization region 51B may be tilted with respect to the virtual straight line along the width direction WD.

Meanwhile, since the rotation speed and the rotation torque of each of the feeding motor 40 and the winding motor 44 are controlled by the ASIC 120, the speed of the magnetic tape MT can be calculated by the ASIC 120.

Therefore, a distance D from the magnetization region 51A to the magnetization region 51B at a position along the width direction WD of the servo reading element SR can be obtained from the pulse interval corresponding to the magnetization regions 51A and 51B and the speed of the magnetic tape MT. The distance D is a distance along the entire length direction of the magnetic tape MT from the magnetization region 51A to the magnetization region 51B.

In the present embodiment, the distance D is defined in advance for each of a plurality of servo positions. The plurality of servo positions indicate, for example, a plurality of positions along the width direction WD of the servo reading element SR in each of the servo bands SB. For example, the servo position is represented by a number arranged in ascending order from "1" for each servo band SB from one end side to the other end side in the width direction WD. The position along the width direction WD of the servo reading element SR in each of the servo bands SB is specified on the basis of the distance D. In the present embodiment, servo pattern distance information 148 is used as information including the distance D defined in advance for each servo position. The servo pattern distance information 148 is stored in the NVM 96 of the magnetic tape cartridge 10 in a stage in which the magnetic tape cartridge 10 is manufactured. The distance D is an example of "distances in an entire length direction of a magnetic tape at a plurality of positions between a pair of magnetization regions constituting a servo pattern formed in each of a plurality of servo bands" according to the technology of the present disclosure. In addition, the servo position is an example of a "plurality of positions in a width direction in a plurality of servo bands" according to the technology of the present disclosure.

Meanwhile, the servo pattern 51 is recorded on the servo band SB of the magnetic tape MT by a servo signal writing head of a servo writer (not shown). As shown in FIG. 21 as an example, it is ideal that the servo pattern 51 on the servo band SB is recorded in a linear shape. However, in practice, because of a processing error of the servo signal writing head, the magnetization regions 51A and 51B of the servo pattern 51 may be curved instead of being linear, as shown in FIG. 21 as an example. For convenience of description, the example of the servo pattern 51 shown in FIG. 21 schematically shows the distortions of the magnetization regions 51A and 51B in an easy-to-understand manner, and emphasizes the distortions more than the actual distortions of the magnetization regions 51A and 51B.

A gap pattern of the servo signal writing head that records the servo pattern 51 in the servo band SB is formed in the servo signal writing head. The gap pattern is a pair of linear patterns as in the servo pattern 51. The pair of patterns of the gap pattern are non-parallel to each other as in the servo pattern 51 and are formed in the servo signal writing head so as to be tilted by a preset angle in directions opposite to each other on the entire length direction side of the magnetic tape MT. That is, a leakage magnetic flux from the gap pattern magnetizes each of the servo bands SB of the magnetic tape MT, whereby the servo pattern 51 having the same shape as the gap pattern is recorded on each of the servo bands SB. Therefore, in a case where the gap pattern is curved because of the processing error of the servo signal writing head, the servo pattern 51 recorded on the magnetic tape MT is also curved. A distance between the pair of patterns along the entire length direction of the magnetic tape MT in the gap pattern of the servo signal writing head is measured, whereby the distance D for each of the plurality of servo positions along the width direction WD in each of the servo bands SB is measured.

Figure 22:
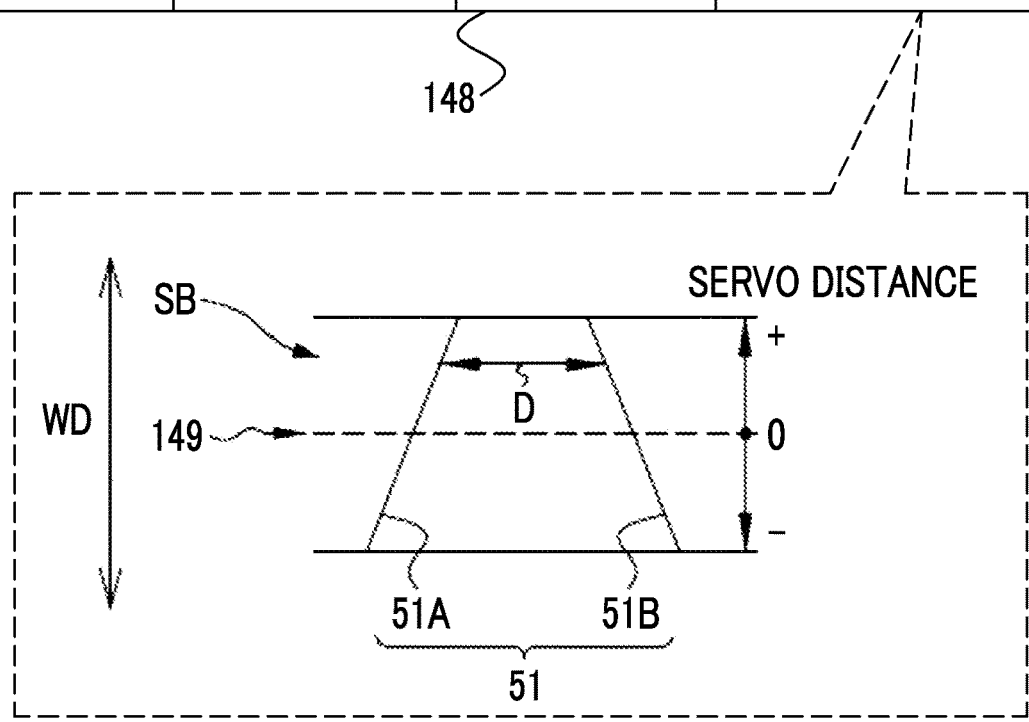
FIG. 22 is a conceptual diagram showing an example of servo pattern distance information.

FIG. 22 as an example shows the servo pattern distance information 148. In the example shown in FIG. 22, as an example of the servo pattern distance information 148, information in which the servo positions, the distances D, and servo distances are determined for each servo band SB is shown. In the example shown in FIG. 22, the servo positions, the distances D, and the servo distances are associated with each other for each identification number that identifies the servo band SB. In other words, in the servo pattern distance information 148, the plurality of servo positions are associated with each servo band SB, and the distance D and the servo distance are associated with each servo position. That is, the servo pattern distance information 148 includes the distance D for each combination of the servo band SB and the servo position, and the servo distance corresponding to each of the servo positions. The servo distance is a distance in the width direction WD corresponding to each servo position with, as a reference, a position of a midpoint 149 in the width direction WD in the servo band SB.

In the example of the servo pattern distance information 148 shown in FIG. 22, although 19 servo positions are set on each of the servo bands SB, there is no limitation on the number of servo positions set on the servo band SB, and the plurality of servo positions need only be set. Further, in the example of the servo pattern distance information 148 shown in FIG. 22, for example, the servo distance of the servo position corresponding to the midpoint 149 in the width direction WD in the servo band SB is set to 0 μm. In addition, the farther the servo position along the width direction WD is from the midpoint 149, the longer the servo distance at each servo position is. In the example of the servo pattern distance information 148 shown in FIG. 22, the servo distance at the servo position where the distance D is shorter than the distance D at the servo position corresponding to the midpoint 149 is represented by a positive value (+), and the servo distance at the servo position where the distance D is longer than the distance D at the servo position corresponding to the midpoint is represented by a negative value (−).

The first position detection unit 120A (see FIG. 19) calculates the distance D from the pulse interval of the first servo signal, and detects the servo position of the servo reading element SR1 corresponding to the calculated distance D by referring to the servo pattern distance information 148.

The second position detection unit 120B (see FIG. 19) calculates the distance D from the pulse interval of the second servo signal, and detects the servo position of the servo reading element SR2 corresponding to the calculated distance D by referring to the servo pattern distance information 148.

The pitch calculation unit 120D calculates pitches between the servo patterns 51 in the width direction WD at the plurality of locations spaced apart from each other over the entire length of the magnetic tape MT, on the basis of the detection result input from each of the first position detection unit 120A and the second position detection unit 120B. The pitch between the servo patterns 51 in the width direction WD indicates a pitch between the servo pattern 51 of the servo band SB1 and the servo pattern 51 of the servo band SB2, and the pitch between the servo pattern 51 of the servo band SB2 and the servo pattern 51 of the servo band SB3.

In the example shown in FIG. 19, an aspect in which the pitch between the servo pattern 51 of the servo band SB1 and the servo pattern 51 of the servo band SB2 is calculated by the pitch calculation unit 120D is shown, but this is merely an example. For example, in a case where the servo reading element SR1 is located on the servo band SB2 and the servo reading element SR2 is located on the servo band SB3 by moving the magnetic head 36 along the width direction WD, the pitch between the servo pattern 51 of the servo band SB2 and the servo pattern 51 of the servo band SB3 can be calculated by the pitch calculation unit 120D on the basis of the first servo signal and the second servo signal.

Hereinafter, in a case where a particular distinction is not necessary for description, the first position detection unit 120A and the second position detection unit 120B are denoted by a position detection unit 121, and the first servo signal and the second servo signal are denoted by a servo signal.

Figures 23, 24:
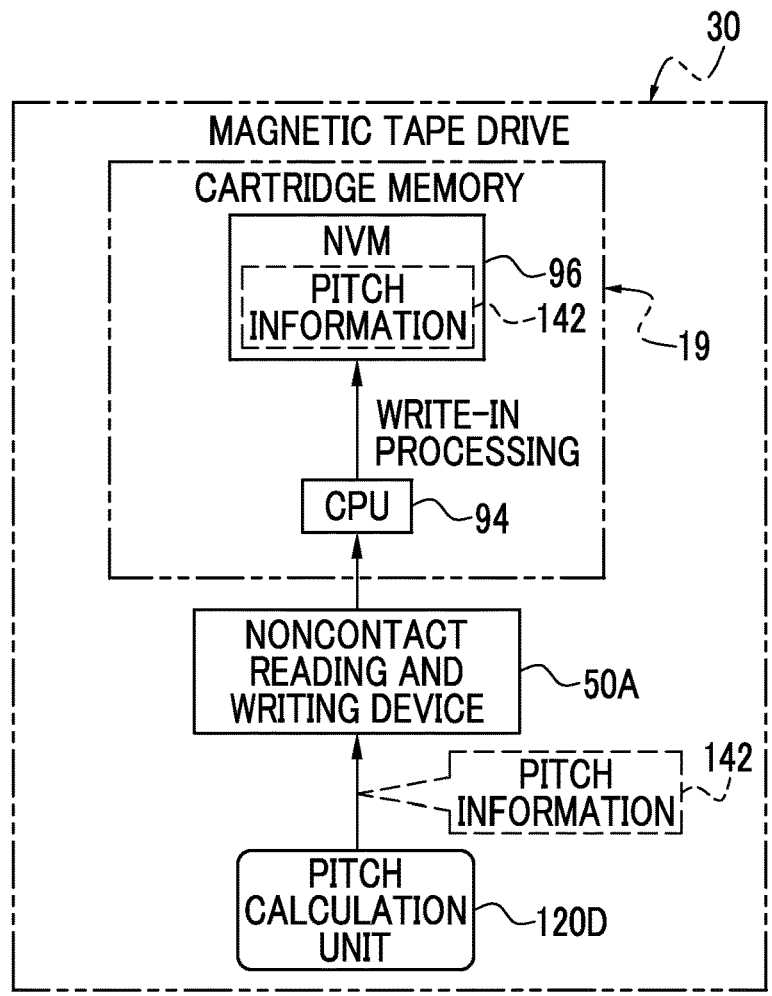
FIG. 23 is a block diagram showing an example of an aspect in which pitch information is stored in an NVM of the cartridge memory.
FIG. 24 is a conceptual diagram showing an example of the pitch information.

As shown in FIG. 23 as an example, the pitch calculation unit 120D outputs, to the noncontact reading and writing device 50A, pitch information 142 (for example, information indicating a pitch itself between the servo bands SB) capable of specifying pitches between the servo bands SB in the width direction WD at the plurality of locations spaced apart from each other over the entire length of the magnetic tape MT. The noncontact reading and writing device 50A spatially transmits a write-in command of the pitch information 142 to the cartridge memory 19 as the command signal in a stage before data is recorded on the data band DB. The CPU 94 performs write-in processing of writing the pitch information 142 into the NVM 96 in response to the command signal from the noncontact reading and writing device 50A. As a result, the pitch information 142 at the plurality of locations spaced apart from each other over the entire length of the magnetic tape MT is stored in the NVM 96. Here, although examples of the stage before data is recorded on the data band DB include a stage in which the magnetic tape cartridge 10 is manufactured, the technology of the present disclosure is not limited thereto, and the stage before data is recorded on the data band DB may be a stage immediately after a user first loads the magnetic tape cartridge 10 into the magnetic tape drive 30 and performs initialization, or each time the magnetic tape cartridge 10 is loaded into the magnetic tape drive 30.

FIG. 24 is a diagram showing an example of the pitch information 142. The pitch information 142 is information in which the servo positions and the pitches are determined for each servo band SB. In the example shown in FIG. 24, the servo positions and the pitches are associated with each other for each identification number that identifies the servo band SB. In other words, in the pitch information 142, the plurality of servo positions are associated with each servo band SB, and the pitch is associated with each servo position. That is, the pitch information 142 includes the pitch for each combination of the servo band SB and the servo position. The pitch information 142 is measured at each of the plurality of locations spaced apart from each other over the entire length of the magnetic tape MT and is stored in the NVM 96.

The pitch information 142 stored in the NVM 96 is information obtained from a reference magnetic tape drive 30 (hereinafter, also referred to as a "reference drive") among the plurality of magnetic tape drives 30. The term "reference drive" as used herein does not mean a standard magnetic tape drive 30 in the world. Any magnetic tape drive 30 can be the "reference drive" for which the pitch can be measured as long as the magnetic tape drive 30 is used for the first time for the magnetic tape cartridge 10.

Figure 25:
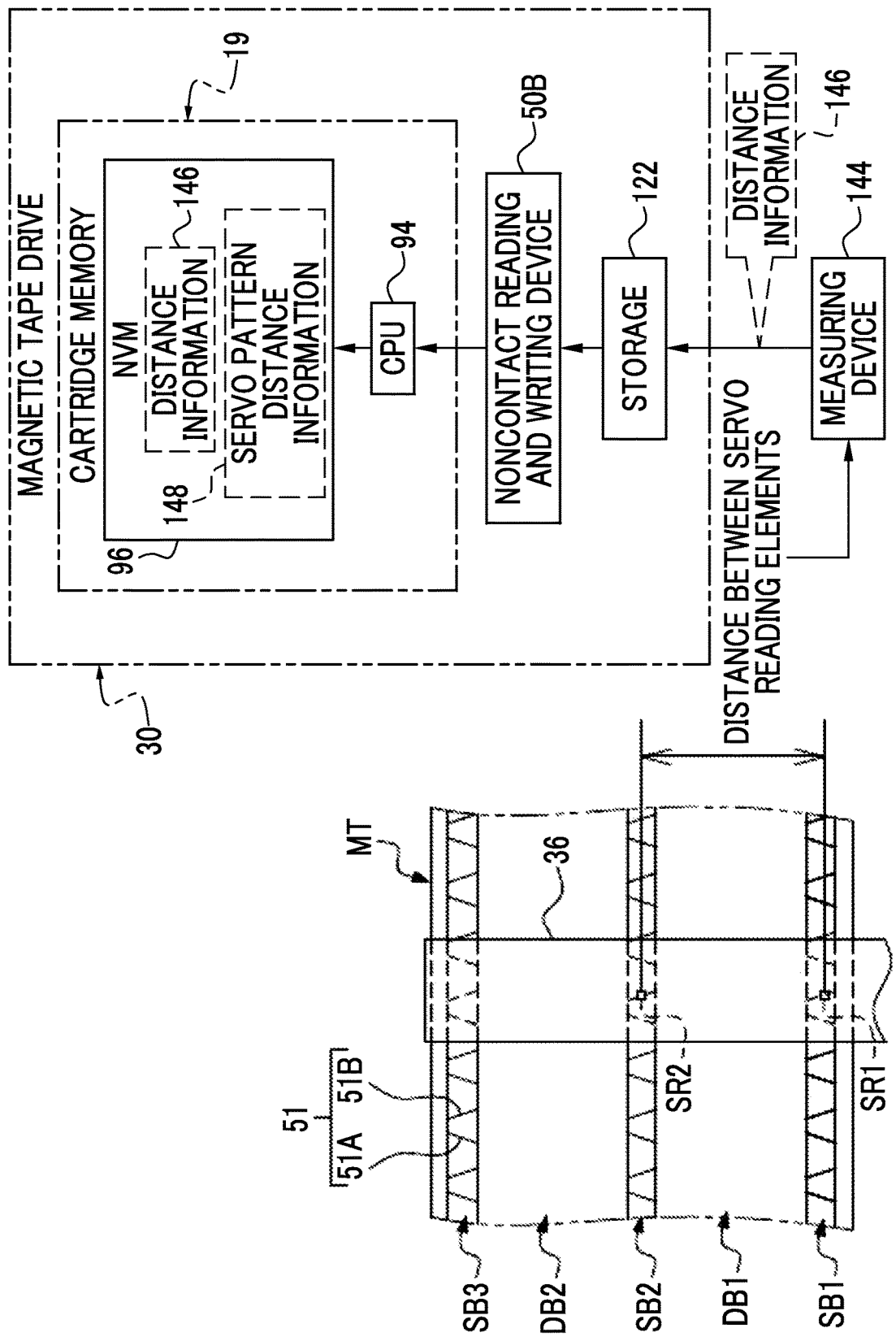
FIG. 25 is a block diagram showing an example of an aspect in which distance information is stored in the NVM of the cartridge memory.

As shown in FIG. 25 as an example, a measuring device 144 measures a distance between the servo reading element SR1 and the servo reading element SR2 (hereinafter, also referred to as a "distance between servo reading elements") in a stage in which the magnetic tape drive 30 is manufactured. Examples of the measuring device 144 include an MFM, a SEM, and a laser microscope. The measuring device 144 stores distance information 146 (for example, information indicating the distance between the servo reading elements itself) capable of specifying the distance between the servo reading elements in the storage 122 of the magnetic tape drive 30. The distance between the servo reading elements is an example of a "distance between a plurality of servo reading elements that have read a plurality of servo bands" according to the technology of the present disclosure. The noncontact reading and writing device 50B reads out the distance information 146 from the storage 122, and spatially transmits a write-in command of the distance information 146 to the cartridge memory 19 as the command signal. The CPU 94 performs write-in processing of writing the distance information 146 into the NVM 96 in response to the command signal from the noncontact reading and writing device 50B. As a result, the distance information 146 is stored in the NVM 96. The distance information 146 stored in the NVM 96 is information obtained by measuring the distance between the servo reading elements of the magnetic head 36 mounted in the reference drive through the measuring device 144.

The magnetic tape drive 30 may generate the pitch information 142 by using the pitch calculated on the basis of the result of reading the plurality of servo bands SB through the plurality of servo reading elements SR and the distance between the plurality of servo reading elements SR in a stage before data recording is performed by the magnetic tape drive 30.

Specifically, the moving mechanism 129 moves the servo reading element SR1 and the servo reading element SR2 to positions on the servo band SB1 and the servo band SB2, at the plurality of locations spaced apart from each other over the entire length of the magnetic tape MT, respectively. The position detection unit 121 calculates the distance D at each position of the servo reading element SR1 and the servo reading element SR2 along the width direction WD in each servo band SB at the plurality of locations, and detects the servo position corresponding to the distance D. The ASIC 120 generates the pitch information 142 for each servo position at the plurality of locations spaced apart from each other over the entire length of the magnetic tape MT by using the servo distances at the servo positions of the servo reading element SR1 and the servo reading element SR2 and the distance between the servo reading elements measured by the measuring device 144. The servo position corresponding to the distance D is an example of a "result of reading a plurality of servo bands through a plurality of servo reading elements" according to the technology of the present disclosure.

For example, it is assumed that the distance between the servo reading elements is 2858.6 μm and the servo distances of the servo reading element SR1 and the servo reading element SR2 are 23.555 μm and 23.455 μm, respectively. In this case, the pitch at the servo positions of the servo reading elements SR is 2858.5 μm (2858.5=2858.6−(23.555−23.455)).

In this way, the ASIC 120 may generate the pitch information 142 shown in FIG. 24 by using the servo distances of the servo reading element SR1 and the servo reading element SR2 at the respective servo positions defined by the servo pattern distance information 148 and the distance between the servo reading elements stored in the storage 122 of the magnetic tape drive 30.

Examples of the method for obtaining the distance between the servo reading elements include a method (hereinafter, referred to as a "method of estimating the distance between the servo reading elements) of using, in a case where a distance between servo reading elements of one of two magnetic tape drives 30 is known and a distance between servo reading elements of the other is unknown, the two magnetic tape drives 30 to measure a pitch between the servo bands SB in the width direction WD of the magnetic tape MT under a constant environment and to estimate the unknown distance between the servo reading elements from the measurement result of the pitch and the known distance between the servo reading elements.

In the method of estimating the distance between the servo reading elements, among the two magnetic tape drives 30 (here, for convenience, referred to as a "drive A" and a "drive B"), a distance between servo reading elements of the drive A is, for example, a known distance between the servo reading elements that has been measured by the MFM, the SEM, the laser microscope, or the like. On the premise of this, first, in a state in which certain tension (hereinafter, for convenience, referred to as "tension T1") is applied to the magnetic tape MT which is loaded in the drive A and on which the servo patterns 51 (see FIG. 14) have been recorded on the servo bands SB, the pitch between the servo bands SB in the width direction WD of the magnetic tape MT in the drive A is measured. Next, in a state in which the tension T1 is applied to the magnetic tape MT loaded in the drive B, the pitch between the servo bands SB in the width direction WD of the magnetic tape MT in the drive B is measured. Then, the pitch between the servo bands SB in the width direction WD of the magnetic tape MT in the drive A and the pitch between the servo bands SB in the width direction WD of the magnetic tape MT in the drive B are compared with each other, and the unknown distance between the servo reading elements, that is, the distance between the servo reading elements of the drive B, is estimated from the comparison result (for example, a difference or a ratio) and the known distance between the servo reading elements.

Figure 26:
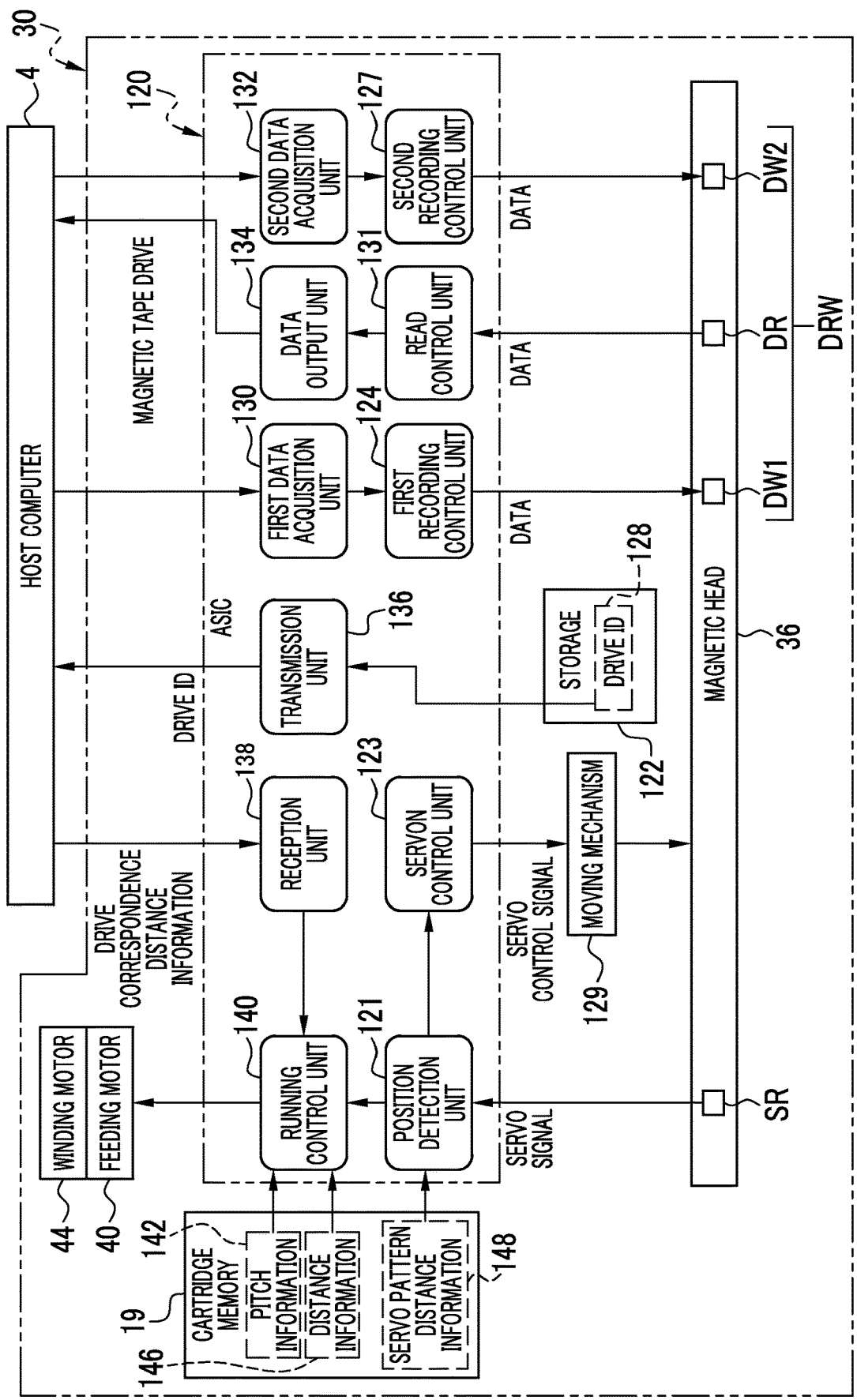
FIG. 26 is a block diagram showing an example of the function of the ASIC of the magnetic tape drive.

In the control device 38 (see FIG. 12) of the magnetic tape drive 30, as shown in FIG. 26 as an example, the ASIC 120 has the position detection unit 121, a servo control unit 123, a first recording control unit 124, a second recording control unit 127, a first data acquisition unit 130, a read control unit 131, a second data acquisition unit 132, a data output unit 134, a transmission unit 136, a reception unit 138, and a running control unit 140. The transmission unit 136 acquires the drive ID 128 from the storage 122 and transmits the acquired drive ID 128 to the host computer 4. Although details will be described later, the host computer 4 receives the drive ID 128 transmitted from the transmission unit 136, and transmits drive correspondence distance information 154 (see FIG. 28) corresponding to the received drive ID 128 to the ASIC 120. The reception unit 138 receives the drive correspondence distance information 154 transmitted from the host computer 4.

The running control unit 140 controls the drive of each of the feeding motor 40 and the winding motor 44 to cause the magnetic tape MT to selectively run in the forward direction and the backward direction. The drive of the feeding motor 40 is controlled in accordance with a feeding motor control signal (not shown), and the drive of the winding motor 44 is controlled in accordance with a winding motor control signal (not shown). The feeding motor control signal and the winding motor control signal are generated by the running control unit 140. The feeding motor control signal is supplied to the feeding motor 40 by the running control unit 140, and the winding motor control signal is supplied to the winding motor 44 by the running control unit 140. Hereinafter, in a case where a particular distinction is not necessary, the feeding motor control signal and the winding motor control signal are referred to as a motor control signal.

The running control unit 140 acquires the pitch information 142 and the distance information 146 from the cartridge memory 19. Although details will be described later, the running control unit 140 adjusts the running speed and the tension of the magnetic tape MT to appropriate values by adjusting the rotation speed and the rotation torque of each of the feeding motor 40 and the winding motor 44 in accordance with the pitch and the distance information 146 at a position of the magnetic head 36 in the width direction WD specified by the pitch information 142 acquired from the cartridge memory 19 and the drive correspondence distance information 154 received by the reception unit 138. The adjustment of the running speed and the tension of the magnetic tape MT is performed for each of the plurality of locations spaced apart from each other over the entire length of the magnetic tape MT. The adjustment of the rotation speed and the rotation torque of each of the feeding motor 40 and the winding motor 44 is realized by correcting the feeding motor control signal and the winding motor control signal in accordance with the pitch information 142, the distance information 146, and the drive correspondence distance information 154 through the running control unit 140.

Two types of servo signals based on the servo patterns 51 read by the servo reading elements SR1 and SR2 are input to the position detection unit 121. The position detection unit 121 detects a position of the servo reading element SR1 in the servo band SB and a position of the servo reading element SR2 in the servo band SB, and calculates an average value of the detected positions. Then, the position detection unit 121 detects the position of the magnetic head 36 in the width direction WD on the basis of the calculated average value.

Further, the servo pattern distance information 148 may be input to the position detection unit 121 from the cartridge memory 19. The position detection unit 121 may use two types of servo signals to calculate the distance D of the servo pattern 51 in each of the servo bands SB read by the servo reading elements SR1 and SR2 and detect the servo positions corresponding to the respective calculated distances D as the position of the servo reading element SR1 in the servo band SB and the position of the servo reading element SR2 in the servo band SB by referring to the servo pattern distance information 148, thereby calculating the average value of the detected positions.

For example, in a case where the servo position of the servo reading element SR1 in the servo band SB1 is "1" and the servo position of the servo reading element SR2 in the servo band SB2 is "3", the servo position represented by "2" is a widthwise position of the magnetic head 36. Although 19 servo positions are set in the example of the servo pattern distance information 148 in FIG. 22, an intermediate value of the servo positions set in the servo pattern distance information 148 may be used by performing an arithmetic operation on the servo positions on the basis of the distance D and the servo pattern distance information 148 in the detection of the servo position.

The position detection unit 121 outputs the detected position of the magnetic head 36 in the width direction WD to the servo control unit 123 and the running control unit 140.

Hereinafter, the detection result of the position of the magnetic head 36 in the width direction WD is simply referred to as a "widthwise position of the magnetic head 36".

The servo control unit 123 compares the detection result of the position of the magnetic head 36 in the width direction WD from the position detection unit 121 with a target position of the magnetic head 36 in the width direction WD. The target position is designated by the ASIC 120 using the servo position, for example, each time recording and/or reading of data is performed with respect to the magnetic tape cartridge 10 in the magnetic tape drive 30.

The servo control unit 123 does nothing in a case where the detection result is the same as the target position. The servo control unit 123 outputs the servo control signal to the moving mechanism 129 in a case where the detection result deviates from the target position. The moving mechanism 129 operates in accordance with the servo control signal input from the servo control unit 123 to match the position of the magnetic head 36 with the target position.

The first data acquisition unit 130 acquires data to be recorded on the data band DB by the magnetic head 36, from the host computer 4. The first data acquisition unit 130 outputs the data acquired from the host computer 4, to the first recording control unit 124.

The first recording control unit 124 encodes the data input from the first data acquisition unit 130 into a digital signal for recording. Then, the first recording control unit 124 supplies a pulse current corresponding to the digital signal to the first data recording element DW1 provided in the magnetic head 36 to cause the first data recording element DW1 to record data on the designated data track DT in the data band DB.

The second data acquisition unit 132 acquires data to be recorded on the data band DB by the magnetic head 36, from the host computer 4. The second data acquisition unit 132 outputs the data acquired from the host computer 4, to the second recording control unit 127. Although the first data acquisition unit 130 and the second data acquisition unit 132 are illustrated here, the technology of the present disclosure is not limited thereto, and one data acquisition unit may be used. In this case, data need only be output to the first recording control unit 124 or the second recording control unit 127 according to the running direction of the magnetic tape MT.

The second recording control unit 127 encodes the data input from the second data acquisition unit 132 into a digital signal for recording. Then, the second recording control unit 127 supplies a pulse current corresponding to the digital signal to the second data recording element DW2 provided in the magnetic head 36 to cause the second data recording element DW2 to record data on the designated data track DT in the data band DB.

The read control unit 131 controls the operation of the data reading element DR of the magnetic head 36 to cause the data reading element DR to read data from the designated data track DT in the data band DB. The data read from the data track DT by the data reading element DR is a pulse-shaped digital signal. The read control unit 131 outputs the pulse-shaped digital signal to the data output unit 134.

The data output unit 134 decodes the pulse-shaped digital signal input from the read control unit 131. The data output unit 134 outputs the data obtained by decoding to a preset output destination (for example, the host computer 4, a display (not shown), and/or a storage device (for example, the storage 122)).

Figure 27:
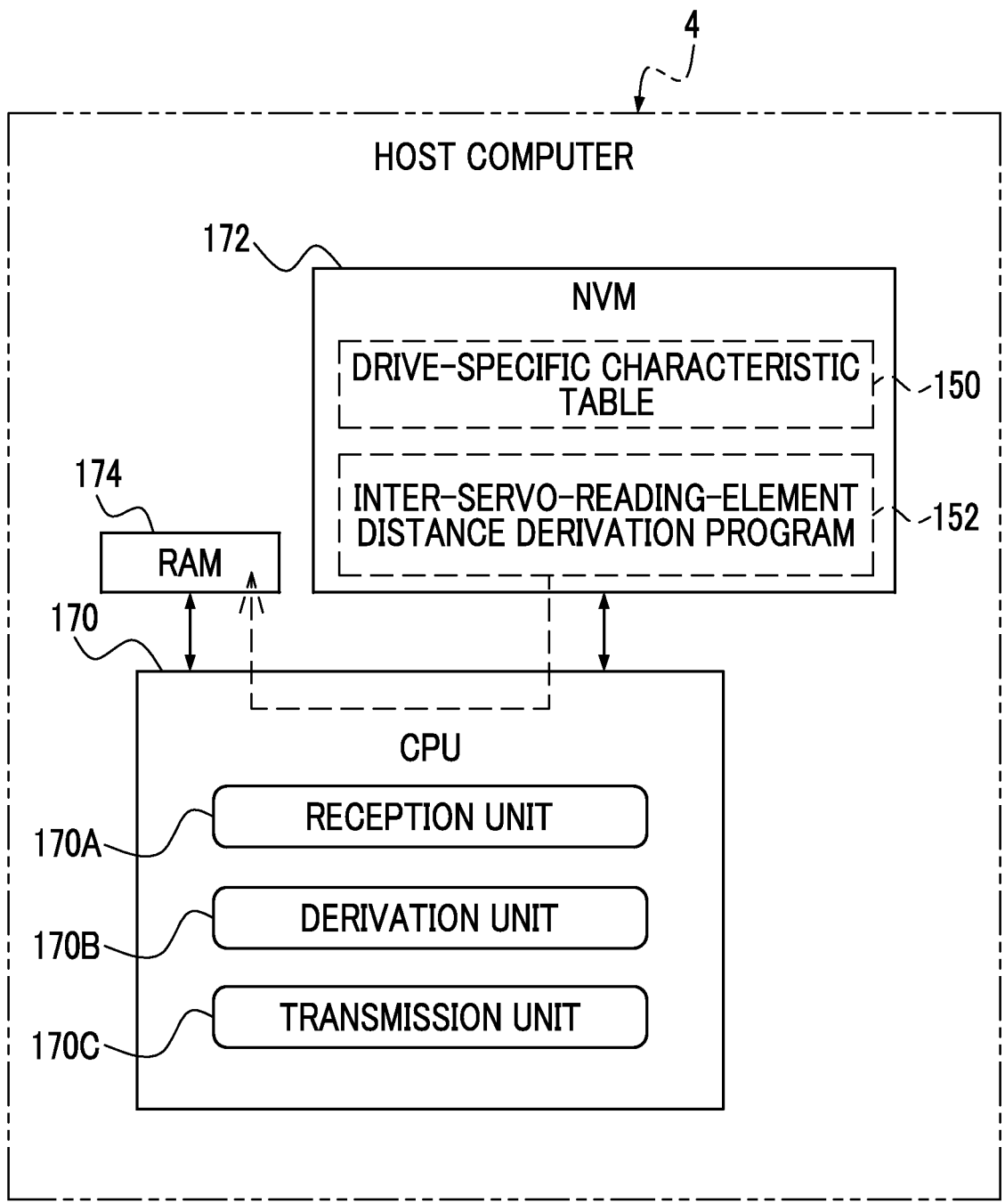
FIG. 27 is a block diagram showing an example of a function of a CPU of the host computer.

As shown in FIG. 27 as an example, in the host computer 4, a drive-specific characteristic table 150 and an inter-servo-reading-element distance derivation program 152 are stored in the NVM 172. Drive characteristic information for each of the plurality of magnetic tape drives 30 is stored in the drive-specific characteristic table 150.

Examples of the drive characteristic information include information indicating the characteristics of the magnetic head 36 (for example, a distance between servo reading elements), information indicating a serial number of the magnetic tape drive 30 and a manufacturing date of the magnetic tape drive 30, information indicating a shipping date of the magnetic tape drive 30, information indicating an inspection date of the magnetic tape drive 30, information indicating the characteristics of the ASIC 120 of the magnetic tape drive 30, information indicating the characteristics of the moving mechanism 129, information indicating the characteristics of the feeding motor 40, information indicating the characteristics of the winding motor 44, and information indicating the characteristics of the noncontact reading and writing device 50A.

The CPU 170 reads out the inter-servo-reading-element distance derivation program 152 from the NVM 172, and executes the read-out inter-servo-reading-element distance derivation program 152 on the RAM 174. The CPU 170 operates as a reception unit 170A, a derivation unit 170B, and a transmission unit 170C by executing the inter-servo-reading-element distance derivation program 152.

Figure 28:
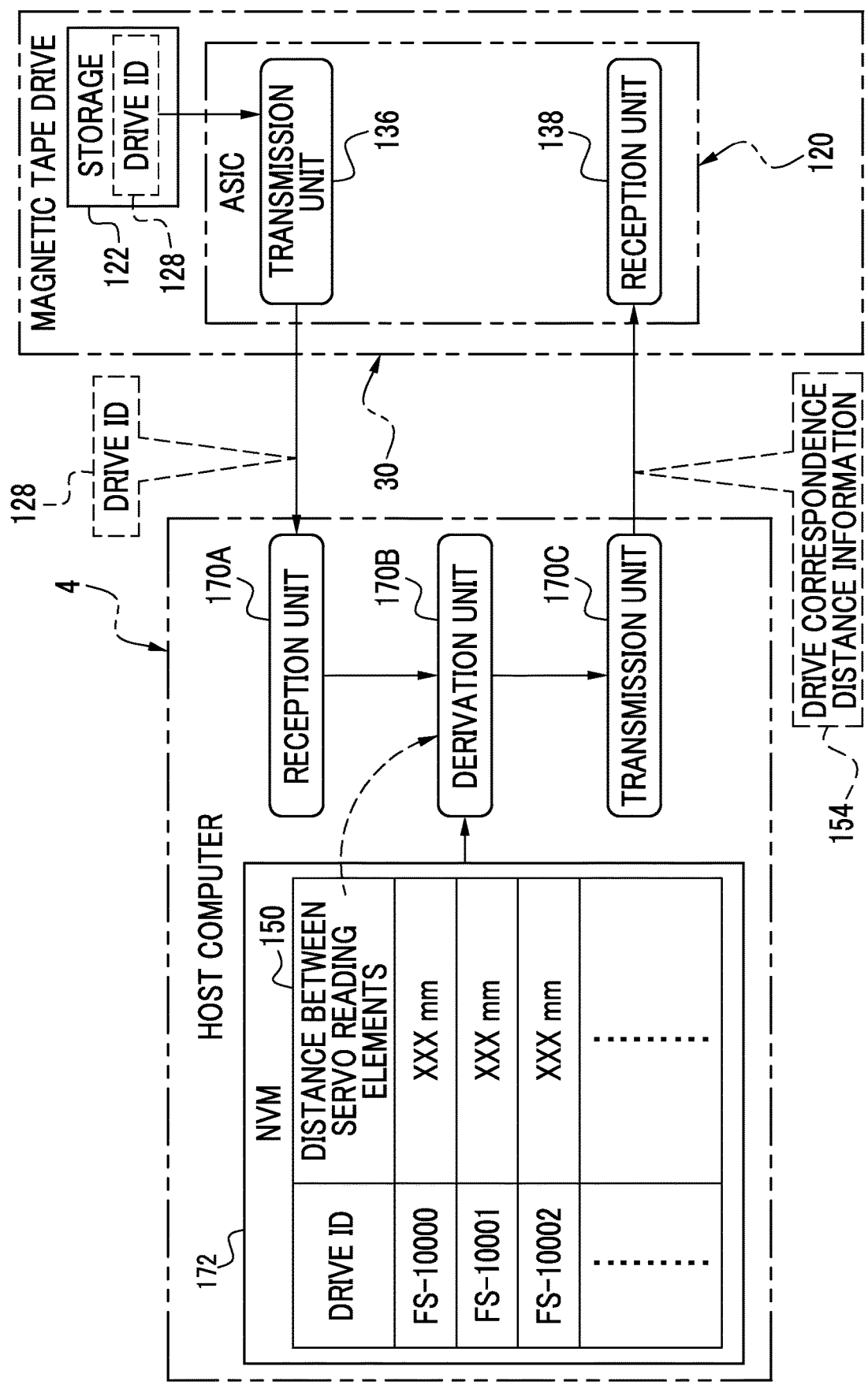
FIG. 28 is a block diagram showing an example of a content of processing performed by the magnetic tape drive and the host computer.

As shown in FIG. 28 as an example, the drive-specific characteristic table 150 holds a distance between servo reading elements for each magnetic head 36 mounted in each of the magnetic tape drives 30 as the drive characteristic information. In addition, the drive-specific characteristic table 150 holds the drive ID 128 for each magnetic tape drive 30. In the drive-specific characteristic table 150, the distance between the servo reading elements related to the magnetic head 36 mounted in the magnetic tape drive 30 that is specified by the drive ID 128 is associated with each drive ID 128. Here, the drive ID 128 is used as information capable of specifying the magnetic head 36 mounted in the magnetic tape drive 30. The drive ID 128 is an example of "head specification information capable of specifying a head on which a plurality of servo reading elements are mounted" according to the technology of the present disclosure, and the distance between the servo reading elements held by the drive-specific characteristic table 150 is an example of "information indicating a distance for a plurality of servo reading elements mounted on a head" according to the technology of the present disclosure.

Meanwhile, in a case where the drive ID 128 of the magnetic tape drive 30 (here, for convenience, referred to as a "drive C") in which the pitch information 142 is acquired in the operation before data recording on the magnetic tape MT is stored in the cartridge memory 19, as illustrated in the example shown in FIG. 12, the drive ID 128 of the drive C is read out from the cartridge memory 19 by the noncontact reading and writing device 50A, and the drive ID 128 of the drive C is temporarily stored in the storage 122 by the ASIC 120 of the magnetic tape drive 30 different from the drive C, that is, the magnetic tape drive 30 shown in FIG. 28 (here, for convenience, referred to as a "drive D"). In the ASIC 120 of the drive D, the transmission unit 136 acquires the drive ID 128 of the drive C from the storage 122 and transmits the acquired drive ID 128 to the host computer 4.

In the host computer 4, the reception unit 170A receives the drive ID 128 transmitted from the transmission unit 136. The derivation unit 170B derives the distance between the servo reading elements corresponding to the drive ID 128 received by the reception unit 170A, that is, the distance between the servo reading elements corresponding to the drive C, from the drive-specific characteristic table 150. The transmission unit 170C transmits the drive correspondence distance information 154 indicating the distance between the servo reading elements derived from the drive-specific characteristic table 150 by the derivation unit 170B to the ASIC 120. In the ASIC 120, the reception unit 138 receives the drive correspondence distance information 154 transmitted from the transmission unit 170C.

In the present embodiment, although an aspect example in which the distances between the servo reading elements of the plurality of magnetic tape drives 30 are aggregated in the NVM 172 of the host computer 4 in the form of the drive-specific characteristic table 150 has been described, in this case, it is preferable that at least the drive ID 128, among the drive ID 128 and the head ID, is stored in the cartridge memory 19, as described above.

Here, for example, in a case where the drive ID 128 of the drive C is stored in the cartridge memory 19, the ASIC 120 of another magnetic tape drive 30, that is, the above-mentioned drive D, acquires the pitch information 142 and the drive ID 128 (an example of "distance information" according to the technology of the present disclosure) related to the drive C from the cartridge memory 19 via the noncontact reading and writing device 50A (see FIG. 12) when a recording operation and/or a reading operation is performed in the drive D. Then, the ASIC 120 of the drive D acquires the drive correspondence distance information 154 corresponding to the drive ID 128 related to the drive C from the NVM 172 of the host computer 4. Since the distance information 146 of the drive D is stored in the storage 122 of the drive D (see FIG. 25), the ASIC 120 of the drive D controls tension applied to the magnetic tape MT in the drive D by using the distance information 146 (the distance between the servo reading elements related to the drive D itself) stored in the storage 122 of the drive D, the drive correspondence distance information 154 (the distance between the servo reading elements related to the drive C itself) acquired from the NVM 172, and the pitch information 142 (the pitch measured in the drive C itself) stored in the cartridge memory 19 of the drive D.

In a case where the distance information 146 (see FIG. 26) related to the drive C and stored in the cartridge memory 19 is the distance between the servo reading elements itself, it is unnecessary to make an inquiry to the host computer 4 because the ASIC 120 of the drive D does not need to acquire the distance between the servo reading elements from the NVM 172 of the host computer 4.

Figure 29:
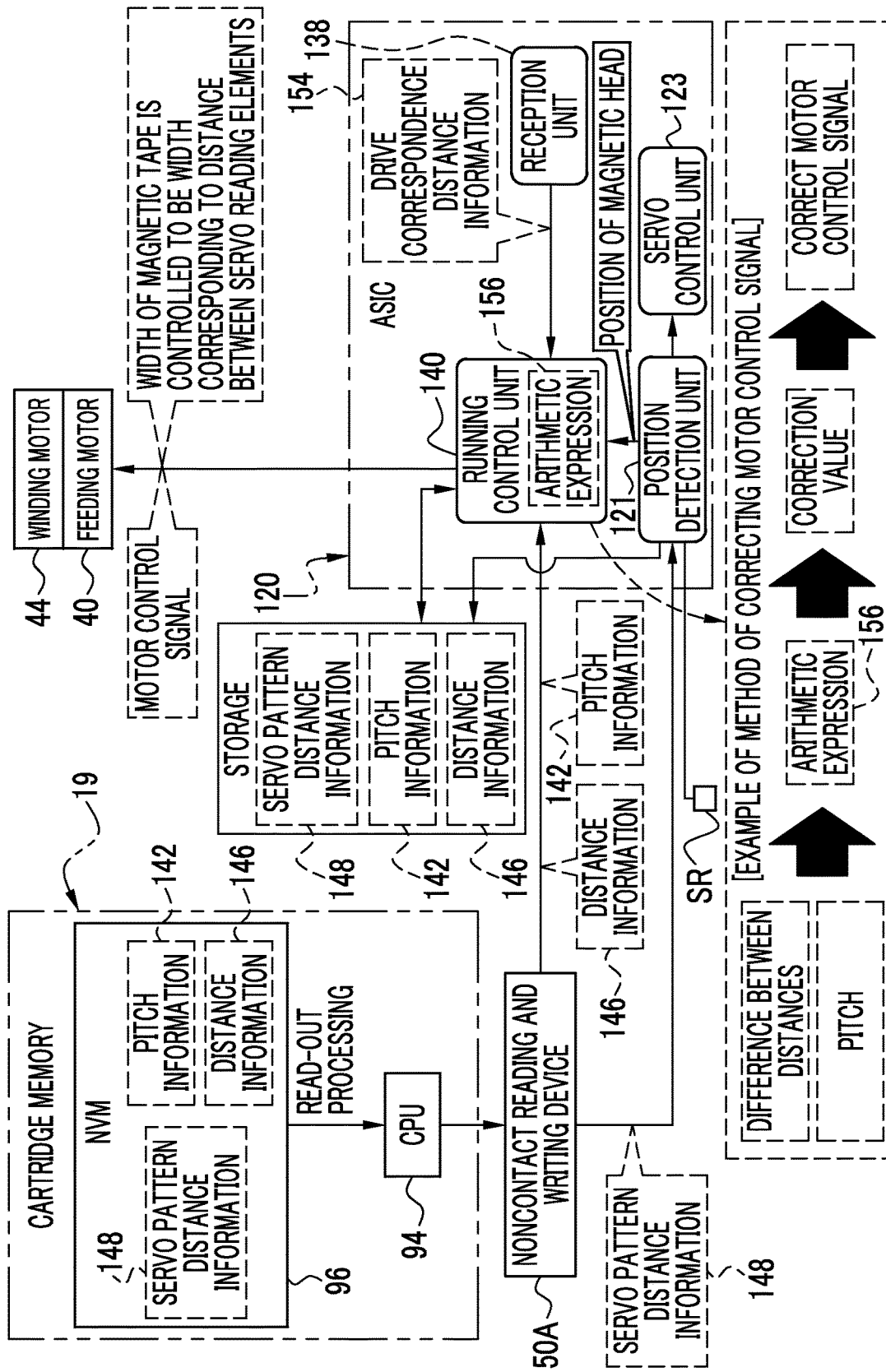
FIG. 29 is a block diagram showing an example of a content of processing of controlling a feeding motor and a winding motor such that the width of the magnetic tape becomes a width corresponding to a distance between the servo reading elements for a magnetic head mounted in the magnetic tape drive.

As shown in FIG. 29 as an example, in the cartridge memory 19, the CPU 94 performs read-out processing of reading out the pitch information 142, the distance information 146, and the servo pattern distance information 148 from the NVM 96. As a result, the CPU 94 reads out the pitch information 142, the distance information 146, and the servo pattern distance information 148 from the NVM 96, and outputs the pitch information 142 and the distance information 146, which are read out, to the running control unit 140 via the noncontact reading and writing device 50A. The CPU 94 may read out at least one of the pitch information 142 or the servo pattern distance information 148 from the NVM 96. The CPU 94 outputs the read-out servo pattern distance information 148 to the position detection unit 121 via the noncontact reading and writing device 50A.

The position detection unit 121 stores the servo pattern distance information 148 input from the cartridge memory 19 via the noncontact reading and writing device 50A in the storage 122. The position detection unit 121 uses the servo signal input from the servo reading element SR to calculate the distance D of the servo pattern 51 in each of the servo bands SB read by the servo reading element SR. The position detection unit 121 detects the servo position corresponding to each of the calculated distances D by referring to the servo pattern distance information 148, and calculates an average value of the detected servo positions. Then, the position detection unit 121 detects the widthwise position of the magnetic head 36 on the basis of the calculated average value. The position detection unit 121 outputs the detected widthwise position of the magnetic head 36 to the servo control unit 123 and the running control unit 140.

The servo control unit 123 controls the position of the magnetic head 36 in the width direction WD such that the widthwise position of the magnetic head 36 detected by the position detection unit 121 becomes a predetermined target position. Such a control of the ASIC 120 such that the widthwise position of the magnetic head 36 approaches the target position is referred to as a "positioning control for the magnetic head 36".

In a case where the servo position matching the calculated distance D is not defined in the servo pattern distance information 148, the position detection unit 121 can detect the servo position corresponding to the calculated distance D by performing interpolation of the servo position using the calculated distance D and the distance D of the servo position defined in the servo pattern distance information 148.

For example, in a case where the calculated distance D is "22.001 μm", the calculated distance D is included in a range of the distance D corresponding to the servo positions "1" and "2" in the servo pattern distance information 148 shown in FIG. 22. Therefore, the position detection unit 121 need only obtain the servo position corresponding to the calculated distance D by performing interpolation between the distance D corresponding to the servo position "1" and the distance D corresponding to the servo position "2". A known interpolation method is used for the interpolation of the servo position. Specifically, for example, in addition to linear interpolation, nonlinear interpolation, such as Lagrange interpolation and spline interpolation, is used.

In a case where the servo position matching the calculated distance D is not defined in the servo pattern distance information 148, the position detection unit 121 may set a servo position corresponding to the distance D closest to the calculated distance D as the servo position corresponding to the calculated distance D.

The running control unit 140 stores the distance information 146 and the pitch information 142 input from the cartridge memory 19 via the noncontact reading and writing device 50A in the storage 122. The running control unit 140 adjusts the tension applied to the magnetic tape MT by controlling the drive of the feeding motor 40 and of the winding motor 44 such that the width of the magnetic tape MT becomes a width corresponding to the distance between the servo reading elements indicated by the drive correspondence distance information 154, on the basis of the drive correspondence distance information 154, which is received by the reception unit 138, and the distance information 146 and the pitch information 142, which are input from the cartridge memory 19 via the noncontact reading and writing device 50A, in a state in which the positioning of the magnetic head 36 is performed by the servo control unit 123. In this case, first, the running control unit 140 calculates a difference (hereinafter, also simply referred to as a "difference") between the distance between the servo reading elements (the distance between the servo reading elements measured by the measuring device 144 (see FIG. 25)) specified from the distance information 146 and the distance between the servo reading elements indicated by the drive correspondence distance information 154.

Here, the difference indicates, for example, a value obtained by subtracting the distance between the servo reading elements indicated by the drive correspondence distance information 154 from the distance between the servo reading elements specified from the distance information 146. Although an aspect example in which the difference is calculated has been described here, the technology of the present disclosure is not limited thereto, and, for example, a ratio of the distance between the servo reading elements indicated by the drive correspondence distance information 154 with respect to the distance between the servo reading elements specified from the distance information 146 may be used. As described above, the difference is merely an example, and need only be a value indicating a degree of difference between the distance between the servo reading elements specified from the distance information 146 and the distance between the servo reading elements indicated by the drive correspondence distance information 154.

The running control unit 140 uses an arithmetic expression 156 where the calculated difference and the pitch corresponding to the widthwise position of the magnetic head 36, which is specified from the pitch information 142, are used as independent variables and a correction value for correcting the feeding motor control signal (hereinafter, also referred to as a "feeding motor control signal correction value) and a correction value for correcting the winding motor control signal (hereinafter, also referred to as a "winding motor control signal correction value") are used as dependent variables, to calculate the feeding motor control signal correction value and the winding motor control signal correction value.

The feeding motor control signal correction value and the winding motor control signal correction value are correction values used for the feeding motor control signal and the winding motor control signal in order to obtain the feeding motor control signal and the winding motor control signal necessary for realizing the tension applied to the magnetic tape MT such that the width of the magnetic tape MT becomes the width corresponding to the distance between the servo reading elements indicated by the drive correspondence distance information 154.

The arithmetic expression 156 used by the running control unit 140 is an arithmetic expression obtained in advance by, for example, a test with a real machine and/or computer simulation, as an arithmetic expression for calculating the correction values used for the feeding motor control signal and the winding motor control signal in order to obtain the feeding motor control signal and the winding motor control signal necessary for realizing the tension applied to the magnetic tape MT such that the width of the magnetic tape MT becomes the width corresponding to the distance between the servo reading elements indicated by the drive correspondence distance information 154.

The running control unit 140 controls the drive of the feeding motor 40 by correcting the feeding motor control signal with the calculated feeding motor control signal correction value and then supplying the corrected feeding motor control signal to the feeding motor 40, and controls the drive of the winding motor 44 by correcting the winding motor control signal with the calculated winding motor control signal correction value and then supplying the corrected winding motor control signal to the winding motor 44. As a result, the width of the magnetic tape MT is adjusted to the width corresponding to the distance between the servo reading elements indicated by the drive correspondence distance information 154. That is, in a case where the target position of the magnetic head 36 is set to the position of the midpoint in the width direction WD in the servo band SB, the position detection unit 121 and the servo control unit 123 perform the positioning control for the magnetic head 36 to move the servo reading element SR to the servo position corresponding to the midpoint. In addition, the width of the magnetic tape MT is adjusted by performing control to adjust the tension applied to the magnetic tape MT through the running control unit 140.

Next, the action of the magnetic tape system 2 will be described with reference to FIGS. 30 and 31.

Figure 30:
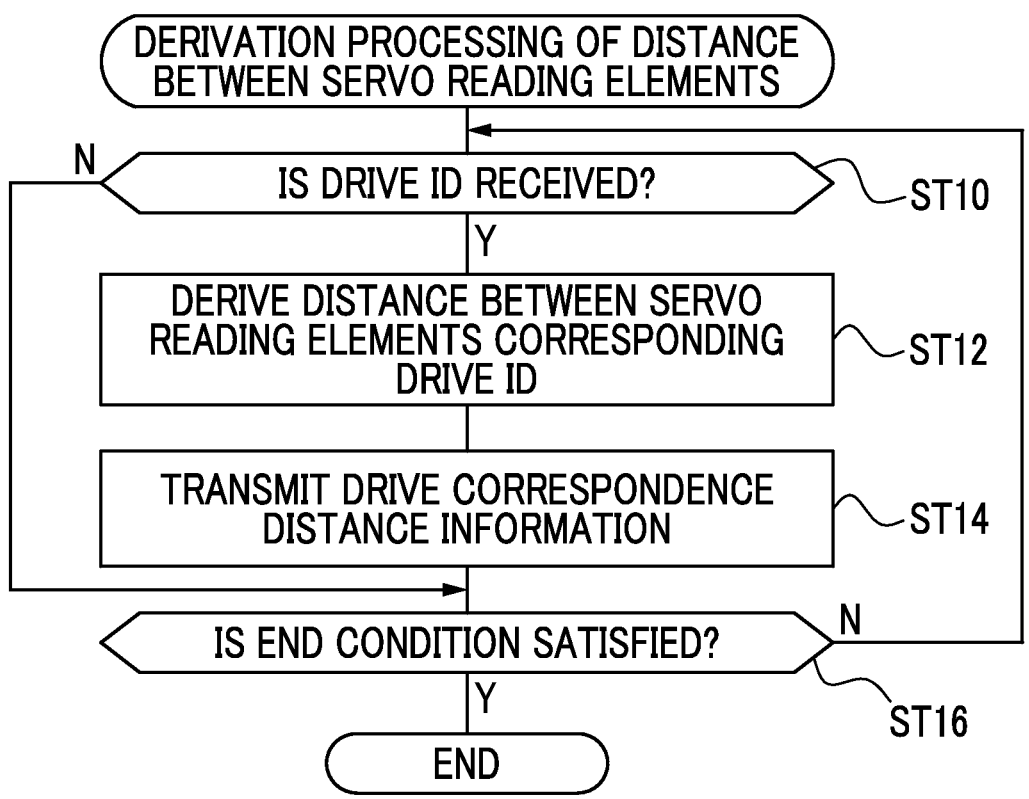
FIG. 30 is a flowchart showing an example of a flow of derivation processing of the distance between the servo reading elements executed by the CPU of the host computer.

FIG. 30 is a flowchart showing an example of a flow of derivation processing of the distance between the servo reading elements executed by the CPU 170 of the host computer 4 in accordance with the inter-servo-reading-element distance derivation program 152. FIG. 31 is a flowchart showing an example of a flow of tape width control processing executed by the ASIC 120 of the magnetic tape drive 30.

In the derivation processing of the distance between the servo reading elements shown in FIG. 30, first, in Step ST10, the reception unit 170A determines whether or not the drive ID 128 that is transmitted from the transmission unit 136 of the magnetic tape drive 30 by executing processing of Step ST100 of the tape width control processing, which will be described later, is received. In Step ST10, in a case where the drive ID 128 transmitted from the transmission unit 136 of the magnetic tape drive 30 is not received, a negative determination is made, and the derivation processing of the distance between the servo reading elements proceeds to Step ST16. In Step ST10, in a case where the drive ID 128 transmitted from the transmission unit 136 of the magnetic tape drive 30 is received, an affirmative determination is made, and the derivation processing of the distance between the servo reading elements proceeds to Step ST12.

In Step ST12, the derivation unit 170B derives the distance between the servo reading elements corresponding to the drive ID 128 received in Step ST10, from the drive-specific characteristic table 150.

In the next Step ST14, the transmission unit 170C transmits the drive correspondence distance information 154 indicating the distance between the servo reading elements derived in Step ST12 to the magnetic tape drive 30.

In the next Step ST16, the transmission unit 170C determines whether or not a condition for ending the derivation processing of the distance between the servo reading elements (hereinafter, also referred to as an "end condition of the derivation processing of the distance between the servo reading elements") is satisfied. Examples of the end condition of the derivation processing of the distance between the servo reading elements include a condition that an instruction to end the derivation processing of the distance between the servo reading elements has been given from the outside. In Step ST16, in a case where the end condition of the derivation processing of the distance between the servo reading elements is not satisfied, a negative determination is made, and the derivation processing of the distance between the servo reading elements proceeds to Step ST10. In Step ST16, in a case where the end condition of the derivation processing of the distance between the servo reading elements is satisfied, an affirmative determination is made, and the derivation processing of the distance between the servo reading elements ends.

Figure 31:
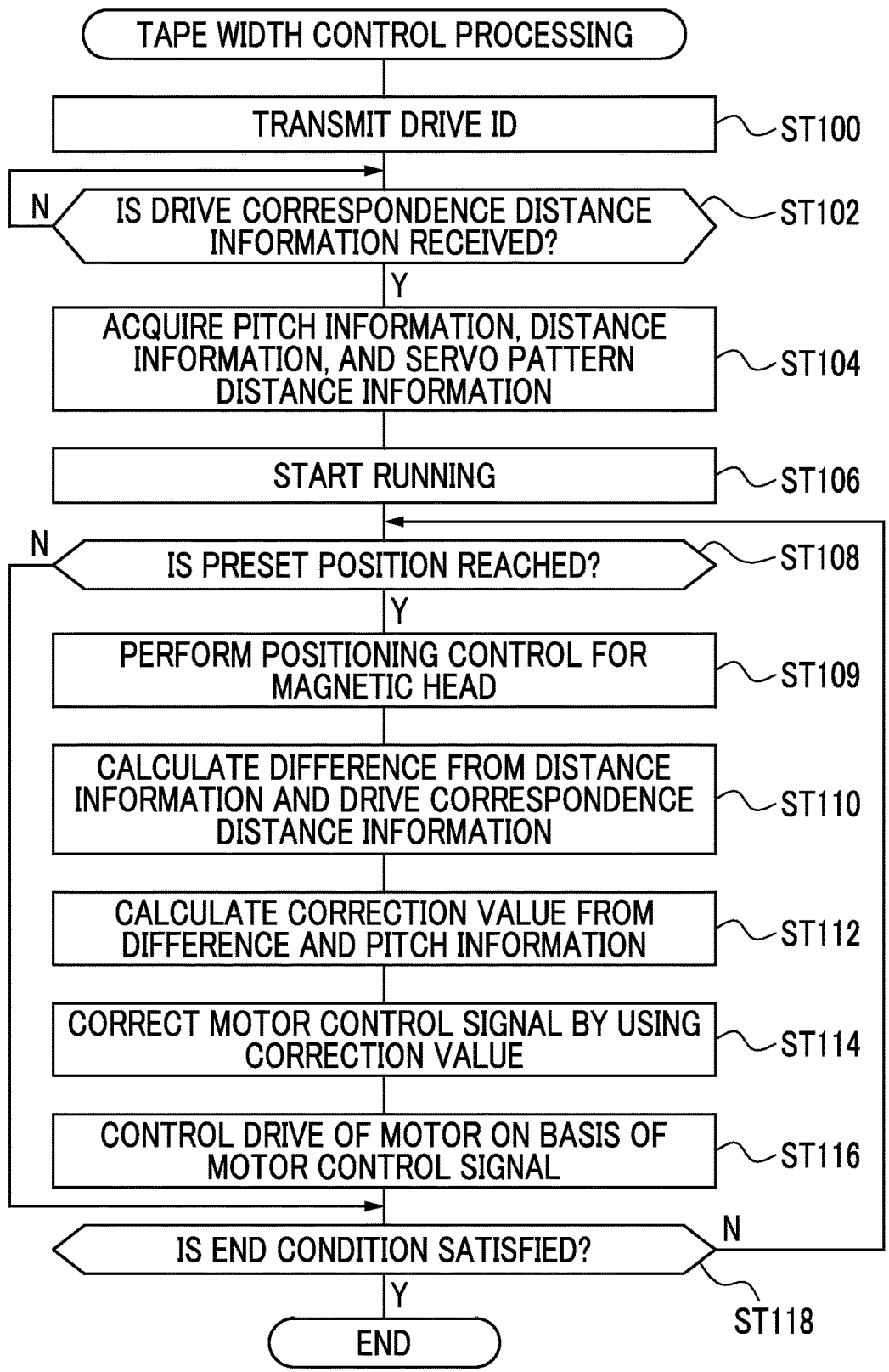
FIG. 31 is a flowchart showing an example of a flow of tape width control processing executed by the ASIC of the magnetic tape drive.

In the tape width control processing shown in FIG. 31, first, in Step ST100, the transmission unit 136 transmits the drive ID 128 to the host computer 4.

In the next Step ST102, the reception unit 138 determines whether or not the drive correspondence distance information 154, which is transmitted by the transmission unit 170C through the execution of the processing of Step ST14 shown in FIG. 30, is received. In Step ST102, in a case where the drive correspondence distance information 154 transmitted by the transmission unit 170C is not received, a negative determination is made, and the determination in Step ST102 is performed again. In Step ST102, in a case where the drive correspondence distance information 154 transmitted by the transmission unit 170C is received, an affirmative determination is made, and the tape width control processing proceeds to Step ST104.

In Step ST104, the running control unit 140 acquires the pitch information 142, the distance information 146, and the servo pattern distance information 148 from the NVM 96 of the cartridge memory 19 via the CPU 94 and the noncontact reading and writing device 50A. The running control unit 140 stores the pitch information 142 and the distance information 146, which are acquired, in the storage 122. In addition, the position detection unit 121 stores the acquired servo pattern distance information 148 in the storage 122. In this way, in a case where the pitch information 142, the distance information 146, and the servo pattern distance information 148 are stored in the storage 122, the running control unit 140 does not need to acquire the pitch information 142, the distance information 146, and the servo pattern distance information 148 from the NVM 96 of the cartridge memory 19 again.

In the next Step ST106, the running control unit 140 controls the feeding motor 40 and the winding motor 44 to start running of the magnetic tape MT.

In the next Step ST108, the running control unit 140 determines whether or not the position of the magnetic head 36 with respect to the magnetic tape MT has reached a preset position. The preset position indicates a position of one of the plurality of locations spaced apart from each other over the entire length of the magnetic tape MT. For example, whether or not the preset position is reached may be determined on the basis of the servo signal input from the servo reading element SR to the position detection unit 121, may be determined on the basis of an elapsed time from the start of running of the magnetic tape MT, or may be determined on the basis of amounts of drive of the feeding motor 40 and of the winding motor 44.

In Step ST108, in a case where the position of the magnetic head 36 with respect to the magnetic tape MT has not reached the preset position, a negative determination is made, and the tape width control processing proceeds to Step ST118. In Step ST108, in a case where the position of the magnetic head 36 with respect to the magnetic tape MT has reached the preset position, an affirmative determination is made, and the tape width control processing proceeds to Step ST109.

In Step ST109, the position detection unit 121 uses the servo signal input from the servo reading element SR to calculate the distance D of the servo pattern 51 in each of the servo bands SB read by the servo reading element SR. The position detection unit 121 uses the servo pattern distance information 148 acquired in Step ST104 and the calculated distance D to detect the servo position of the servo reading element SR in each servo band SB, and then detects the widthwise position of the magnetic head 36.

The servo control unit 123 performs the positioning control for the magnetic head 36 by controlling the moving mechanism 129 such that the detected widthwise position of the magnetic head 36 approaches the target position. As a result, the widthwise position of the magnetic head 36 moves to the target position.

In Step ST110, the running control unit 140 calculates the difference between the distance between the servo reading elements specified from the distance information 146 acquired in Step ST104 and the distance between the servo reading elements indicated by the drive correspondence distance information 154.

In the next Step ST112, the running control unit 140 substitutes the difference calculated in Step ST110 and the pitch specified from the pitch information 142 acquired in Step ST104 into the arithmetic expression 156 to calculate the feeding motor control signal correction value and the winding motor control signal correction value from the arithmetic expression 156.

As an example, a situation is considered in which the distance between the servo reading elements specified from the distance information 146 is longer than the distance between the servo reading elements indicated by the drive correspondence distance information 154. In this case, a situation may occur in which the data magnetic elements DRW are not located on the respective corresponding data tracks DT of the magnetic tape MT even in a case where the widthwise position of the magnetic head 36 is brought closer to the target position in Step ST109.

Specifically, as the difference calculated in Step ST110 increases, the interval between adjacent data magnetic elements DRW in the magnetic head 36 shows a tendency to become longer than the interval between adjacent data tracks DT provided on the front surface 139 of the magnetic tape MT.

In such a case, in a case where the tension of the magnetic tape MT is made weaker than the tension T1, the width of the magnetic tape MT is increased, and the data magnetic elements DRW approach the positions on the respective corresponding data tracks DT of the magnetic tape MT. As described above, the tension T1 is predetermined reference tension applied to the magnetic tape MT in a case where data recording or data reading with respect to the data band DB of the magnetic tape MT is performed in the magnetic tape drive 30.

Meanwhile, the pitch information 142 indicates the pitch corresponding to each servo position in a case where the magnetic head 36 having the distance between the servo reading elements indicated by the drive correspondence distance information 154 is used. The pitch defined in the pitch information 142 is a pitch defined such that the data magnetic elements DRW are located on the respective corresponding data tracks DT of the magnetic tape MT in a case where the magnetic tape MT runs with the tension T1.

Therefore, the running control unit 140 acquires the pitch corresponding to the servo positions representing the widthwise position of the magnetic head 36 detected in Step ST109, from the pitch information 142 shown in FIG. 24 corresponding to the preset position reached by the magnetic head 36.

In a case where the pitch, which is acquired from the pitch information 142 and corresponds to the servo positions representing the widthwise position of the magnetic head 36 detected in Step ST109, and the difference calculated in Step ST110 are known, an amount of deviation between the pitch and a pitch in the magnetic tape drive 30 that executes the tape width control processing is obtained. Therefore, the arithmetic expression 156 calculates the feeding motor control signal correction value and the winding motor control signal correction value such that the tension of the magnetic tape MT becomes weaker than the tension T1 as the amount of deviation in pitch increases.

Next, a situation is considered in which the distance between the servo reading elements specified from the distance information 146 is shorter than the distance between the servo reading elements indicated by the drive correspondence distance information 154. In this case, as the difference calculated in Step ST110 increases, the interval between adjacent data magnetic elements DRW in the magnetic head 36 shows a tendency to become shorter than the interval between adjacent data tracks DT provided on the front surface 139 of the magnetic tape MT.

In such a case, in a case where the tension of the magnetic tape MT is made stronger than the tension T1, the width of the magnetic tape MT contracts, and the data magnetic elements DRW approach the positions on the respective corresponding data tracks DT of the magnetic tape MT.

Therefore, in a case where the distance between the servo reading elements specified from the distance information 146 is shorter than the distance between the servo reading elements indicated by the drive correspondence distance information 154, the arithmetic expression 156 calculates the feeding motor control signal correction value and the winding motor control signal correction value such that the tension of the magnetic tape MT becomes stronger than the tension T1 as the amount of deviation in pitch increases.

That is, the running control unit 140 uses the arithmetic expression 156 to calculate the feeding motor control signal correction value and the winding motor control signal correction value for reducing deviation in the width direction WD between each of the data magnetic elements DRW and the data track DT where data recording and/or data reading is performed by each of the data magnetic elements DRW.

In a case where the servo positions representing the widthwise position of the magnetic head 36 detected in Step ST109 are not defined in the pitch information 142, the running control unit 140 need only calculate the pitch corresponding to the servo positions representing the widthwise position of the magnetic head 36 through interpolation.

In the next Step ST114, the running control unit 140 corrects the feeding motor control signal with the feeding motor control signal correction value calculated in Step ST112, and corrects the winding motor control signal with the winding motor control signal correction value calculated in Step ST112.

In the next Step ST116, the running control unit 140 controls the drive of the feeding motor 40 by supplying the feeding motor control signal corrected in Step ST114 to the feeding motor 40, and controls the drive of the winding motor 44 by supplying the winding motor control signal corrected in Step ST114 to the winding motor 44. As a result, the tension applied to the magnetic tape MT is adjusted, and the width of the magnetic tape MT is controlled to be the width corresponding to the distance between the servo reading elements indicated by the drive correspondence distance information 154.

In the next Step ST118, the running control unit 140 determines whether or not a condition for ending the tape width control processing (hereinafter, also referred to as a "tape width control processing end condition") is satisfied. Examples of the tape width control processing end condition include a condition that an instruction to end the tape width control processing has been given from the outside, and/or a condition that a recording operation or a reading operation of data has ended for the entire length of the magnetic tape MT.

In Step ST118, in a case where the tape width control processing end condition is not satisfied, a negative determination is made, and the tape width control processing proceeds to Step ST108. In Step ST118, in a case where the tape width control processing end condition is satisfied, an affirmative determination is made, and the tape width control processing ends.

As described above, in the present embodiment, the pitch information 142, the distance information 146, and the servo pattern distance information 148 are stored in the NVM 96 of the cartridge memory 19. The magnetic tape cartridge 10 on which the cartridge memory 19 having the NVM 96 that stores the pitch information 142, the distance information 146, and the servo pattern distance information 148 is mounted is also used by being loaded into the magnetic tape drive 30 other than the reference drive.

In a case where the magnetic tape cartridge 10 configured as described above is loaded into the magnetic tape drive 30, the magnetic tape MT in the magnetic tape cartridge 10 is pulled out, and a recording operation or a reading operation is performed by the magnetic head 36, the pitch information 142, the distance information 146, and the servo pattern distance information 148 are acquired from the NVM 96 of the cartridge memory 19 by the running control unit 140 of the magnetic tape drive 30.

Further, the drive correspondence distance information 154 indicating the distance between the servo reading elements related to the magnetic head 36 mounted in the magnetic tape drive 30 is acquired from the host computer 4 by the running control unit 140. Further, the difference between the distance between the servo reading elements indicated by the drive correspondence distance information 154 and the distance between the servo reading elements specified by the distance information 146 and the pitch specified from the pitch information 142 are substituted into the arithmetic expression 156, whereby the feeding motor control signal correction value and the winding motor control signal correction value are calculated by the running control unit 140.

Then, the running control unit 140 supplies the feeding motor control signal corrected by the feeding motor control signal correction value to the feeding motor 40, and supplies the winding motor control signal corrected by the winding motor control signal correction value to the winding motor 44. As a result, the tension applied to the magnetic tape MT is adjusted, and the width of the magnetic tape MT is controlled to be the width corresponding to the distance between the servo reading elements indicated by the drive correspondence distance information 154.

Accordingly, with the present configuration, it is possible to contribute to the correction of the positional relationship between the plurality of servo bands SB and the plurality of servo reading elements SR even in a case where variations have occurred in the distance between the plurality of servo reading elements SR.

Further, in the present embodiment, the pitch information 142 regarding the pitches at the plurality of locations spaced apart from each other over the entire length of the magnetic tape MT is stored in the NVM 96 of the cartridge memory 19. With this, the feeding motor control signal corrected by the feeding motor control signal correction value and the winding motor control signal corrected by the winding motor control signal correction value can be obtained at each of the plurality of locations spaced apart from each other over the entire length of the magnetic tape MT. Accordingly, with the present configuration, it is possible to contribute to the correction of the positional relationship between the plurality of servo bands SB and the plurality of servo reading elements SR at each of the plurality of locations spaced apart from each other over the entire length of the magnetic tape MT.

Further, in the present embodiment, information indicating the distance between the servo reading elements itself is employed as the distance information 146 stored in the NVM 96 of the cartridge memory 19. Accordingly, with the present configuration, it is possible to contribute to a highly accurate correction of the positional relationship between the plurality of servo bands SB and the plurality of servo reading elements SR as compared with a case of using information other than the information indicating the distance between the servo reading elements itself as the distance information 146 stored in the NVM 96 of the cartridge memory 19.

Further, in the present embodiment, the drive ID 128 and the distance between the servo reading elements are associated with each other for each of the plurality of magnetic tape drives 30 in which the magnetic tape cartridge 10 is loaded. Accordingly, with the present configuration, it is possible to contribute to the correction of the positional relationship between the plurality of servo bands SB and the plurality of servo reading elements SR even in a case where variations have occurred for each magnetic head 36 in the distance between the servo reading elements SR used for measuring the pitch between the servo bands SB in the width direction WD of the magnetic tape MT.

Further, in the present embodiment, the cartridge memory 19 has the NVM 96 where data is read and written in a noncontact manner by the noncontact reading and writing device 50. Accordingly, with the present configuration, the pitch information 142 and the distance information 146 can be stored without physically damaging the cartridge memory 19, as compared with a case where data is read and written in contact with some kind of memory or the like.

Further, in the present embodiment, the pitch between the servo patterns 51 in the width direction WD is measured on the basis of a result of reading the servo patterns 51 of the adjacent servo bands SB in the width direction WD through the servo reading elements SR1 and SR2, in a stage before data recording is performed by the magnetic tape drive 30 with respect to the magnetic tape MT. Accordingly, with the present configuration, it is possible to contribute to the correction of the positional relationship between the plurality of servo bands SB and the plurality of servo reading elements SR even in a case where the width of the magnetic tape MT has expanded or contracted before and after data recording is performed by the magnetic tape drive 30 with respect to the magnetic tape MT.

Further, in the present embodiment, the pitch between the servo patterns 51 in the width direction WD is calculated on the basis of a result of reading the servo patterns 51 of the adjacent servo bands SB in the width direction WD through the servo reading elements SR1 and SR2 and the distance between the plurality of servo reading elements, in a stage before data recording is performed by the magnetic tape drive 30 with respect to the magnetic tape MT. Accordingly, with the present configuration, in a case where the distance between the servo reading elements is measured in advance, the pitch information 142 can be generated by using the distances D at the servo positions at which the servo reading elements SR are located.

Further, in the present embodiment, the pitches between the servo patterns 51 are measured for the magnetic tape MT at the plurality of servo positions in the each of servo bands SB. Accordingly, with the present configuration, it is possible to contribute to the correction of the positional relationship between the plurality of servo bands SB and the plurality of servo reading elements SR on the basis of the pitch between the servo patterns 51 corresponding to the positions of the servo reading elements SR in the width direction WD in the servo band SB.

Further, in the present embodiment, the servo positions in the servo band SB are specified using the servo pattern distance information 148 in which the plurality of servo positions in each of the servo bands SB and the distances D in the respective servo positions between the pair of magnetization regions 51A and 51B constituting the servo pattern 51 formed on each of the servo bands SB are associated with each other. Accordingly, with the present configuration, the servo position of the servo reading element SR in each of the servo bands SB can be specified by measuring the distance D from the magnetization region 51A to the magnetization region 51B using the change of the pulse read by the servo reading element SR.

Figure 32:
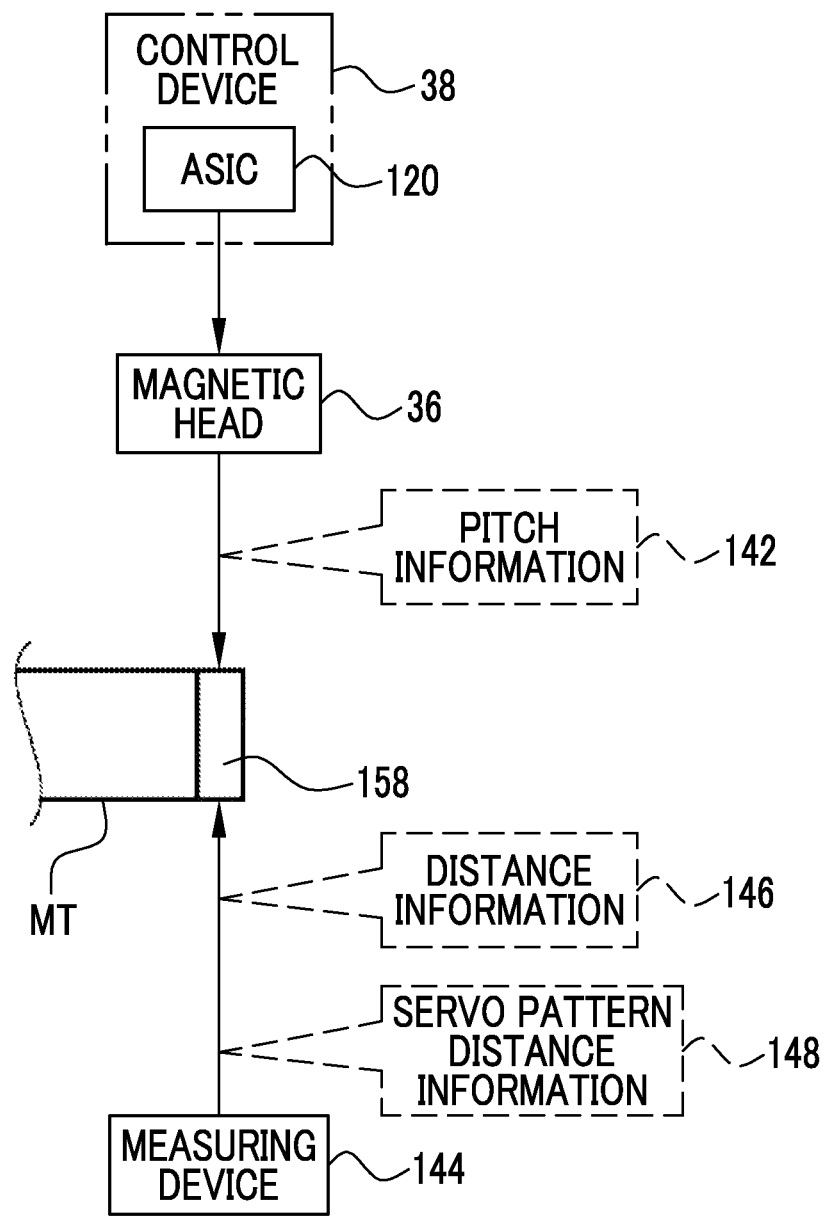
FIG. 32 is a conceptual diagram showing an example of an aspect in which the pitch information, the distance information, and the servo pattern distance information are written into a BOT region.
Figure 33:
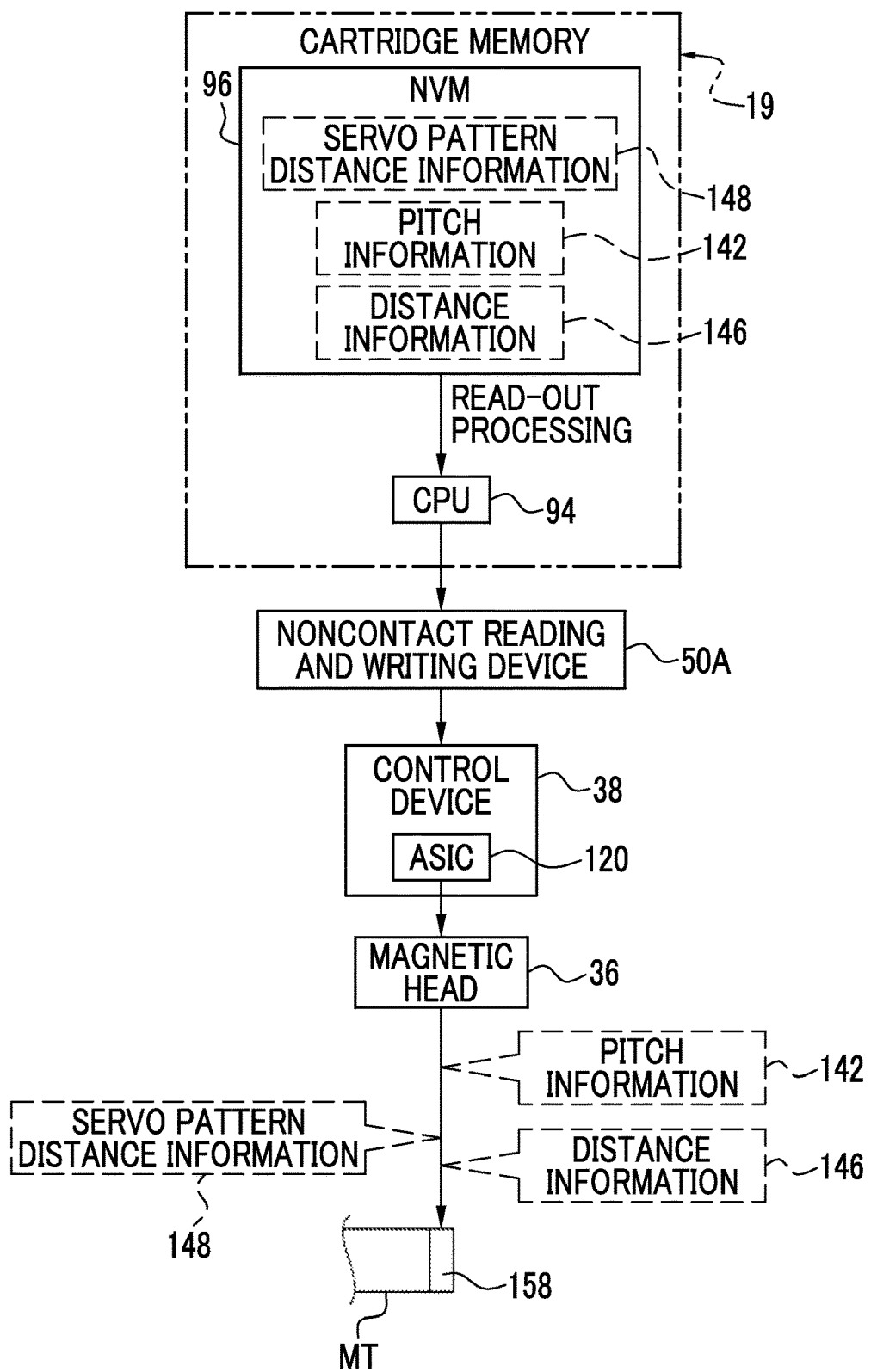
FIG. 33 is a conceptual diagram showing an example of an aspect in which the pitch information, the distance information, and the servo pattern distance information stored in the cartridge memory are written into the BOT region.

In the above-described embodiment, although the NVM 96 of the cartridge memory 19 has been illustrated as the storage medium, the technology of the present disclosure is not limited thereto. For example, as shown in FIG. 32, at a time of any one of a case where the magnetic tape cartridge 10 is initially loaded or a case where the magnetic tape MT is initialized, the ASIC 120 of the control device 38 may control the operation of the magnetic head 36 to write the pitch information 142 into a BOT region 158 provided at the head of the magnetic tape MT. Further, the measuring device 144 may also write the distance information 146 and/or the servo pattern distance information 148 into the BOT region 158.

In this way, in a case where the pitch information 142, the distance information 146, and the servo pattern distance information 148 are written into the BOT region 158, the ASIC 120 controls the operation of the magnetic head 36 to read the pitch information 142, the distance information 146, and the servo pattern distance information 148 from the BOT region 158. The BOT region 158 is an example of a "partial region of a magnetic tape" according to the technology of the present disclosure.

In this way, in the example shown in FIG. 32, the BOT region 158 of the magnetic tape MT is used as the storage medium. Accordingly, with the present configuration, it is possible to save labor to prepare the cartridge memory 19 or to store the pitch information 142, the distance information 146, and the servo pattern distance information 148 in the NVM 96 of the cartridge memory 19.

In the example shown in FIG. 32, an aspect example in which the pitch information 142, the distance information 146, and the servo pattern distance information 148 are written into the BOT region 158 is shown, but the technology of the present disclosure is not limited thereto. For example, information of two or less of the pitch information 142, the distance information 146, and the servo pattern distance information 148 may be written into the BOT region 158, and the remaining information may be written into the NVM 96 of the cartridge memory 19.

At least one of the pitch information 142, the distance information 146, or the servo pattern distance information 148 may be stored in the BOT region 158 by a magnetic head of a magnetic tape drive disposed in a factory at a time of any one of a stage in which the magnetic tape cartridge 10 is manufactured, a stage in which the magnetic tape cartridge 10 is inspected, or a stage in which the magnetic tape cartridge 10 is shipped.

Further, as shown in FIG. 29 as an example, the pitch information 142, the distance information 146, and the servo pattern distance information 148 read out from the cartridge memory 19 by the noncontact reading and writing device 50A may be written into the BOT region 158 by the ASIC 120. In this case, the pitch information 142, the distance information 146, and the servo pattern distance information 148 are stored in both the NVM 96 and the BOT region 158. Therefore, it is possible to verify the reliability of the pitch information 142, the distance information 146, and the servo pattern distance information 148 by matching the pitch information 142, the distance information 146, and the servo pattern distance information 148 stored in the NVM 96 with the pitch information 142, the distance information 146, and the servo pattern distance information 148 stored in the BOT region 158. Further, even in a case where a failure has occurred in any one of the NVM 96 or the BOT region 158, the pitch information 142, the distance information 146, and the servo pattern distance information 148 can be obtained from the other.

Instead of or in addition to the BOT region 158, at least one of the pitch information 142, the distance information 146, or the servo pattern distance information 148 may be stored in an EOT region (not shown) provided at the tail of the magnetic tape MT. In addition, the magnetic tape MT is not limited to the BOT region 158 and the EOT region, and, for example, a two-dimensional barcode or a matrix type two-dimensional code (for example, a QR code (registered trademark)) may be used as the storage medium.

Figure 34:
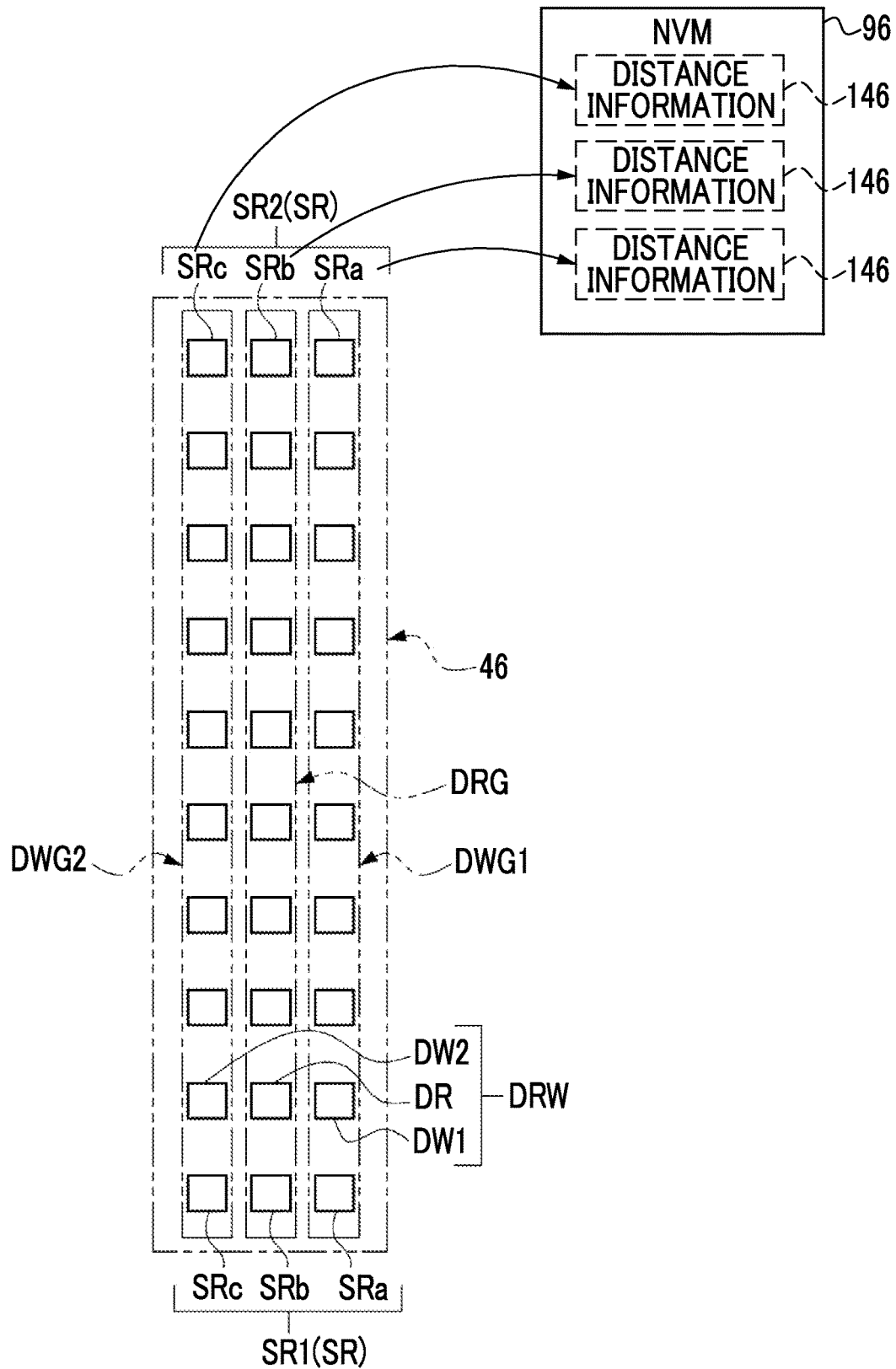
FIG. 34 is a conceptual diagram showing an example of an aspect in which a plurality of pieces of distance information are stored in the NVM.

In the above-described embodiment, an aspect example in which one distance information 146 is stored in the NVM 96 for the magnetic head 36 has been described, but the technology of the present disclosure is not limited thereto. For example, as shown in FIG. 34, three pieces of distance information 146 may be stored in the NVM 96 for the magnetic head 36. Here, the three pieces of distance information 146 indicate distance information 146 for the two first servo reading elements SRa included in the first data recording element group DWG1, distance information 146 for the two second servo reading elements SRb included in the data reading element group DRG, and distance information 146 for the two third servo reading elements SRc included in the second data recording element group DWG2.

As described above, in a case where the distance information 146 for the two first servo reading elements SRa included in the first data recording element group DWG1 is stored in the NVM 96, the distance information 146 for the two second servo reading elements SRb included in the data reading element group DRG is stored in the NVM 96, and the distance information 146 for the two third servo reading elements SRc included in the second data recording element group DWG2 is stored in the NVM 96, the distance between the servo reading elements for the two first servo reading elements SRa included in the first data recording element group DWG1, the distance between the servo reading elements for the two second servo reading elements SRb included in the data reading element group DRG, and the distance between the servo reading elements for the two third servo reading elements SRc included in the second data recording element group DWG2 may be stored in the drive-specific characteristic table 150 for each magnetic tape drive 30. In this case, in the same manner as in the method described in the above-described embodiment (see FIGS. 29 to 31), the running control unit 140 uses the distance information 146 corresponding to each of the first servo reading element SRa, the second servo reading element SRb, and the third servo reading element SRc for each magnetic tape drive 30 to control the feeding motor 40 and the winding motor 44 such that the width of the magnetic tape MT becomes the width corresponding to the distance between the servo reading elements.

Therefore, according to the example shown in FIG. 34, since the distance information 146 for the two first servo reading elements SRa included in the first data recording element group DWG1 is stored in the NVM 96, it is possible to contribute to the correction of the positional relationship between the plurality of servo bands SB and the two first servo reading elements SRa included in the first data recording element group DWG1 even in a case where variations have occurred in the distance between the two first servo reading elements SRa included in the first data recording element group DWG1 for each magnetic head 36.

In addition, according to the example shown in FIG. 34, since the distance information 146 for the two third servo reading elements SRc included in the second data recording element group DWG2 is stored in the NVM 96, it is possible to contribute to the correction of the positional relationship between the plurality of servo bands SB and the two third servo reading elements SRc included in the second data recording element group DWG2 even in a case where variations have occurred in the distance between the two third servo reading elements SRc included in the second data recording element group DWG2 for each magnetic head 36.

Further, according to the example shown in FIG. 34, since the distance information 146 for the two second servo reading elements SRb included in the data reading element group DRG is stored in the NVM 96, it is possible to contribute to the correction of the positional relationship between the plurality of servo bands SB and the two second servo reading elements SRb included in the data reading element group DRG even in a case where variations have occurred in the distance between the two second servo reading elements SRb included in the data reading element group DRG for each magnetic head 36.

In the above-described embodiment, an aspect example in which one pitch information 142 is stored in the NVM 96 for the magnetic head 36 has been described, but the technology of the present disclosure is not limited thereto. For example, as shown in FIG. 35, pitch information 142 for the three servo bands SB (see FIG. 14) used for the two second servo reading elements SRb included in the data reading element group DRG may be stored in the NVM 96, pitch information 142 for the three servo bands SB used for the two first servo reading elements SRa included in the first data recording element group DWG1 may be stored in the NVM 96, and pitch information 142 for the three servo bands SB used for the two third servo reading elements SRc included in the second data recording element group DWG2 may be stored in the NVM 96.

As described above, in a case where the pitch information 142 for each of the three servo bands SB used for the two first servo reading elements SRa, the three servo bands SB used for the two second servo reading elements SRb, and the three servo bands SB used for the two third servo reading elements SRc is stored in the NVM 96, in the same manner as in the method described in the above-described embodiment (see FIGS. 29 to 31), the running control unit 140 need only use the pitch information 142 corresponding to each of the first servo reading element SRa, the second servo reading element SRb, and the third servo reading element SRc for each magnetic tape drive 30 to control the feeding motor 40 and the winding motor 44 such that the width of the magnetic tape MT becomes the width corresponding to the distance between the servo reading elements.

Figure 35:
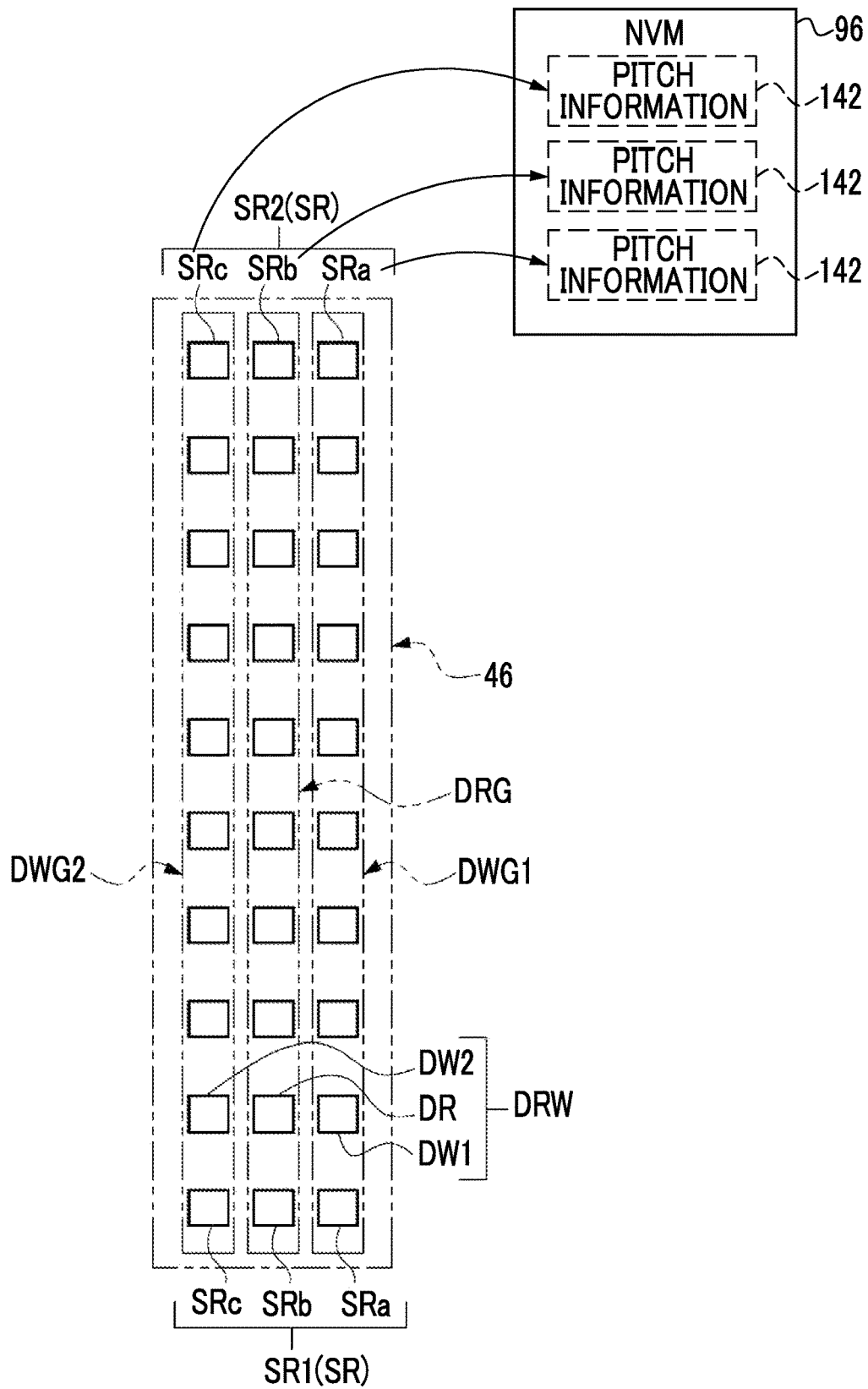
FIG. 35 is a conceptual diagram showing an example of an aspect in which a plurality of pieces of pitch information are stored in the NVM.

Therefore, according to the example shown in FIG. 35, since the pitch information 142 for the first data recording element group DWG1 is stored in the NVM 96, it is possible to contribute to the correction of the positional relationship between the plurality of servo bands SB and the two first servo reading elements SRa included in the first data recording element group DWG1 even in a case where variations have occurred in the pitch between the servo bands SB used for the two first servo reading elements SRa included in the first data recording element group DWG1 for each magnetic head 36.

In addition, according to the example shown in FIG. 35, since the pitch information 142 for the second data recording element group DWG2 is stored in the NVM 96, it is possible to contribute to the correction of the positional relationship between the plurality of servo bands SB and the two third servo reading elements SRc included in the second data recording element group DWG2 even in a case where variations have occurred in the pitch between the servo bands SB used for the two third servo reading elements SRc included in the second data recording element group DWG2 for each magnetic head 36.

Further, according to the example shown in FIG. 35, since the pitch information 142 for the data reading element group DRG is stored in the NVM 96, it is possible to contribute to the correction of the positional relationship between the plurality of servo bands SB and the two second servo reading elements SRb included in the data reading element group DRG even in a case where variations have occurred in the pitch between the servo bands SB used for the two second servo reading elements SRb included in the data reading element group DRG for each magnetic head 36.

Figure 36:
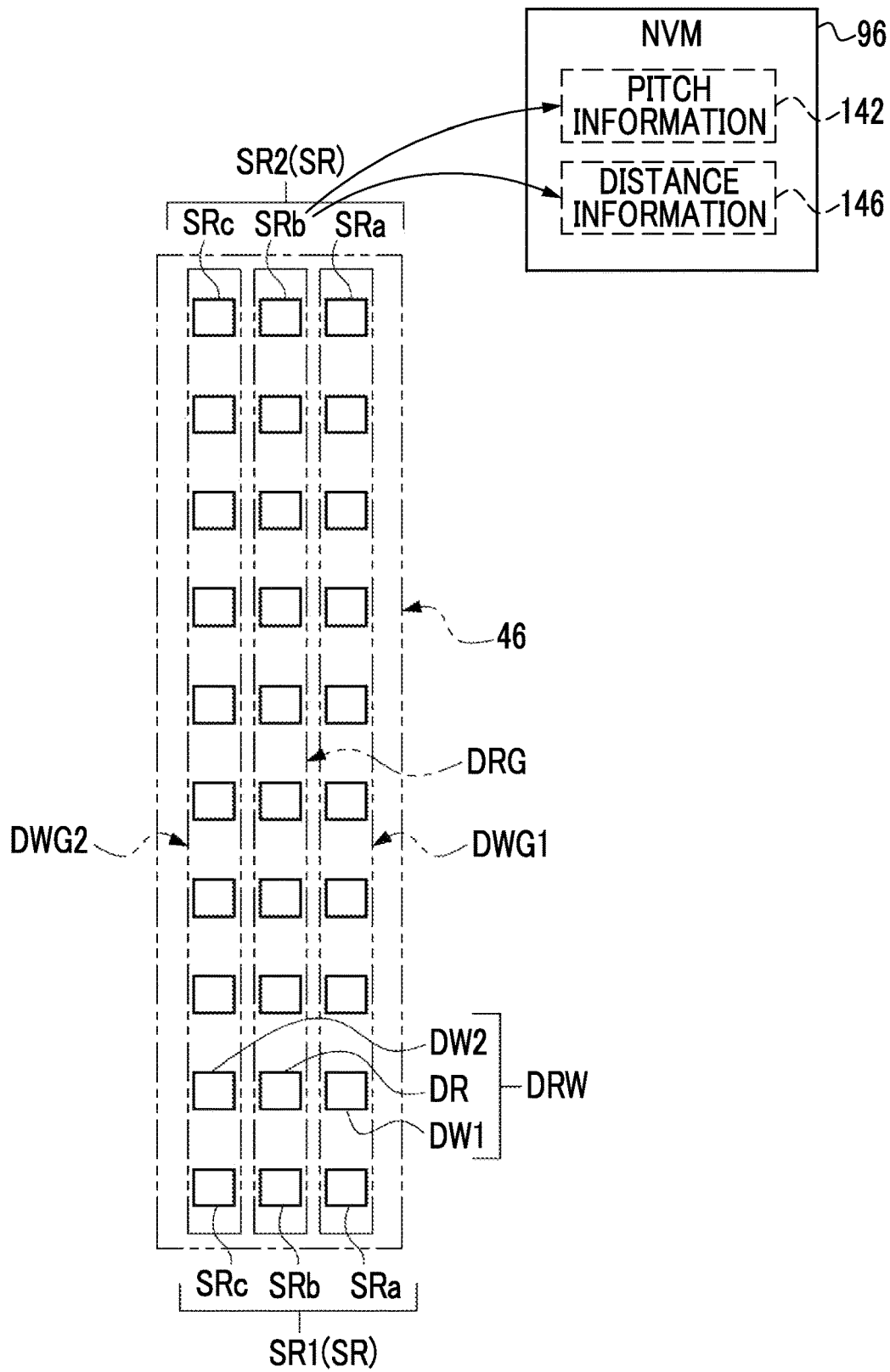
FIG. 36 is a conceptual diagram showing an example of an aspect in which distance information and pitch information corresponding to a reading element group are stored in the NVM.

In the example shown in FIG. 34, the distance information 146 for each of the data reading element group DRG, the first data recording element group DWG1, and the second data recording element group DWG2 is stored in the NVM 96, and in the example shown in FIG. 35, the pitch information 142 for each of the data reading element group DRG, the first data recording element group DWG1, and the second data recording element group DWG2 is stored in the NVM 96, but the technology of the present disclosure is not limited thereto. For example, as shown in FIG. 36, pitch information 142 and/or distance information 146 for any one group of the data reading element group DRG, the first data recording element group DWG1, or the second data recording element group DWG2 may be stored in the NVM 96. In the example shown in FIG. 36, distance information 146 related to the two second servo reading elements SRb included in the data reading element group DRG and the pitch information 142 for the three servo bands SB used for the two second servo reading elements SRb included in the data reading element group DRG are stored in the NVM 96.

In this case as well, in the same manner as in the method described in the above-described embodiment (see FIGS. 29 to 31), the running control unit 140 need only use the distance information 146 related to the two second servo reading elements SRb included in the data reading element group DRG and the pitch information 142 for the three servo bands SB used for the two second servo reading elements SRb included in the data reading element group DRG for each magnetic tape drive 30 to control the feeding motor 40 and the winding motor 44 such that the width of the magnetic tape MT becomes the width corresponding to the distance between the servo reading elements.

Therefore, according to the example shown in FIG. 36, since the pitch information 142 and the distance information 146 for the data reading element group DRG are stored in the NVM 96, it is possible to contribute to the correction of the positional relationship between the plurality of servo bands SB and the two second servo reading elements SRb included in the data reading element group DRG even in a case where variations have occurred in the pitch between the servo bands SB used for the two second servo reading elements SRb included in the data reading element group DRG and the distance between the two second servo reading elements SRb included in the data reading element group DRG for each magnetic head 36.

In the example shown in FIG. 36, although the pitch information 142 and the distance information 146 for the data reading element group DRG are stored in the NVM 96, the technology of the present disclosure is not limited thereto, and the pitch information 142 and the distance information 146 for the first data recording element group DWG1 or for the second data recording element group DWG2 may be stored in the NVM 96.

In the above-described embodiment, although an aspect example in which the cartridge memory 19 is accommodated in the case 12 has been described, the technology of the present disclosure is not limited thereto, and the cartridge memory 19 may be attached to an outer surface of the case 12.

In the above-described embodiment, although an aspect example in which the distance between the servo reading elements is associated with each magnetic tape drive 30 in the drive-specific characteristic table 150 has been described, the technology of the present disclosure is not limited thereto. For example, the distance between the servo reading elements may be associated with each magnetic head 36.

As the hardware resource that executes the processing of the control device 38, various processors described below can be used. Examples of the processors include a CPU which is a general-purpose processor functioning as a hardware resource that executes software, that is, a program, to execute the processing. Further, examples of the processors include a dedicated electrical circuit which is a processor having a dedicated circuit configuration designed for executing specific processing, such as an FPGA, a PLD, or the illustrated ASIC 120. A memory is incorporated or connected to any processor, and any processor executes the processing using the memory.

The hardware resource that executes the processing of the control device 38 may be composed of one of various processors or may be composed of a combination of two or more processors of the same type or different types (for example, a combination of a plurality of FPGAs or a combination of a CPU and an FPGA). Alternatively, the hardware resource that executes the processing of the control device 38 may be one processor.

A first example in which the hardware resource is composed of one processor is an aspect in which one or more CPUs and software are combined to constitute one processor and the processor functions as the hardware resource that executes the processing. A second example is an aspect in which a processor that realizes the functions of the entire system including a plurality of hardware resources that execute the processing with one IC chip is used, as typified by an SoC or the like. In this way, the processing of the control device 38 is realized using one or more of various processors as the hardware resource.

Furthermore, as the hardware structures of various processors, more specifically, an electrical circuit into which circuit elements, such as semiconductor elements, are combined can be used. Further, the processing of the control device 38 described above is merely an example. Accordingly, it goes without saying that unnecessary steps may be deleted, new steps may be added, or a processing order may be changed without departing from the gist.

The technology of the present disclosure can also appropriately combine the above-mentioned various embodiments and/or various modification examples. In addition, it goes without saying that the technology of the present disclosure is not limited to the above-described embodiment and various configurations may be employed without departing from the gist. Furthermore, in addition to the program, the technology of the present disclosure extends to a storage medium that stores the program in a non-transitory manner.

The content of the above description and the content of the drawings are detailed description of parts according to the technology of the present disclosure, and are merely an example of the technology of the present disclosure. For example, the above description related to configurations, functions, actions, and advantageous effects is description related to an example of the configurations, functions, actions, and advantageous effects of the parts according to the technology of the present disclosure. Accordingly, it is needless to say that unnecessary parts may be deleted, new elements may be added, or replacement may be made to the content of the above description and the content of the drawings without departing from the gist of the technology of the present disclosure. Further, in order to avoid confusion and to facilitate understanding of the parts according to the technology of the present disclosure, description related to common technical knowledge and the like that does not require particular description to enable implementation of the technology of the present disclosure is omitted from the content of the above description and the content of the drawings.

In the present specification, "A and/or B" has the same meaning as "at least one of A or B". That is, "A and/or B" means that only A may be used, only B may be used, or a combination of A and B may be used. In addition, in the present specification, the same concept as "A and/or B" is also applied to a case where three or more matters are expressed by "and/or".

All documents, patent applications, and technical standards described in the present specification are incorporated in the present specification by reference to the same extent as in a case where the individual documents, patent applications, and technical standards were specifically and individually stated to be incorporated by reference.

What is claimed is:

1. A magnetic tape cartridge comprising:
   a magnetic tape; and
   a storage medium that is integrated with or separated from the magnetic tape,
   wherein a plurality of servo bands are formed on the magnetic tape,
   the plurality of servo bands are formed at positions spaced apart from each other in a width direction of the magnetic tape along an entire length direction of the magnetic tape, and
   the storage medium stores pitch information capable of specifying a pitch in the width direction between the plurality of servo bands and distance information capable of specifying a distance between a plurality of servo reading elements that have read the plurality of servo bands.

2. The magnetic tape cartridge according to claim 1,
   wherein a magnetic head including at least one data reading element group that reads data from the magnetic tape and at least one data recording element group that records data on the magnetic tape has a set of the plurality of servo reading elements provided for each of the data reading element group and the data recording element group, and
   the storage medium stores the distance information for each of the data reading element group and the data recording element group.

3. The magnetic tape cartridge according to claim 2,
   wherein the storage medium stores the pitch information for each of the data reading element group and the data recording element group.

4. The magnetic tape cartridge according to claim 2,
   wherein the storage medium stores the distance information and the pitch information for any one of the data reading element group or the data recording element group.

5. The magnetic tape cartridge according to claim 1,
   wherein the storage medium stores the pitch information regarding the pitches at a plurality of locations spaced apart from each other over the entire length of the magnetic tape.

6. The magnetic tape cartridge according to claim 1,
   wherein the distance information includes information indicating the distance.

7. The magnetic tape cartridge according to claim 1,
   wherein head specification information capable of specifying a head on which the plurality of servo reading elements are mounted is associated with information indicating the distance for the plurality of servo reading elements mounted on the head.

8. The magnetic tape cartridge according to claim 1,
   wherein the storage medium includes an internal memory of a noncontact communication medium where reading and writing of data are performed in a noncontact manner by a noncontact reading and writing device.

9. The magnetic tape cartridge according to claim 1,
   wherein the pitch is measured on the basis of a result of reading the plurality of servo bands through the plurality of servo reading elements, in a stage before data recording is performed by a magnetic tape drive with respect to the magnetic tape.

10. The magnetic tape cartridge according to claim 9,
    wherein the pitch is obtained for each of a plurality of positions in the width direction in the plurality of servo bands.

11. The magnetic tape cartridge according to claim 10,
    wherein the pitch in each position of the plurality of servo reading elements, which is specified by using servo pattern distance information in which the plurality of positions in the width direction in the plurality of servo bands and distances in the entire length direction of the magnetic tape at the plurality of positions between a pair of magnetization regions constituting a servo pattern formed in each of the plurality of servo bands are associated with each other, is obtained.

12. The magnetic tape cartridge according to claim 1, wherein the storage medium includes a partial region of the magnetic tape.

13. A magnetic tape drive in which the magnetic tape cartridge according to claim 1 is loaded, the magnetic tape drive comprising:
a tension applying mechanism that applies tension to the magnetic tape; and
a control device that controls the tension applying mechanism to adjust the tension according to the pitch information and the distance information which are stored in the storage medium.

14. A magnetic tape system comprising:
the magnetic tape cartridge according to claim 1;
a tension applying mechanism that applies tension to the magnetic tape; and
a control device that controls the tension applying mechanism to adjust the tension according to the pitch information and the distance information which are stored in the storage medium.

15. A method of operating a magnetic tape drive, comprising:
acquiring the pitch information and the distance information from the storage medium provided in the magnetic tape cartridge according to claim 1; and
controlling a tension applying mechanism, which applies tension to the magnetic tape, to adjust the tension, which is applied to the magnetic tape in a case where at least one of a recording operation or a reading operation with respect to the magnetic tape is performed, according to the pitch information and the distance information.

16. The magnetic tape cartridge according to claim 1, wherein the distance information is information corresponding to the distance between the plurality of servo reading elements used to obtain the pitch information.

17. The magnetic tape cartridge according to claim 1, wherein the pitch information is information that is variable depending on an age of the magnetic tape or an environment in which it is used.

18. The magnetic tape cartridge according to claim 1, wherein the pitch information is information measured after the magnetic tape is incorporated into the magnetic tape cartridge.

19. A magnetic tape cartridge comprising:
a case in which a magnetic tape on which a plurality of servo bands are formed is accommodated; and
a storage medium provided in the case,
wherein the plurality of servo bands are formed at positions spaced apart from each other in a width direction of the magnetic tape along an entire length direction of the magnetic tape,
the storage medium stores pitch information capable of specifying a pitch in the width direction between the plurality of servo bands, and
the pitch information is a value calculated on the basis of distance information that is not stored in the storage medium and that is capable of specifying a distance between a plurality of servo reading elements that have read the plurality of servo bands.

20. The magnetic tape cartridge according to claim 19, wherein the pitch is calculated on the basis of a result of reading the plurality of servo bands through the plurality of servo reading elements and the distance between the plurality of servo reading elements, in a stage before data recording is performed by a magnetic tape drive with respect to the magnetic tape.

* * * * *